United States Patent
Gabel

(10) Patent No.: US 9,866,673 B2
(45) Date of Patent: Jan. 9, 2018

(54) METHODS AND SYSTEMS OF MANAGING ACCIDENT COMMUNICATIONS OVER A NETWORK

(71) Applicant: Medlegal Network, Inc., Santa Monica, CA (US)

(72) Inventor: Gershon Gabel, Santa Monica, CA (US)

(73) Assignee: Medlegal Network, Inc., Santa Monica, CA (US)

( * ) Notice: Subject to any disclaimer, the term of this patent is extended or adjusted under 35 U.S.C. 154(b) by 0 days.

(21) Appl. No.: 15/048,834

(22) Filed: Feb. 19, 2016

(65) Prior Publication Data
US 2016/0182707 A1    Jun. 23, 2016

Related U.S. Application Data

(63) Continuation-in-part of application No. 14/133,330, filed on Dec. 18, 2013.
(Continued)

(51) Int. Cl.
*H04M 11/04* (2006.01)
*H04M 1/725* (2006.01)
(Continued)

(52) U.S. Cl.
CPC ...... *H04M 1/72541* (2013.01); *G06F 3/0482* (2013.01); *G06F 3/04842* (2013.01);
(Continued)

(58) Field of Classification Search
CPC ........ G08B 25/10; G08B 25/14; G08B 21/00; G08B 25/08; G08B 21/10; G08B 25/016;
(Continued)

(56) References Cited

U.S. PATENT DOCUMENTS 6,098,070 A    8/2000  Maxwell
6,405,033 B1   6/2002  Kennedy, III
(Continued)

FOREIGN PATENT DOCUMENTS

JP    06-119578 A    4/1994
JP    5151799 82     2/2013
(Continued)

OTHER PUBLICATIONS

HispanicMarketWeekly, Referral Services: Legal and Medical, Published: Apr. 3, 2008 (http://www.hispanicmarketweekly.com/featureArticle.cms?id=972&mode=print), 2 pages.
(Continued)

*Primary Examiner* — Keith Fang
*Assistant Examiner* — B. M. M Hannan
(74) *Attorney, Agent, or Firm* — Knobbe, Martens, Olson & Bear LLP

(57) ABSTRACT

Systems and methods are configured to detect the occurrence of accidents, and to collect, process, and distribute accident related data. The accident related information may include location information, accident image information, and/or other information. Optionally, upon detection of an accident, emergency contacts of a user involved in the accident may be automatically notified of the accident. Data may be imaged using a camera of a mobile device, barcode locations may be identified, and barcodes may be decoded.

11 Claims, 75 Drawing Sheets

Related U.S. Application Data

(60) Provisional application No. 62/294,246, filed on Feb. 11, 2016.

(51) Int. Cl.

| | | |
|---|---|---|
| *H04W 4/22* | (2009.01) | |
| *H04W 4/02* | (2009.01) | |
| *H04W 4/12* | (2009.01) | |
| *G06F 3/0488* | (2013.01) | |
| *G06F 3/0484* | (2013.01) | |
| *G06F 3/0482* | (2013.01) | |
| *G06F 3/16* | (2006.01) | |
| *G06Q 10/10* | (2012.01) | |
| *H04W 4/16* | (2009.01) | |
| *G06Q 50/30* | (2012.01) | |

(52) U.S. Cl.
CPC ...... *G06F 3/04883* (2013.01); *G06F 3/04886* (2013.01); *G06F 3/16* (2013.01); *G06Q 10/10* (2013.01); *H04W 4/02* (2013.01); *H04W 4/025* (2013.01); *H04W 4/12* (2013.01); *H04W 4/16* (2013.01); *H04W 4/22* (2013.01); *G06Q 50/30* (2013.01)

(58) Field of Classification Search
CPC .... H04M 11/04; H04M 3/42; H04M 1/72541; G08G 1/09; H04W 4/22; H04W 4/02; H04W 4/025; H04W 4/12; H04W 4/16; H04W 76/007; H04W 64/00; G06F 17/30; G06F 3/0482; G06F 3/04842; G06F 3/04883; G06F 3/04886; G06F 3/16; G06Q 10/10; G06Q 50/30
USPC ............... 455/404.2, 414.2, 440, 456.1, 457; 707/803, E17.028, E17.058, E17.101; 340/436, 539.11; 705/4; 701/301
See application file for complete search history.

(56) References Cited

U.S. PATENT DOCUMENTS

| | | |
|---|---|---|
| 6,658,389 B1 | 12/2003 | Alpdemir |
| 7,016,897 B2 | 3/2006 | Hill et al. |
| 7,398,461 B1 | 7/2008 | Broder et al. |
| 7,702,524 B1 | 4/2010 | Whibbs et al. |
| 7,752,054 B1 | 7/2010 | Hoppe et al. |
| 7,769,826 B2 | 8/2010 | Gustafsson |
| 9,330,275 B1* | 5/2016 | Endresen ............ G06F 21/6218 |
| 9,412,103 B1* | 8/2016 | d'Escragnolle ........ G06Q 20/32 |
| 2001/0044735 A1 | 11/2001 | Colburn et al. |
| 2002/0038233 A1 | 3/2002 | Shubov et al. |
| 2002/0059084 A1 | 5/2002 | Wahlbin |
| 2002/0091879 A1 | 7/2002 | Beriker |
| 2002/0115423 A1 | 8/2002 | Hatae et al. |
| 2003/0028406 A1 | 2/2003 | Herz et al. |
| 2003/0069744 A1 | 4/2003 | Craig et al. |
| 2003/0149577 A1 | 8/2003 | Young et al. |
| 2004/0083395 A1 | 4/2004 | Blechman |
| 2004/0087301 A1 | 5/2004 | Tobin |
| 2004/0093280 A1 | 5/2004 | Yamaguchi |
| 2005/0010563 A1 | 1/2005 | Gross et al. |
| 2005/0033641 A1 | 2/2005 | Jha et al. |
| 2005/0035208 A1* | 2/2005 | Elliot ................. G06K 7/10881 235/472.01 |
| 2005/0099272 A1 | 5/2005 | Kuo |
| 2005/0102159 A1 | 5/2005 | Mondshine |
| 2005/0108063 A1 | 5/2005 | Madill, Jr. et al. |
| 2006/0085216 A1 | 4/2006 | Guerrero |
| 2007/0011128 A1 | 1/2007 | Meyers |
| 2007/0179818 A1 | 8/2007 | Magnus |
| 2007/0179845 A1 | 8/2007 | Jain |
| 2007/0179846 A1 | 8/2007 | Jain et al. |
| 2007/0179847 A1 | 8/2007 | Jain |
| 2007/0179848 A1 | 8/2007 | Jain et al. |
| 2007/0179849 A1 | 8/2007 | Jain |
| 2007/0179853 A1 | 8/2007 | Feige et al. |
| 2007/0260520 A1 | 11/2007 | Jha et al. |
| 2007/0294258 A1* | 12/2007 | Caldwell ............... G06Q 10/10 |
| 2008/0065726 A1 | 3/2008 | Schoenberg |
| 2008/0103823 A1 | 5/2008 | Papa |
| 2008/0192129 A1* | 8/2008 | Walker ................ G11B 27/034 348/231.2 |
| 2008/0306996 A1 | 12/2008 | McClellan et al. |
| 2009/0198521 A1* | 8/2009 | Barker .................. G06F 19/322 705/3 |
| 2009/0276708 A1* | 11/2009 | Smith .................. G06Q 10/087 715/716 |
| 2010/0004989 A1 | 1/2010 | Bonalle et al. |
| 2011/0099116 A1 | 4/2011 | Gabel |
| 2011/0246244 A1 | 10/2011 | O'Rourke |
| 2011/0290871 A1* | 12/2011 | Jon ................... G06F 17/30002 235/375 |
| 2012/0109690 A1* | 5/2012 | Weinrauch ............. G06Q 10/10 705/4 |
| 2012/0322401 A1 | 12/2012 | Collins |
| 2013/0182002 A1 | 7/2013 | Macciola |
| 2013/0290036 A1 | 10/2013 | Strange |
| 2013/0297353 A1 | 11/2013 | Strange |
| 2014/0040287 A1* | 2/2014 | Frome ............... G06F 17/30985 707/755 |
| 2014/0114691 A1* | 4/2014 | Pearce .................. G06Q 40/08 705/4 |
| 2014/0203071 A1* | 7/2014 | Eggert ............. G06F 17/30002 235/375 |
| 2014/0365281 A1* | 12/2014 | Onischuk ............... G07C 13/00 705/12 |
| 2014/0368601 A1 | 12/2014 | deCharms |
| 2015/0009327 A1* | 1/2015 | Love ..................... H04N 7/181 348/148 |
| 2015/0026174 A1* | 1/2015 | Nuggehalli ....... G06F 17/30038 707/736 |
| 2015/0081362 A1 | 3/2015 | Chadwick |
| 2015/0127570 A1* | 5/2015 | Doughty ................ G06Q 10/00 705/325 |
| 2015/0341225 A1* | 11/2015 | Baarman ............... H04L 41/145 705/333 |

FOREIGN PATENT DOCUMENTS

| | | |
|---|---|---|
| KR | 10-1095156 81 | 12/2001 |
| KR | 10-2003-0008655 A | 1/2003 |
| KR | 10-2013-0119680 | 11/2013 |

OTHER PUBLICATIONS

International Search Report for International Application No. PCT/US2014/070670, dated Apr. 13, 2015, 3 pp.
LegalMatch, Find the Right Lawyer Now!, Copyright 1999-2010 (http://web.archive.org/web/20091027232223/http://www.legalmatch.com/), 1 page.
Office Action from Mexican Patent Application No. MX/a/2010/010404, dated Sep. 1, 2012, 3 pages.
Written Opinion of the International Searching Authority for International Application No. PCT/US2014/070670, dated Apr. 13, 2015, 6 pp.
International Search Report and Written Opinion (12 pages) for PCT/US2017/016724, dated Jun. 9, 2017.

* cited by examiner

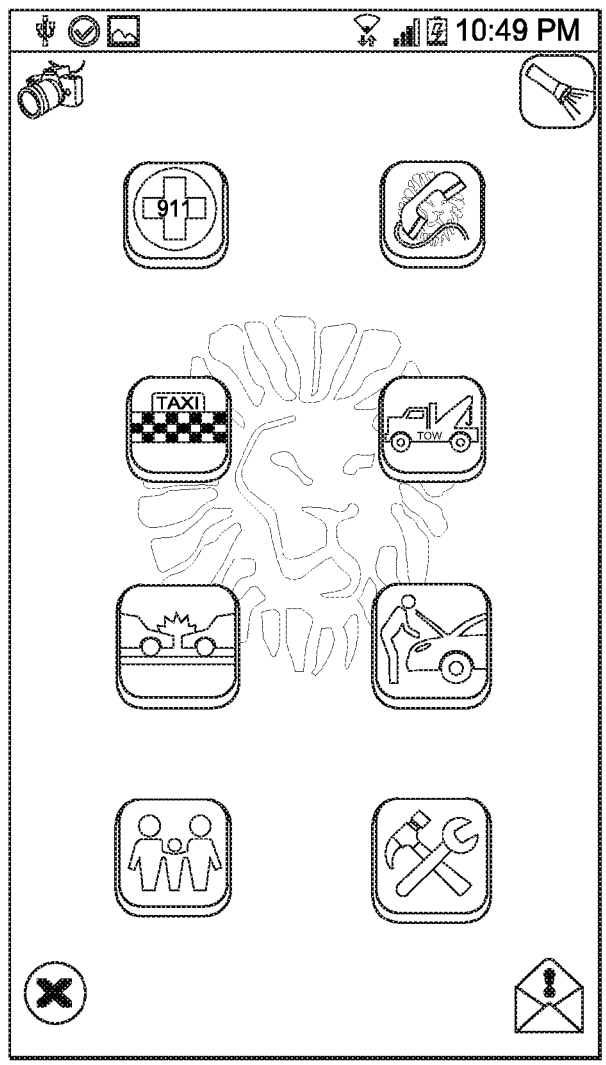
FIG. 3A
 Personal Data Area
 Take photos to report accidents
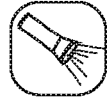 Flashlight
 Report Message Area from other friends or relatives
 Close Session
FIG. 3B Place:

Place Phone Number:

Report Number:

Reported To?

Phone Number Where The Report Was Taken

Insurance Company:

Policy Number:

Insurance Phone Number:

Ambulance:  ◯ Yes
◯ No

[ Next ]

FIG. 10K http://192.254.178.148/admin_app/menu/menu.php

MedLegal Group

Mobile Application Manager

My Account | Exit

| Image | Initiation | All applications | Customer | SOS | Location | Taxi | Reopt Number | Cranes | Insurance Company | Car | Policy Number | Lawyers | Telephone Number of Insurance Co. | GML | View Witnesses | Time | Status | View Map |
|---|---|---|---|---|---|---|---|---|---|---|---|---|---|---|---|---|---|---|
| | | | Enrique | | sjsjsj | | hdnshs | | dhdhd | | dhdhhd | | 37383829 | | View Witnesses | 24/09/2013 13:27:08 | Awaiting Response | Gmaps |
| | | | Felix A Cervantes Lopez | | | | | | | | | | | | View Witnesses | 11/09/2013 16:28:55 | Awaiting Response | Gmaps |
| | | | Gershon | | | | | | | | | | | | View Witnesses | 04/09/2013 14:04:25 | Awaiting Response | Gmaps |
| | | | Felix A Cervantes | | | | | | | | | | | | View Witnesses | 27/08/2013 11:27:31 | Awaiting Response | Gmaps |
| | | | Enrique | | Kaksksksk | | $#&#&# | | #&#&#*# | | jsksksks | | 272728282 | | View Witnesses | 26/08/2013 19:19:47 | No Data | Gmaps |
| | | | Rodrigo Laisequilla Ramos | | | | | | | | | | | | View Witnesses | 23/08/2013 08:34:10 | No Data | Gmaps |
| | | | Rodrigo Laisequilla Ramos | | | | | | | | | | | | View Witnesses | 22/08/2013 22:15:42 | Awaiting Response | Gmaps |
| | | | Rodrigo Laisequilla Ramos | | | | | | | | | | | | View Witnesses | 22/08/2013 16:23:51 | No Data | Gmaps |
| | | | Rodrigo Laisequilla Ramos | | | | | | | | | | | | View Witnesses | 22/08/2013 16:16:07 | Awaiting Response | Gmaps |
| | | | Rodrigo Laisequilla Ramos | | | | | | | | | | | | View Witnesses | 22/08/2013 16:14:03 | Awaiting Response | Gmaps |
| | | | Felix A Cervantes Lopez | | | | | | | | | | | | View Witnesses | 22/08/2013 08:24:56 | Awaiting Response | Gmaps |
| | | | Felix A Cervantes Lopez | | | | | | | | | | | | View Witnesses | 21/08/2013 22:47:56 | Awaiting Response | Gmaps |
| | | | Felix A Cervantes Lopez | | | | | | | | | | | | View Witnesses | 21/08/2013 13:08:09 | No Data | Gmaps |
| | | | Felix A Cervantes Lopez | | | | | | | | | | | | View Witnesses | 20/08/2013 22:43:17 | Awaiting Response | Gmaps |
| | | | Felix A Cervantes Lopez | | | | | | | | | | | | View Witnesses | 20/08/2013 22:34:05 | Awaiting Response | Gmaps |
| | | | Felix A Cervantes Lopez | | | | | | | | | | | | View Witnesses | 20/08/2013 22:33:16 | Awaiting Response | Gmaps |
| | | | Rodrigo Laisequilla Ramos | | | | | | | | | | | | View Witnesses | 20/08/2013 22:32:28 | Awaiting Response | Gmaps |

FIG. 10L

Car Accidents

| Id | Just Now | Complete | User | Report | Created At |
|---|---|---|---|---|---|
| 667 | Yes | No | Ricky Leads GML | See Report | February 10, 2016 21:04 |
| 666 | Yes | No | Gershon Gabel | See Report | February 10, 2016 20:49 |
| 665 | Yes | Yes | Gershon Gabel | See Report | February 10, 2016 19:32 |
| 664 | No | No | David Marin | See Report | February 10, 2016 18:26 |
| 663 | Yes | Yes | Jesse Oky | See Report | February 10, 2016 16:52 |
| 662 | Yes | No | Jesse Oky | See Report | February 10, 2016 16:51 |
| 661 | Yes | Yes | Dude Smith | See Report | February 10, 2016 16:25 |
| 660 | No | No | Jesse Oky | See Report | February 10, 2016 15:49 |
| 659 | Yes | No | Jesse Oky | See Report | February 10, 2016 15:43 |
| 658 | No | No | Jesse Oky | See Report | February 10, 2016 15:38 |
| 657 | No | No | Jesse Oky | See Report | February 10, 2016 14:24 |
| 656 | No | No | Jesse Oky | See Report | February 10, 2016 09:13 |

*FIG. 14A*

Personal Injuries

| Id | Just Now | Complete | User | Report | Created At |
|----|----------|----------|------|--------|------------|
| 90 | No | No | David Marin | See Report | February 10, 2016 18:27 |
| 89 | Yes | Yes | Jesse Oky | See Report | February 10, 2016 17:00 |
| 88 | Yes | Yes | Dude Smith | See Report | February 10, 2016 16:42 |
| 87 | No | No | Jesse Oky | See Report | February 10, 2016 14:55 |
| 86 | Yes | Yes | Candy Cane | See Report | February 09, 2016 11:47 |
| 85 | Yes | No | Natalie Fr | See Report | February 09, 2016 11:29 |
| 84 | Yes | No | Ricky Leads GML | See Report | February 09, 2016 11:19 |
| 83 | No | Yes | Userd Fd | See Report | February 05, 2016 20:05 |
| 82 | Yes | No | Smooth Operater | See Report | February 04, 2016 16:04 |
| 81 | No | No | Smooth Operater | See Report | February 04, 2016 16:04 |
| 80 | Yes | Yes | Natalie Fr | See Report | February 04, 2016 07:37 |
| 79 | No | No | UserA U | See Report | February 03, 2016 14:05 |

*FIG. 14B*

Work Injuries

| Id  | Just now | Complete | User            | Report     | Created At                  |
|-----|----------|----------|-----------------|------------|-----------------------------|
| 296 | No       | No       | David Marin     | See Report | February 10, 2016 18:27     |
| 295 | No       | No       | Jesse Oky       | See Report | February 10, 2016 15:54     |
| 294 | No       | No       | Jesse Oky       | See Report | February 10, 2016 15:34     |
| 293 | No       | No       | Jesse Oky       | See Report | February 10, 2016 14:39     |
| 292 | Yes      | No       | Lolo Lo         | See Report | February 09, 2016 15:36     |
| 291 | Yes      | Yes      | Candy Cane      | See Report | February 09, 2016 11:45     |
| 290 | Yes      | No       | Ricky Leads GML | See Report | February 09, 2016 11:19     |
| 289 | Yes      | Yes      | Ricky Leads GML | See Report | February 09, 2016 11:01     |
| 288 | Yes      | No       | Ali Nana        | See Report | February 09, 2016 09:21     |
| 287 | Yes      | No       | Ali Nana        | See Report | February 09, 2016 09:21     |

*FIG. 14C*

Beacons

| Id | Is Active | Beacon Type | User | Report | Created At |
|---|---|---|---|---|---|
| 132 | Yes | immigration_capture | Gershon Gabel | See Report | February 10, 2016 19:38 |
| 131 | No | immigration_capture | Jesse Oky | See Report | February 10, 2016 15:23 |
| 130 | No | immigration_capture | Jesse Oky | See Report | February 10, 2016 15:01 |
| 129 | No | immigration_capture | Lolo Lo | See Report | February 09, 2016 15:39 |
| 128 | No | immigration_capture | Candy Cane | See Report | February 09, 2016 11:44 |
| 127 | No | immigration_capture | Ricky Leads GML | See Report | February 09, 2016 10:55 |
| 126 | No | immigration_capture | Natalie F | See Report | February 08, 2016 07:32 |
| 125 | Yes | immigration_capture | Gershon Gabel | See Report | February 05, 2016 15:21 |
| 124 | No | immigration_capture | Elliot Gould | See Report | February 10, 2016 14:06 |
| 123 | No | immigration_capture | Smooth Operater | See Report | February 04, 2016 17:01 |

*FIG. 14D*

| Grupo | | | | | | User |
|---|---|---|---|---|---|---|
| Batch Actions | | | | | | |
| Id | Email | First Name | Last Name | Phone | Date Of Birth | Account Type |
| 335 | lisa+3039@ad60.com | Elan | | 6468122503 | | invitee |
| 334 | lisa+4040@ad60.com | Dude | Smith | 6468122503 | February 09, 1995 18:00 | limited |
| 333 | lisa+922@ad60.com | Lois | | 6468122503 | | invitee |
| 332 | lisa+707@ad60.com | Samntha | Bee | 6468122503 | | invitee |
| 331 | bsbdbs@bdbbd.fnnd | Hdhe | Ndbdbd | 6262929222 | February 09, 1995 18:00 | limited |
| 330 | brenton+666@ad60.com | Brenton | | 6154957154 | | invitee |
| 329 | lisa+223@ad60.com | Dev | | 6468122503 | | invitee |
| 328 | lisa+777@ad60.com | Theo | | 6154957154 | | invitee |
| 327 | Jesse+20@ad60.com | Gdgdgd | Hshdb | 2222222222 | February 24, 1995 18:00 | limited |
| 326 | lisa+909@ad60.com | Smol | | 6468122503 | | invitee |
| 325 | lisa+919@ad60.com | Lolo | Lo | 6468122503 | February 08, 1977 18:00 | limited |
| 324 | lisa+135@ad60.com | Rick | | 6468122503 | | invitee |
| 323 | lisa+246@ad60.com | Sammi | Suza | 6468122503 | February 08, 1985 18:00 | limited |
| 322 | androidapp@grupomedilegal.com | Nat | Iphone | 12023907977 | | invitee |
| 321 | Jesse+18@ad60.com | Jdje | Bdbdbdd | 2222222222 | February 08, 1985 18:00 | limited |
| 320 | Jesse+17@ad60.com | Hhde | Hdhdh | 2222222222 | February 02, 1995 18:00 | limited |
| 319 | lisa+676@ad60.com | Sam | | 6468122503 | | invitee |

*FIG. 14E*

Grupo

Admin Users

Batch Actions

| ☐ | Id | Email | Current Sign In At | Sign In Count | Created At |
|---|---|---|---|---|---|
| ☐ | 2 | aniszmz@gmail.com | February 11, 2016 13:37 | 23 | August 03, 2015 09:33 |
| ☐ | 1 | admin@example.com | January 21, 2016 15:13 | 10 | August 03, 2015 09:29 |

*FIG. 14F*

METHODS AND SYSTEMS OF MANAGING ACCIDENT COMMUNICATIONS OVER A NETWORK

BACKGROUND OF THE INVENTION

Field of the Invention

The present invention is related to managing communications, and in particular to methods and systems for managing communications related to an accident or injury.

Description of the Related Art

Conventionally, when an incident, such as in a vehicular accident, apprehension, or arrest, the victim may be too distraught or overwhelmed to collect the needed information, such as insurance information and photographs of the incident, and may be uncertain as to who to contact regarding the incident. Thus, often victims may lose the ability to obtain adequate compensation for the harm to their persons and property caused by the accident.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An aspect of the disclosure relates to a mobile device configured to manage accident-related communications, comprising: a wireless interface; a processing system; a touch screen; a camera; non-transitory computer readable memory that stores instructions that when executed by the processing system cause the mobile device to: provide a first user interface that enables a user to report an event, wherein the first user interface enables the user to select an event-type among a plurality of different event types; receive via the touch screen an event type selection from the user; based at least in part on the received event type selection from the user, select an information capture process among a plurality of information capture process; identify an estimated location of the user based at least in part on WiFi, cell tower, or GPS location information; present via the touch screen a map selected based at least in part on the user's estimated location; enable the user to identify a precise event location by touching a location on the map and/or via a touch keyboard entry; provide a second user interface requesting an image of a document; in response to a user input received via the touch screen, cause a viewfinder corresponding to the mobile device camera to be displayed, wherein the viewfinder displays a live image being viewed by the mobile device camera; cause an alignment indicator to be displayed with the viewfinder while the live image is displayed; enable the user to capture an image of a document displayed via the viewfinder; determine a location of an optical code on the document; cause the optical code to be decoded to obtain at least alphanumeric information; provide a third user interface having one or more fields populated with at least a portion of the alphanumeric information; provide a fourth user interface enabling the user to record content from an event observer by touching a record control presented via the touch screen; cause event observer content to be recorded in response to the user touching the record control; transmit to a remote system, using the wireless interface, at least the precise location, at least a portion of the alphanumeric information obtained by decoding the barcode, and the recorded observer content.

An aspect of the disclosure relates to a method of managing accident-related communications, comprising: providing an application, comprising software, configured to be downloaded to a mobile device of a user having a touch screen and camera, wherein the application is configured to: provide a first user interface enabling the user to report an event, wherein the first user interface enables the user to select an event-type among a plurality of different event types; receive an event type selection from the user, wherein the event type selection is received via the touch screen; based at least in part on the received event type selection from the user, select an information capture process among a plurality of information capture process; identify an estimated location of the user based at least in part on WiFi, cell tower, or GPS location information; select a map based at least in part on the user's estimated location; provide the selected map for display via the user device; enable the user to identify a precise event location by touching a location on the map and/or via a touch keyboard entry; provide a second user interface requesting an image of a document; in response to a user input, cause a viewfinder corresponding to the mobile device camera to be displayed; cause an alignment indicator to be displayed with the viewfinder; enable the user to capture an image of a document displayed via the viewfinder; determine a location of an optical code on the document; determine an optical code-type for the optical code; decode the optical code to obtain at least alphanumeric information; provide a third user interface having one or more fields populated with at least a portion of the alphanumeric information; provide a fourth user interface enabling the user to record content from an event observer; cause event observer content to be recorded in response to the user activating a record control; transmit to a remote system, using a wireless interface, at least the precise location, at least a portion of the alphanumeric information obtained by decoding the barcode, and the recorded observer content.

An aspect of the disclosure relates to a method of managing accident-related communications, comprising: providing a first user interface for display on a user device, the user device comprising a touch screen and a camera, the first user interface enabling the user to report an event; identifying an estimated location of the user based at least in part on WiFi, cell tower, or GPS location information; enabling a map corresponding to the estimated location to be displayed on the user device; enabling the user to identify a precise event location by touching a location on the map and/or via a touch keyboard entry; providing a second user interface requesting an image of a document; in response to a user input, causing a viewfinder corresponding to the mobile device camera to be displayed; enabling the user to capture an image of a document displayed via the viewfinder; determining a location of an optical code on the document; decoding the optical code to obtain at least alphanumeric information; providing a third user interface having one or more fields populated with at least a portion of the alphanumeric information; providing a fourth user interface enabling the user to record content from an event observer; causing event observer content to be recorded in response to the user activating a record control; transmit to a remote system, using a wireless interface, at least the precise location, at least a portion of the alphanumeric information obtained by decoding the barcode, and the recorded observer content.

An aspect of the disclosure relates to systems and methods for collecting and distributing information over a network, such as a data network and/or a telephony network. For example, the information may be related to an accident, such as a user vehicular accident, personal injury, or a workplace accident and/or injury, or other incident, such as an arrest or apprehension. Certain embodiments facilitate the collection and reporting of accident, injury, and/or arrest or apprehension information by a user. Certain embodiments facilitate the provision of accident related services to a user (e.g., taxi services, towing service, auto repair services, etc.). Certain embodiments provide an application which may be installed on a user device, such as a mobile phone, which facilitates accident data collection and user communication with a remote system (e.g., an accident communication processing system) and accident-related service providers.

An example aspect may include a method of managing accident-related communications, comprising some or all of the following acts: providing an application, comprising software, configured to be downloaded to a mobile device of a user, wherein the application is configured to perform one or more of: enable the user to report, to an accident information processing system, vehicular accidents, via a first set of user interfaces, the first set of user interfaces configured to receive vehicular accident related information comprising: a name of a driver of a vehicle involved in the vehicular accident; a driver's license number of the driver; contact information of the driver; insurance information of the driver; an indication as to whether there were passengers, pedestrian in at least one vehicle involved in the vehicular accident; optionally, an indication as to whether there were one or more pedestrians involved in the accident; an indication as to whether the vehicular accident was reported to the police; an indication as to whether there was at least one witness to the vehicular accident or injury; image information related to the vehicular accident; enable the user to report workplace accidents or injury, to the accident information processing system, via a second set of user interfaces different than the first set of user interface, the second set of user interfaces configured to receive workplace accident related information comprising: an employer name; employer contact information; an indication as to whether the user is currently working for the employer; an indication as to whether the user reported the workplace accident or injury to the employer; an indication as to when the user last obtained medical services; workplace-related insurance information; enable the user to request referrals to least a taxi service, a tow service, and an attorney; enable the user to specify one or more contacts to whom an accident notification is to be provided if an accident occurs; enable the user to activate a camera flash on the user mobile device independently of capturing an image using a camera of the mobile device; enable the user to capture an image using the mobile device camera; receiving at the accident information processing system a first accident report regarding a first accident via the downloaded application installed on the user mobile device; at least partly in response to receiving the first accident report, automatically transmitting an accident notification to the user-specified one or more contacts to whom an accident notification is to be provided; determining, by the accident information processing system, what type of accident the user is reporting based at least in part on information associated with the first accident report; determining, by the accident information processing system, a location of the first accident based at least in part on the first accident report and/or determining a physical address associated with the user; determining, by the accident information processing system, which attorney has a first set of rights with respect to the location of the first accident and/or the physical address associated with the user, and attorney information accessed from a data store; selecting, by the accident information processing system, at least a first attorney based at least in part on the determination as to which attorney has the first set of rights; transmitting, by the accident information processing system, information regarding the first attorney to the application installed on the user mobile device for presentation to the user, the information regarding the selected first attorney including a rating provided by at least one other user; enabling the user to select the first attorney via the application; at least partly in response to detecting that the user has selected the first attorney, transmitting, by the accident information processing system, at least a portion of the first accident report to the selected attorney; receiving, by the accident information processing system, a request from the user for a taxi service; determining a current location of the user; based at least in part on the user's current location, identifying, by the accident information processing system, one or more taxi services; transmitting, by the accident information processing system, to the application installed on the user mobile device, a listing of one or more identified taxi services; enabling the user to select a listed taxi service; enabling the user to initiate a taxi request to a user selected taxi service; wherein the accident information processing system comprises computing hardware, a network interface, and a data store, the data store comprising non-transitory memory and an accident database.

Optionally, the foregoing method may include one or more of: wherein the application is configured to provide a user interface configured to receive information for a personal injury report, the user interface configured to receive information comprising an accident facility identifier corresponding to a facility is where the accident occurred, a phone number associated with the facility, an accident report number associated with a report made to a representative associated with the facility, and an indication as to whether an ambulance responded to the accident at the facility; wherein the first set of rights comprises at least an advertising right for a first location; wherein the listing of one or more identified taxi services comprises a listing of one or more identified taxi services and respective rates charged by the one or more identified taxi services; wherein the application further comprises an emergency call control, the method further comprising detecting a user activation of the emergency call control and at least partly in response automatically transmitting a notification to the user-specified one or more contacts to whom an accident notification is to be provided.

An example aspect may include a method of managing accident-related communications, comprising one or more of: providing an application, comprising software, configured to be downloaded to a mobile device of a user, wherein the application is configured to perform one or more of: enable the user to report, to an accident information processing system, vehicular accidents via a first set of user interfaces, the first set of user interfaces configured to receive vehicular accident related information comprising: a name of a driver of a vehicle involved in the vehicular accident; a driver's license number of the driver; contact information of the driver; insurance information of the driver; an indication as to whether there were passengers in at least one vehicle involved in the vehicular accident; an indication as to whether the vehicular accident was reported to the police; an indication as to whether there was at least one witness to the vehicular accident; image information related to the vehicular accident; enable the user to report workplace accidents, to the accident information processing system, via a second set of user interfaces different than the first set of user interface, the second set of user interfaces configured to receive workplace accident related information comprising: an employer name; employer contact information; enable the user to request referrals to least a taxi service and an attorney; enable the user to specify one or more contacts to whom an accident notification is to be provided if an accident occurs; enable the user to capture an image using the mobile device camera; receiving at the accident information processing system a first accident report regarding a first accident via the downloaded application on the user mobile device; in response to receiving the first accident report and based at least in part on contacts specified by the user to whom an accident notification is to be provided, automatically transmitting an accident notification to the user specified one or more contacts to whom an accident notification is to be provided; determining, by the accident information processing system, what type of accident the user is reporting based at least in part on the first accident report; determining, by the accident information processing system, a location of the first accident based at least in part on the first accident report and/or determining a physical address associated with the user; determining, by the accident information processing system, which attorney has a first set of rights with respect to the location of the first accident and/or the physical home address associated with the user, and attorney information accessed from a data store; selecting, by the accident information processing system, at least a first attorney based at least in part on the determination as to which attorney has the first set of rights; transmitting, by the accident information processing system, information regarding the first attorney to the application installed on the user mobile device for presentation to the user, the information regarding the selected first attorney including a rating provided by at least one other user; enabling the user to select the first attorney via the application; at least partly in response to detecting that the user has selected the first attorney, transmitting, by the accident information processing system, at least a portion of the first accident report to the selected attorney; receiving, by the accident information processing system, a request from the user for a taxi service and/or a tow service and/or repair shop; determining a current location of the user; based at least in part on the user's current location, identifying, by the accident information processing system, one or more taxi services and/or a tow services having, respectively, a taxi or a tow truck within a first range of the user's current location; transmitting, by the accident information processing system, to the application installed on the user mobile device a listing of one or more identified taxi services and/or tow services; enabling the user to select a listed taxi service and/or tow service; enabling the user to initiate a communication to a user selected taxi service and/or tow service; wherein the accident information processing system comprises computing hardware, a network interface, and a data store, the data store comprising non-transitory memory and an accident database.

Optionally, the foregoing method may include one or more of: wherein the application is configured to provide a user interface configured to receive information for a personal injury report, the user interface configured to receive information comprising: an accident facility identifier corresponding to a facility is where the accident occurred, contact information associated with the facility, an accident report number associated with a report made to a representative associated with the facility, and an indication as to whether an ambulance responded to the accident at the facility; wherein the first set of rights comprises at least an advertising right for a first location; wherein the listing of one or more identified taxi services and/or tow services comprises a listing of one or more identified taxi services and respective rates charged by the one or more identified taxi services; wherein the application further comprises an emergency call control, the method further comprising detecting a user activation of the emergency call control and at least partly in response automatically transmitting a notification to the user specified one or more contacts to whom an accident notification is to be provided.

An example aspect may include an accident management system, comprising: a computing system comprising hardware; a non-transitory computer storage medium having stored thereon executable instructions that direct the computing system to perform operations comprising one or more of: providing an application, comprising software, configured to be downloaded to a mobile device of a user, wherein the application is configured to: enable the user to report accidents via a first set of user interfaces, the first set of user interfaces configured to receive vehicular accident related information comprising: a name of a driver of a vehicle involved in the vehicular accident; a driver's license number of the driver; insurance information of the driver; an indication as to whether there were passengers in at least one vehicle involved in the vehicular accident; an indication as to whether the vehicular accident was reported to the police; an indication as to whether there was at least one witness to the vehicular accident; image information related to the vehicular accident; enable the user to report workplace accidents, to the accident information processing system, via a second set of user interfaces different than the first set of user interface, the second set of user interfaces configured to receive workplace accident or injury related information comprising: an employer name; employer contact information; enable the user to request referrals to least a taxi service and an attorney; enable the user to specify one or more contacts to whom an accident notification is to be provided if an accident occurs; enable the user to capture an image using the mobile device camera; receiving a first accident report regarding a first accident via the downloaded application on the user mobile device; in response to receiving the first accident report and based at least in part on contacts specified by the user to whom an accident notification is to be provided, automatically transmitting an accident notification to the user specified one or more contacts to whom an accident notification is to be provided; determining what type of accident the user is reporting based at least in part on the first accident report; determining a location of the first accident based at least in part on the first accident report and/or determining a physical address associated with the user; determining which attorney has a first set of rights with respect to the location of the first accident and/or the physical address associated with the user, and attorney information accessed from a data store; selecting at least a first attorney based at least in part on the determination as to which attorney has the first set of rights; transmitting information regarding the first attorney to the application installed on the user mobile device for presentation to the user, the information regarding the selected first attorney including a rating provided by at least one other user; enabling the user to select the first attorney via the application; at least partly in response to detecting that the user has selected the first attorney, transmitting at least a portion of the first accident report to the selected attorney; receiving a request from the user for a taxi service and/or a tow service; determining a current location of the user; based at least in part on the user's current location, identifying one or more taxi services and/or a tow services having, respectively, a taxi or a tow truck or repair shop within a first range of the user's current location; transmitting to the application installed on the user mobile device a listing of one or more identified taxi services, repair shop and/or tow services; enabling the user to select a listed taxi service and/or tow service; enabling the user to initiate a communication to a user selected taxi service, repair shop and/or tow service.

Optionally, the foregoing system may include one or more of: wherein the application is configured to provide a user interface configured to receive information for a personal injury report, the user interface configured to receive information comprising an accident facility identifier corresponding to a facility is where the accident occurred, contact information associated with the facility, an accident report number associated with a report made to a representative associated with the facility, and an indication as to whether an ambulance responded to the accident at the facility; wherein the first set of rights comprises at least an advertising right for a first location; wherein the listing of one or more identified taxi services and/or tow services comprises a listing of one or more identified taxi services and respective rates charged by the one or more identified taxi services; wherein the application further comprises an emergency call control, the operations further comprising detecting a user activation of the emergency call control and at least partly in response automatically transmitting a notification to the user specified one or more contacts to whom an accident notification is to be provided.

An example aspect may include an accident management system, comprising: a computing system comprising hardware; a non-transitory computer storage medium having stored thereon executable instructions that direct the computing system to perform operations comprising: receiving a first accident report regarding a first accident via an application installed on mobile device of a user; in response to receiving the first accident report and based at least in part on contacts specified by the user to whom an accident notification is to be provided, automatically transmitting an accident notification to the user specified one or more contacts to whom an accident notification is to be provided; determining what type of accident the user is reporting based at least in part on the first accident report; determining a location of the first accident based at least in part on the first accident report, or determining a physical address associated with the user, or determining both the location of the first accident based at least in part on the first accident report and the physical address associated with the user; determining which attorney has a first set of rights with respect to the location of the first accident and/or the physical address associated with the user, and attorney information accessed from a data store; selecting at least a first attorney based at least in part on the determination as to which attorney has the first set of rights; transmitting information regarding the first attorney to the application installed on the user mobile device for presentation to the user, the information regarding the selected first attorney including a rating provided by at least one other user; enabling the user to select the first attorney via the application installed on the user mobile device; at least partly in response to detecting that the user has selected the first attorney, transmitting at least a portion of the first accident report to the selected attorney; receiving a request from the user for a taxi service or a tow service, or both a taxi service and a tow service from the user via the application installed on the user mobile device; determining a current location of the user based at least in part on information provided via the mobile device of the user; based at least in part on the user's current location, identifying one or more taxi services or tow services, or both one or more taxi services and tow services, having, respectively, servicing the user's current location; transmitting to the application installed on the user mobile device a listing of one or more identified taxi services or tow services, or both taxi services and tow services; enabling the user to select a listed taxi service or a listed tow service, or both a listed taxi service and tow service; enabling the user to initiate a communication to a user selected taxi service, repair shop or tow service, or both a user selected taxi service and tow service.

Optionally, the foregoing system may include one or more of: wherein the application is configured to provide a user interface configured to receive information for a personal injury report, the user interface configured to receive information comprising an accident facility identifier corresponding to a facility is where the accident or injury occurred, contact information associated with the facility, an accident report number associated with a report made to a representative associated with the facility, and an indication as to whether an ambulance responded to the accident at the facility; wherein the first set of rights comprises at least an advertising right for a first location; wherein the listing of one or more identified taxi services and/or tow services comprises a listing of one or more identified taxi services and respective rates charged by the one or more identified taxi services; wherein the application further comprises an emergency call control, the operations further comprising detecting a user activation of the emergency call control and at least partly in response automatically transmitting a notification to the user specified one or more contacts to whom an accident notification is to be provided.

BRIEF DESCRIPTION OF THE DRAWINGS

Embodiments will now be described with reference to the drawings summarized below. These drawings and the associated description are provided to illustrate example embodiments, and not to limit the scope of the invention.

FIGS. 3A-3I illustrate example user interfaces.
FIGS. 6A-6B illustrate example user interfaces.
FIGS. 10A-10L illustrate example administrative user interfaces.
FIGS. 14A-14F illustrate additional example administrative user interfaces.

DETAILED DESCRIPTION

Systems and methods are disclosed for collecting, processing, and distributing information over a network, such as a data network. For example, the information may be related to an accident, such as a vehicular accident, personal injury, or a workplace accident or injury.

As noted above, conventionally, when an accident or injury occurs, such as in a vehicular accident, the victim may be too distraught or overwhelmed to collect the needed information, such as insurance information and photographs of the accident, and may be uncertain as to who to contact regarding the accident. Thus, often victims may lose the ability to obtain adequate compensation for the harm to their persons and property caused by the accident. Certain embodiments described herein address such challenged by facilitating the collection of accident information by a user. In addition, certain embodiments facilitate the provision of accident-related services to a user (e.g., taxi services, towing service, auto repair services, etc.).

A system, such as an accident communication processing system, may be provided that interacts with a user that wishes to report an accident and/or related information. An interface may be provided to the user, via a user device remote from the system, for reporting an accident and related information (e.g., information regarding those involved in the accident, witnesses, photographs of the accident scene, insurance information, etc.). The interface may be provided via an application (e.g., a dedicated application, sometimes referred to as an "app") and/or via a webpage which may be rendered by a browser or the like on the user device. Optionally, the application may be configured to request various services (e.g., taxi, towing, repair, and/or legal services), receive service referrals from a remote system, and to detect (or enable the remote accident communication processing system to detect) whether certain contacts of the user should be notified regarding the occurrence of an accident.

The application may be provided by the accident communication processing system (or system operator) and downloaded to the user device, such as a user terminal (e.g., via an application store of a third party or via a site hosted by the accident communication processing system). By way of example, the user terminal may optionally be a mobile device, such as a smartphone or tablet computer, that the user often has in their physical possession, and so is likely to have while conducting activities, such as driving, which may result in an accident. The system operator may promote and advertise the app and related services to encourage people to have the app installed on their terminals so that it is readily available to users in the event of an accident.

Figure 1:
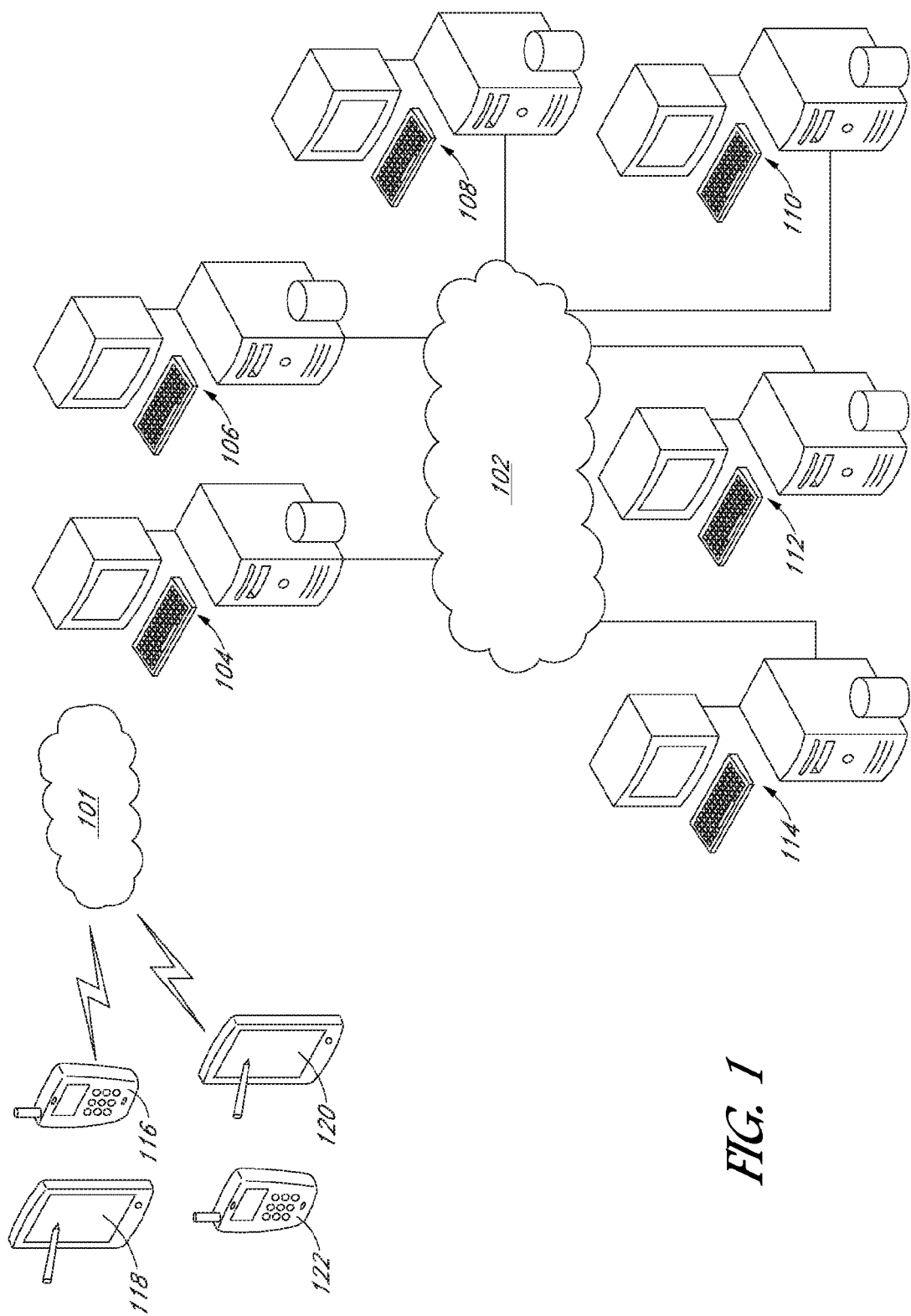
FIG. 1 illustrates an example system and operating environment.

An example embodiment of the system and an example operating environment are illustrated in FIG. 1. The system 104 may include one or more servers or other computer systems. The system 104 may optionally be a cloud-based system and may provide on-demand shared computing resources, memory resources, and/or data to one or more entities/users. The system 104 may be coupled via one or more network interfaces to a data network 102 (e.g., the Internet) and/or a telephone network 101 (e.g., a wired and/or wireless telephony network). The system 104 may be configured to communicate with user mobile terminals 116, 118 (and/or non-mobile terminals) via respective network interfaces over the telephone network 101 and/or the data network 102, as discussed in greater detail elsewhere herein. The system 104 may also be configured to communicate with one or more transportation service provider systems 106 (and optionally telephones), towing service systems 108 (and optionally telephones), repair service systems 110 (and optionally telephones), one or more emergency response systems 112 and optionally telephones (e.g., associated with police, fire departments, ambulance service providers, hospitals, etc.), one or more legal service provider systems 114 (and optionally telephones), as similarly described elsewhere herein in greater detail. The system 104 may also be configured to communicate with one or more devices 120, 122 (e.g., mobile phones or tablet computers) associated with contacts that a given user has indicated should be notified when certain conditions are detected (e.g., the occurrence of an accident or a call to an emergency service provider), as discussed elsewhere herein in great detail. The system 104 may store (e.g., via a database maintained in non-transitory memory) or have access to user profile/registration for users, as well as information (e.g., contact information, ratings, other information discussed herein, etc.) for various service providers that may provide service to users (e.g., transportation service providers, towing service providers, repair service providers, legal service providers, etc.). The system 104 may format and generate reports based upon some or all of the information received from the devices 120, 122 (e.g., user accident reports, location information, user requests for services, other information discussed herein, etc.). The reports may be transmitted to one or more recipients (e.g., attorneys, government entities, etc.). Communication between the system 104 and other electronic devices (e.g., devices 120, 122) may be encrypted to ensure privacy and security. For example, communications may be encrypted with a new ephemeral session key for each call and/or each message. Encryption may optionally utilize double-layer AES-256 and RC4-384.

Figure 2:
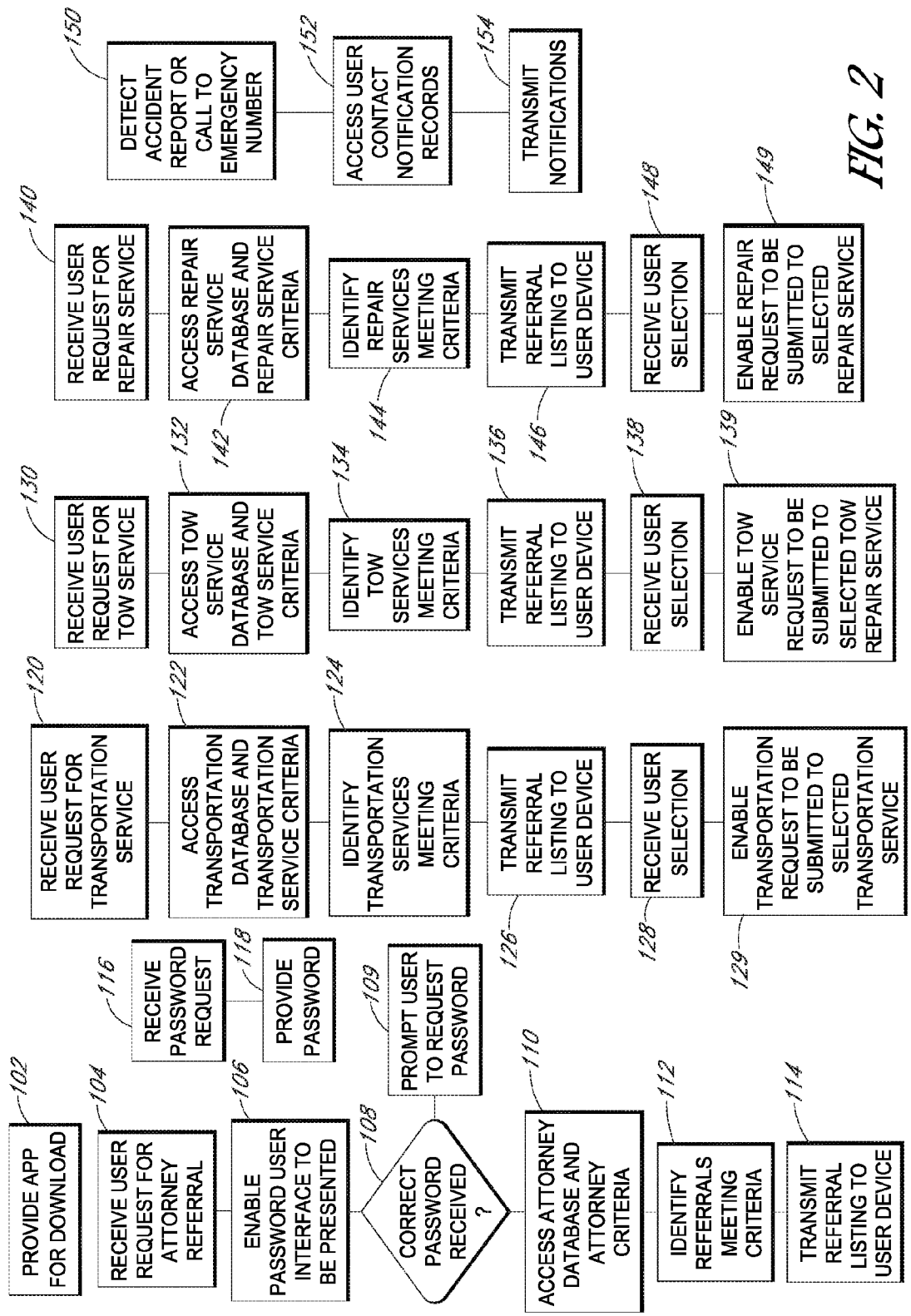
FIG. 2 illustrates example processes.

FIG. 2 illustrates several example processes, one or more of which may occur if a user is in an accident. It is understood that the various processes may occur in any order. For example, the process of requesting transportation services may occur before or after requesting an attorney referral. In addition, some or all of the process stages may be performed on a user device (e.g., via a dedicated application) or by a remote system, such as the accident communication processing system discussed above, or a combination of the user device and the remote system. At state 102, an application may be provided for download to a user device, such as a mobile phone. This state may occur prior to the user being in an accident, or the user may download the app after the accident occurs. The application ("app") may perform some or all of the functionality described herein.

An example attorney referral process will now be described. At state 104, the user requests, by activating a corresponding referral request control provided by the app, an attorney referral. At state 106, a password user interface is optionally presented by the app. At state 108, the password is received and a determination is made (e.g., by the app or by the remote system) as to whether the correct password was entered by the user and received. Optionally, the remote system (e.g., system 104 discussed above) will inhibit transmission of the attorney referral information to the app unless the user enters a password or other authentication measure via the app or the user device generally. Optionally, the user may be required to call and/or text a phone number in order to request a password. Thus, at state 109, the user may be prompted to request a password (e.g., a code). At state 116, the system receives a password request (e.g., via a voice or text request). At state 118, the system provides the user with a password (e.g., via voice or text).

If the correct password is received, the process proceeds to state 110, where the system accesses a database of attorney records and attorney referral criteria. For example, the attorney referral criteria may include some or all of the following: practice specialty, location relative to a user's current location and/or home location (e.g., accessed from the user's account information), performance ratings provided by the system operator, performance ratings provided by other users, ratings/feedback provided by a state bar, ratings/feedback provided by an independent rating agency, whether the attorney has retained advertising rights for the user's current location and/or home location, an indication as to the type of accident the user is reporting (e.g., whether the user is reporting a vehicular accident, a workplace accident, injury, or a personal accident, so an attorney with a particular skill or specialty corresponding to the accident type may be selected) other information provided by the user, and/or other criteria.

At state 112, the system may use the information from the attorney records, optionally from the user device (e.g., location information), and optionally from the user's profile information, to select one or more attorneys to refer the user to. At state 114, information (e.g., contact information, rating information, and/or other information accessed from the database) regarding one or more of the selected attorneys may be transmitted to the user for presentation by the app on the user's device. Optionally, the user may select a given listed attorney, and the system may facilitate communication between the user and the attorney. For example, the system may transmit some or all of the information provided by the user regarding the accident to the selected attorney, and may provide the user's contact information (e.g., mobile device phone number) so that the attorney can contact the user. Optionally, the system may also enable the user to call the selected attorney by activating a call link presented by the app in conjunction with the attorney referral.

An example transportation referral process will now be described. If, at state 120, the user requests a referral to a transportation service, the process proceeds to state 122. The system accesses a database of transportation service provider (e.g., taxi companies) records and transportation service provider referral criteria. For example, the referral criteria may include one or more of the following: the location of the service or the services' taxis relative to the user's current location (e.g., within a specified or determined range, such as 1 mile, 2 miles, or other distance, where the range is optionally specified by the system operator for a given service provider or class of service providers via an administrative user interface) or home location (as provided by the user when registering with the system), rates, performance ratings provided by the system operator, ratings provided by other users, ratings/feedback provided by a state agency, ratings/feedback provided by an independent rating agency, which service has retained advertising rights for the user's current location and/or home location, and/or other criteria. At state 124, the system may use the information from the records, optionally from the user device (e.g., location information), and optionally from the user's profile information to select one or more transportation services to refer the user to. At state 126, information (e.g., contact information, rating information, and/or other information accessed from the database) regarding one or more of the selected transportation may be transmitted to the user for presentation by the app on the user's device.

At state 128, the user's selection of a listed transportation service may be received. At state 129, the system or app enables a transportation request to be submitted to the user-selected transportation service. For example, the app or system may transmit a transportation request message to the user selected transportation service. The user selected transportation service may be provided with the request via a user interface (e.g., on an administrative portal), the request optionally including some or all of the following: the user's current location (as determined from location information received from the user device), the user's desired destination, and contact information for the user (e.g., a phone number associated with the user device, an email address, etc.). The transportation service may then send a vehicle to pick up the user at the corresponding location. Optionally, the user is requested to confirm the pickup occurred and to rate the transportation service, and such confirmation (or lack thereof) and review may be stored by the system. The confirmation or lack thereof may be used by the system in rating the transportation service.

An example tow service referral process will now be described. If, at state 130, the user requests a referral to a tow service, the process proceeds to state 132. The system accesses a database of tow service provider records and tow service provider referral criteria. For example, the referral criteria may include one or more of the following: the location of the service or the services' tow trucks relative to the user's current location (e.g., within a specified or determined range, such as 1 mile, 2 miles, or other distance, where the range is optionally specified by the system operator for a given service provider or class of service providers via an administrative user interface), home location (as provided by the user when registering with the system) or the location of a repair shop (e.g., a repair show selected or specified by the user), rates, performance ratings provided by the system operator, ratings provided by other users, ratings/feedback provided by a state agency, ratings/feedback provided by an independent rating agency, which service has retained advertising rights for the user's current location and/or home location, and/or other criteria. At state 134, the system may use the information from the records, optionally from the user device (e.g., location information), and optionally from the user's profile information to select one or more tow services to refer the user to. At state 136, information (e.g., contact information, rating information, and/or other information accessed from the database) regarding one or more of the selected tow services may be transmitted to the user for presentation by the app on the user's device.

At state 138, the user's selection of a listed tow service may be received. At state 139, the system or app enables a tow request to be submitted to the user-selected tow service. For example, the app or system may transmit a tow request message (e.g., provided to the user selected tow service via an administrative portal user interface and/or via a text message to the user selected tow service), the request optionally including one or more of the following: the user's current location (e.g., as determined from location information received from the user device), the user's desired destination for the user's vehicle, and contact information for the user (e.g., a phone number associated with the user device, an email address, etc.). The transportation service may then send a tow vehicle to pick up the user vehicle at the corresponding location. Optionally, the user is requested to confirm the tow occurred and to rate the tow service, such confirmation (or lack thereof) and review may be stored by the system. The confirmation or lack thereof may be used by the system in rating the tow service.

An example repair service referral process will now be described. If, at state 140, the user requests a referral to a vehicle repair service (e.g., a body shop), the process proceeds to state 142. The system accesses a database of repair service provider records and repair service provider referral criteria. For example, the referral criteria may include, the location of the relative to the user's current location (e.g., within a specified or determined range, such as 1 mile, 2 miles, or other distance, where the range is optionally specified by the system operator for a given service provider or class of service providers via an administrative user interface) or home location (as provided by the user when registering with the system), rates, ratings provided by other users, ratings/feedback provided by a state agency, ratings/feedback provided by an independent rating agency, which service has retained advertising rights for the user's current location and/or home location, and/or other criteria. At state 144, the system may use the information from the records, optionally from the user device (e.g., location information), and optionally from the user's profile information to select one or more repair services to refer the user to. At state 146, information (e.g., contact information, rating information, and/or other information accessed from the database) regarding one or more of the selected repair services may be transmitted to the user for presentation by the app on the user's device.

At state 148, the user's selection of a listed tow service may be received. Optionally, a field is provided via which the user can provide a description of the damage to the user's vehicle. At state 149, the system or app enables a repair request to be submitted to the user-selected repair service. For example, the app or system may transmit a service request message to the user selected repair service (e.g., provided to the user selected repair service via an administrative portal user interface and/or via a text message to the user selected repair service), the request optionally including some or all of the following: the user's current location (as determined from location information received from the user device), the user's description of the damage to the user's vehicle, and contact information for the user (e.g., some or all of the following: a phone number associated with the user device, an email address, etc.). The repair service may optionally then send a confirmation message to the user (optionally via the system), confirming the request was received, and optionally provide an estimate on how long it will take to repair the vehicle (e.g., a completion date). Optionally, the repair service calls or texts the user to coordinate the repair and related logistics. Optionally, the user is requested to rate the repair service, where the request may optionally be provided to the user (e.g., via the app, email, or text message) after the estimated completion date.

As noted above, the application and/or system may be configured to detect an accident event and to notify contacts specified by the user regarding the accident. For example, at state 150, the application or the remote system may detect that the user has initiated a call to an emergency service (e.g., to a 911 number) or is reporting an accident (as described elsewhere herein). At least partly in response, the process may proceed to state 152, and contact notification records, previously defined or selected by the user, may be accessed. The contact notification records may include the names and contact information (e.g., mobile phone number, landline phone number, and/or email address) of people or companies who should be notified if an accident involving the user occurs.

At state 154, the notifications may be transmitted to the contact(s). The notifications may be provided via a user interface on an instantiation of the application on a device of a notification recipient, via a text message, and/or via an automated voice call to the recipient as similarly described elsewhere herein. The notifications may include the name of the user, the event type (e.g., automobile accident, arrest, personal injury, workplace accident), and/or the event location (e.g., via a map and/or address). The notification may optionally include a "contact user" control, which when activated will cause the application on the recipient's device to automatically place a call to the user, and/or will automatically open up a text message entry interface configured to receive a text message for the recipient, where the text message is automatically addressed to the user. Optionally, the user will be notified as to who received the notification, and optionally when they received the notification. Optionally, a user interface is provided enabling the user to transmit a subsequent notification to the recipients indicating that the emergency has passed. Further examples of notifications are discussed elsewhere herein.

Figure 9:
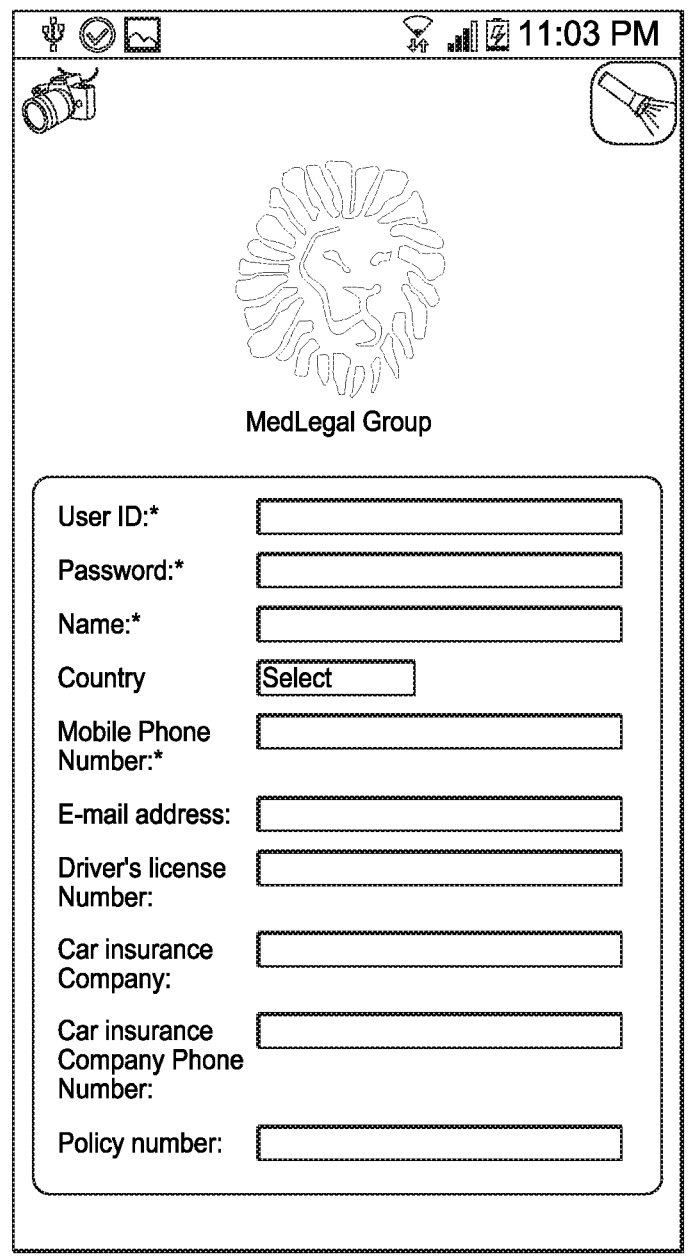
FIG. 9 illustrates an example user interface.

A user may register with the system 104 before or after downloading the app (and optionally the user may be able to register via a registration interface provided by the app). As part of the registration process, the user may provide information such as some or all of the following: a user ID, a user password, the user's name, country, home address, business address, email address, SMS address, mobile phone number, landline address, driver's license number, car license plate number, insurance provider, insurance provider contact information, insurance policy number, and/or other information, including other information that may be useful in the event of an accident. An example registration user interface is illustrated in FIG. 9. Optionally, at least a portion of the user's registration information may be obtained from an application site (e.g., an app store) from which the user downloaded the app. For example, the user's name, phone number, and/or email address may be provided by the application site from its user account data store and used to prepopulate one or more fields in a user registration record. Optionally, at least a portion of the user's registration information may be obtained using a user device camera which captures a photograph of at least a portion of a document (e.g., a driver's license, other state identification card, other ID, etc.). For example, a document barcode that encodes certain information (e.g., a user name, contact information, driver's license/state identification card number, expiration date, etc.) may be photographed using a user device and decoded to obtain registration information which may be used to prepopulate one or more fields in a user registration record. By way of further example, if the document includes human readable text (e.g., a user name, contact information, driver's license/state identification card number, expiration date, etc.), optionally the document may be photographed using a user device, and the photograph may be analyzed using OCR (optical character recognition) software to recognize the text, which may be used to prepopulate one or more fields in a user registration record. Optionally, the registration information will be presented to the user via the user device in an editable form, and the user may edit some or all of the registration information, and may activate a save control to cause the edited registration information to be stored and used in the future. For example, a link may be provided to the user in an email, text message, or app interface, which when activated, causes a webpage to be accessed and displayed that includes the registration information in an editable form.

Figure 3C:

A ringtone may be downloaded in conjunction with the app. For example, the ringtone may be unique to the system 104 operator and will be used as audible notification for calls from the system operator, so that calls from the system operator may be easily and instantly recognizable by the user. The app may provide one or more screens comprising user interfaces. For example, a home screen, such as that illustrated in FIG. 3A, may be provided that includes an emergency communication control, which when activated causes the user terminal to establish a communication channel (e.g., voice, text, or otherwise) with an emergency service provider (e.g., police and/or ambulance), a control to initiate communications, controls to access referrals to one or more of taxi services, tow truck services, repair services, etc. A control may also be provided which enables a user to access a service via which the user can identify one or more contacts who are to be notified in the event an indication is received that the user has been involved in an accident.

The home screen may also include one or more tools controls, as illustrated in greater detail in FIG. 3B. A personal data control may be provided enabling the user to access and edit profile information of the user. A photo control may be provided, which when activated causes, causes photograph controls to be provided for display via which the user can cause the user terminal to capture photographs, videos, and/or audio (without a video component) of the accident, participants, witnesses, and/or of documents (e.g., of the driver's license or insurance card of the other party involved in the accident), and store the photographs/videos in memory in association with time/date and location information (e.g., GPS location information, an address entered by the user textually, a location entered by the user via a map (e.g., where the user touches a location on an electronic map corresponding to the accident location, and an indicator (e.g., a pin icon) is displayed by the app at the location touched by the user, and where the user may use a finger gesture to expand and/or move/change the area displayed on the map)). An audio recording control may be provided enabling a person (e.g., a witness or accident participant) to record an audio statement without recording a video of the person.

An interface may be provided to enable witnesses and/or those involved in the accident to sign a video statement (that includes both video image and audio components) and/or an audio statement (without a video component). A signature user interface may be provided configured to receive a signature (e.g., a witness or participant signature) via touch, where the signer may use a finger or stylus to sign in script or using print letters. The signature user interface may also include fields configured to receive (e.g., via a keyboard or voice entry) the signer's name and/or contact information (e.g., phone number, physical address, and/or email address). The photographs/videos/audio and/or associated information (e.g., location information, signatures, contact information, other information discussed above, etc.) may be transmitted to the remote system, optionally in an encrypted and/or compressed format.

A flashlight control may be provided which when activated causes a light on the user terminal to illuminate for purposes of taking a picture, for viewing documents, such as insurance card information, etc. A message control may be provided via which the user can view messages to the user from contacts to whom accident notifications have been transmitted to on behalf of the user (e.g., messages responding to the accident notification). A session end control may optionally be provided, which when activated by the user causes the application to close. The photo control and/or the flashlight control may be provided on some or all the other user interfaces discussed herein.

User activation of the emergency communication control may cause the user terminal to initiate a call to a 911 number. Optionally, activation of the emergency communication control causes a user interface, such as that illustrated in FIG. 3C, to be presented. The example user interface illustrated in FIG. 3C includes a phone address field prepopulated with an emergency phone number (911 in this example). The user can activate a call command control and the emergency phone number will be dialed, or the user can manually enter a number to be called, or the user can access a number to be called from the user's contact list (e.g., a "favorites" contact list).

Referring back to FIG. 3A, the home screen may also include an accident communication processing system control, which when activated may present the user with several communication options, such as the option to initiate a call/voice communication with a voice recognition system associated with the accident communication processing system or a human agent, the option to initiate a text message communication with a text parsing system associated with the accident communication processing system or a human agent, or a professional, such as a lawyer (e.g., a personal injury lawyer that handles accident related claims for victims), associated with the accident communication processing system. The accident communication processing system control will be discussed in greater detail elsewhere herein.

Figure 3D:
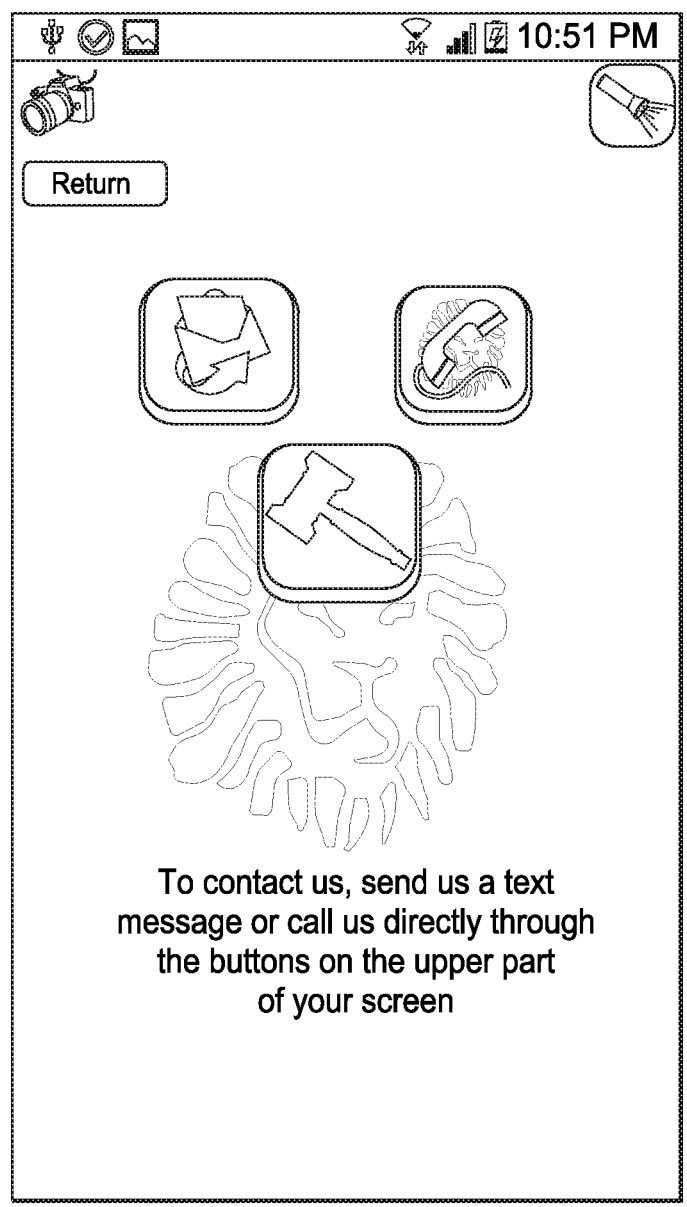

If the user activates the accident communication processing system control, a user interface, such as that illustrated in FIG. 3D, may be presented. A text message control is provided, which when activated causes a text message interface to be provided for display via which the user can enter and transmit a text message related to the accident to the remote system. A toll free voice control is provided, which when activated causes a toll free call to be placed via the user terminal to the remote system or a human agent associated with the remote system, enabling the user to report the accident and initiate an accident handling process. An attorney control is provided which when activated causes an agency or attorney user interface, such as that illustrated in FIG. 3E, to be presented on the user terminal.

Figure 3E:
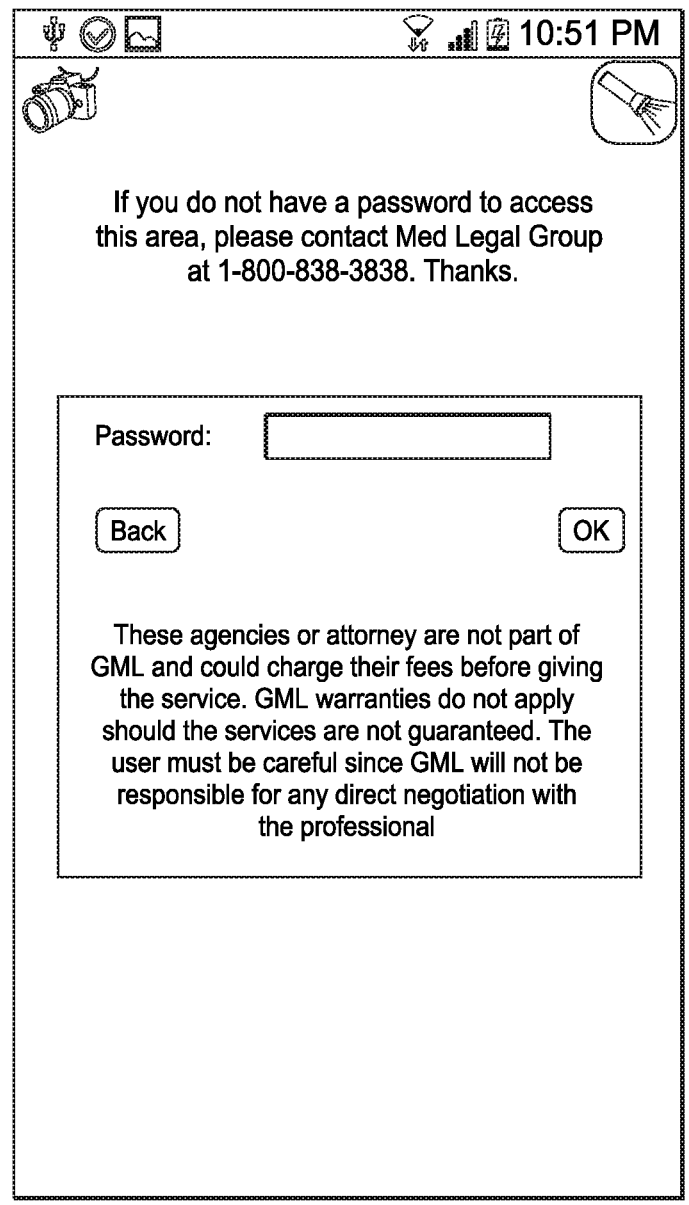

Referring to FIG. 3E, a password field is provided via which the user is to enter a password in order to access certain additional related user interfaces, such as those related to attorney referrals. In this example, the user is instructed to contact the remote system or an agent associated with the remote system via voice and/or text message to obtain the password, although the password may be provided using other techniques. The user is optionally informed that the agencies or attorneys being referred to or listed are not employees or contractors of the system operator and the agencies or attorneys may charge for their service and the system operator is not guarantying the performance of the agency or attorney. At least partly in response to the user entering the correct password, the app displays one or more additional interfaces.

Figure 3F:
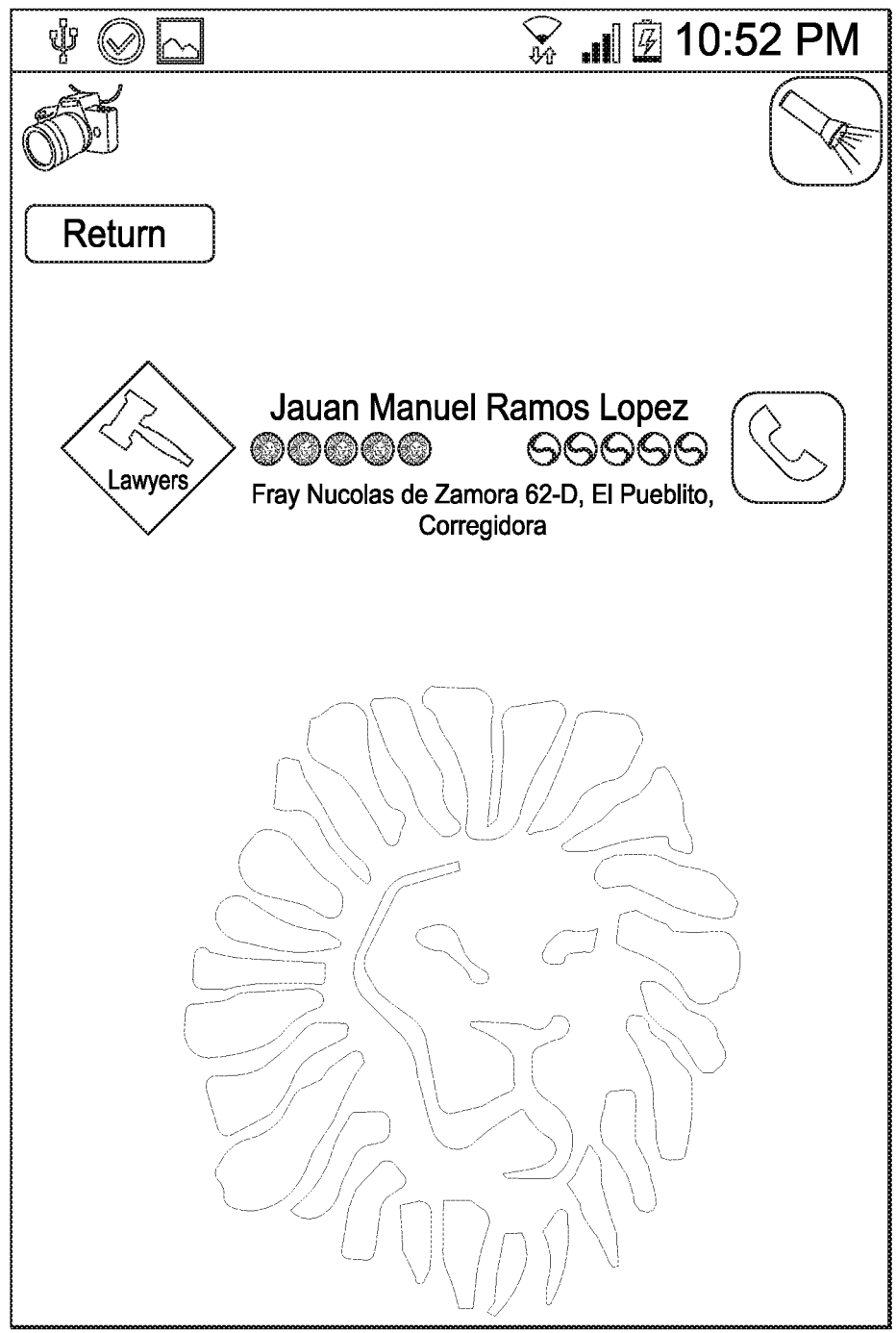

For example, the user interface illustrated in FIG. 3F may be presented, providing one or more entries including the name and optionally contact information (e.g., phone number, email address, physical address, etc.) of one or more agencies and/or attorneys that handle accident claims to whom the user may be referred to. The entries may be dynamically generated by the remote system, and transmitted from the remote system to the user terminal for display via the user interface. Optionally, a given entry may include rating information (e.g., a star rating, a point rating, a ranking relative to the agencies or attorneys, etc.) providing an indication as to the attorney's/agency's past performance. Optionally, a call control is provided in association with an entry which when activated by the user causes a call to be placed to a corresponding agency or attorney. The call may be routed via the system. For example, activation of the call control may cause the user terminal to place a call to the system, and the system will place an outcall to the agency or attorney, and then bridge the call from the user terminal and the outcall. Optionally instead, activation of the call control may cause the system to place a first outcall to the user terminal and a second outcall to the agency or attorney, and then bridge the first outcall and the second outcall (other calls placed via the app may optionally be similarly routed through the system). Optionally instead, activation of the call control may cause the user terminal to directly call a phone address associated with the agency or attorney. Other calls initiated via the app may be similarly routed using one or more of the foregoing techniques or other techniques. The system may record information regarding each call, optionally including an identification of which user initiated the call, from which terminal, to whom (and to what phone address) the call was placed, an indication as to whether the call was successfully completed, and/or the date/time of the call.

The attorney(s) or agency(ies) presented via the user interface may have been dynamically selected and/or presented in ranked order by the system based on one or more criteria. For example, the criteria may optionally include one or more of the following: a determined practice specialty, location relative to the user's current location and/or home location (e.g., accessed from the user's account information), performance ratings provided by the system operator, performance ratings provided by other users, ratings/feedback provided by a state bar, ratings/feedback provided by an independent rating agency, whether the attorney has retained advertising rights for the user's current location and/or home location, and/or other criteria.

Optionally, a bar call control is provided which, when activated, causes a call to be initiated to the state bar or a state bar-sponsored referral entity corresponding to the user's location. The state bar or state bar-sponsored referral entity may then optionally refer the user to an attorney.

Figure 3G:

Referring back to FIG. 3A, a transportation control may be provided to obtain transportation information and/or initiate communication with a transport provider. For example, activation of the transportation control may cause a user interface to be provided for display, such as that illustrated in FIG. 3G, providing a listing of taxi services (and/or other transportation options) that have a taxi/vehicle in the vicinity of the accident (e.g., as determined by location information (e.g., GPS or Wi-Fi location information, an address entered by the user textually, a location entered by the user via a map (e.g., where the user touches a location on an electronic map corresponding to the accident location, and an indicator (e.g., a pin icon) is displayed by the app at the location touched by the user, and where the user may use a finger gesture to expand and/or move/change the area displayed on the map))) obtained from the user's terminal, and from location information associated with the taxis). Optionally, the user interface may display, for the listed transportation services, their rates and/or an estimated time for the taxi to reach the user location, and optionally ratings (e.g., overall satisfaction ratings, timeliness ratings, etc.) provided by previous users and/or the system operator, are displayed on the user terminal. The listing may be dynamically generated by the remote system, and transmitted from the remote system to the user terminal for display via the user interface. Optionally, the user interface may enable the user to enter a desired destination, which may be transmitted via the system to the listed taxi services or just a selected taxi service in conjunction with the user's phone number and/or other information. Optionally, the taxi service may call the user using the contact information to coordinate the pick-up.

Optionally, the taxi services may provide a set fee for transporting the user from their current location to the specified location. The set fee may be communicated to the user via the app, telephone voice call, or otherwise. The user may then select via the user interface a taxi service to order the taxi (e.g., via a text communication provided by the user or the system or via a voice communication by activating a call control provided via the user interface). The listed taxi services may be dynamically selected by the system or system operator based at least in part on one or more of the following: the location of the service or the services' taxis relative to the user's current location (e.g., within a specified or determined range, such as 1 mile, 2 miles, or other distance) or home location (as provided by the user when registering with the system), performance ratings provided by the system operator, ratings provided by other users, ratings/feedback provided by a state agency, ratings/feedback provided by an independent rating agency, which service has retained advertising rights for the user's current location and/or home location, and/or other criteria.

Figure 3H:
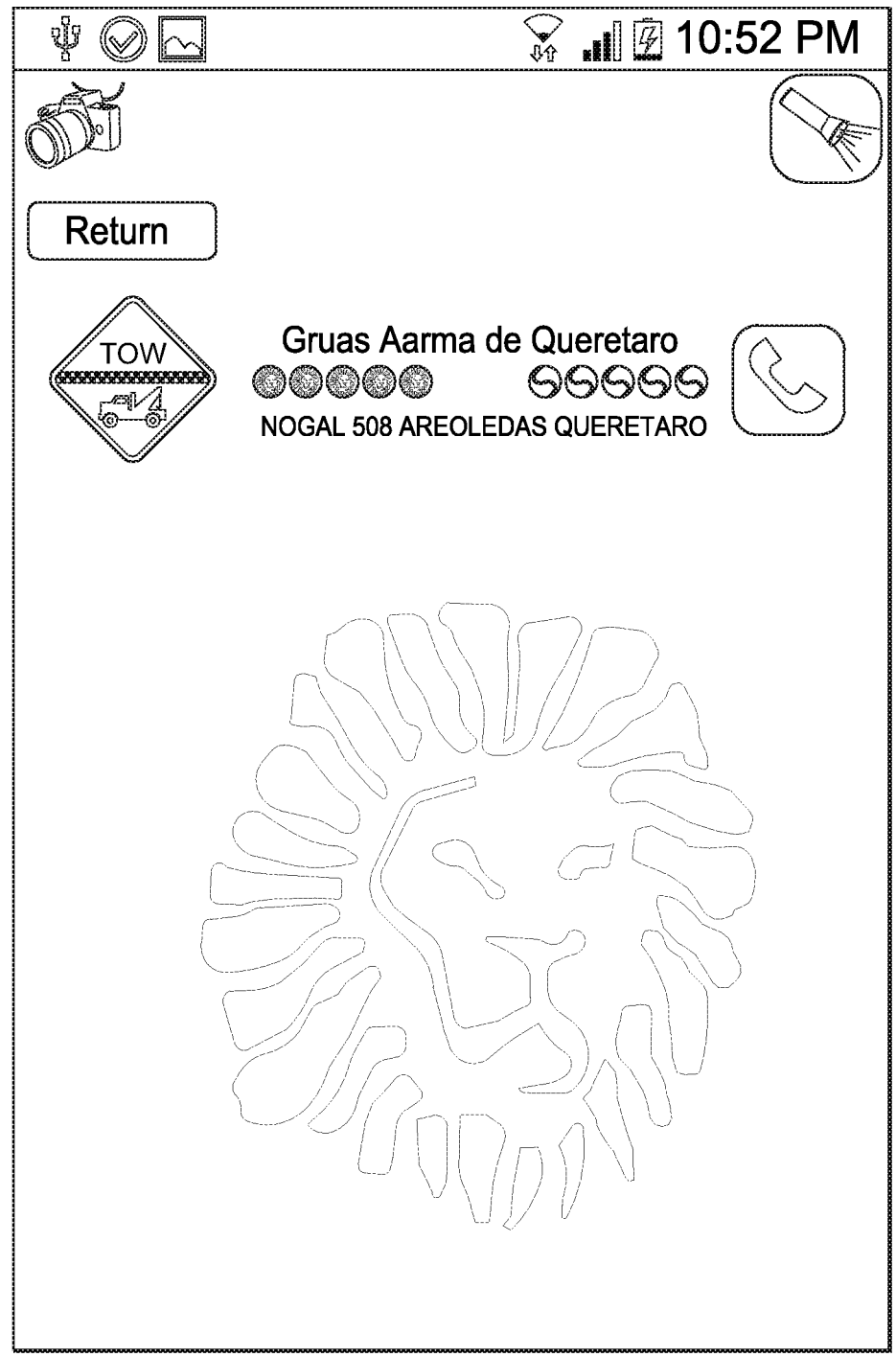
Figure 31:
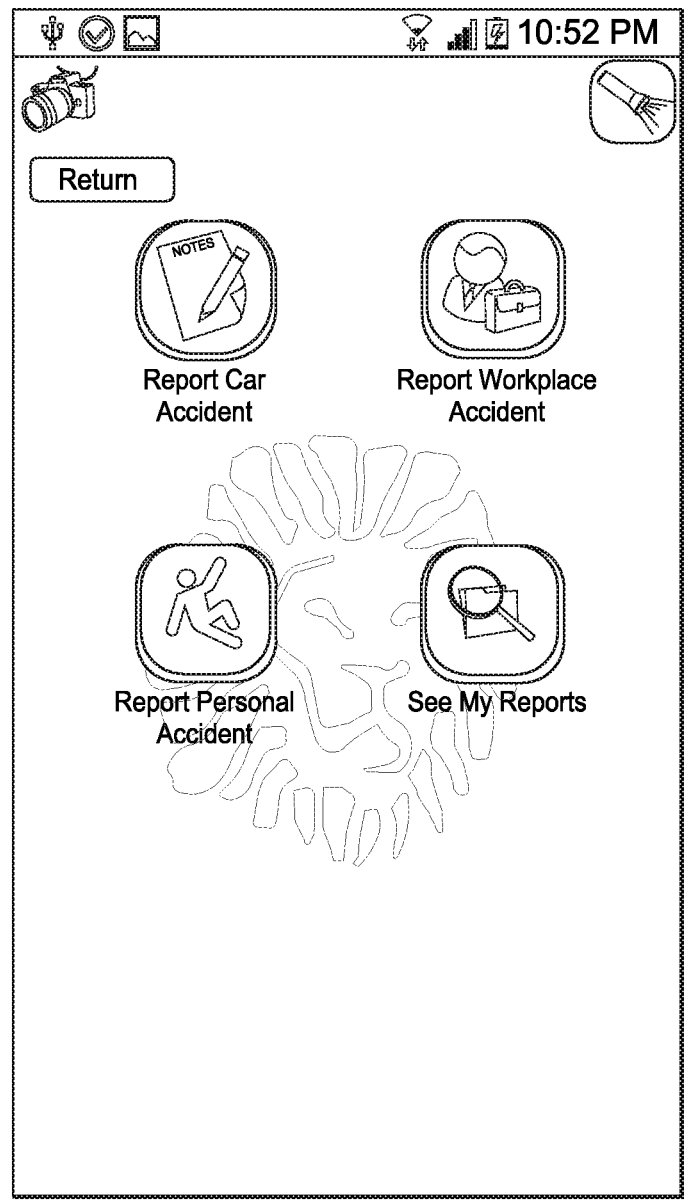

A tow service control may be provided to obtain towing service information and/or initiate communication with a towing service provider. For example, activation of the tow service control may cause a user interface to be provided for display, such as that illustrated in FIG. 3H, optionally including one or more of the following: a listing (e.g., dynamically generated by the remote system) of tow services that have a tow truck in the vicinity (e.g., within a predetermined or determined range) of the accident (e.g., as determined by location information (e.g., GPS or Wi-Fi location information, an address entered by the user textually, a location entered by the user via a map (e.g., where the user touches a location on an electronic map corresponding to the accident location, and an indicator (e.g., a pin icon) is displayed by the app at the location touched by the user, and where the user may use a finger gesture to expand and/or move/change the area displayed on the map))) obtained from the user's terminal, and from location information associated with the tow trucks), and optionally their rates and/or an estimated time for the tow truck to reach the user location, and optionally ratings (e.g., overall satisfaction ratings, timeliness ratings, etc.) provided by previous users and/or the system operator. Optionally, the user interface may enable the user to enter a desired destination, which may be transmitted via the system to the tow services or just a selected tow service. Optionally, the tow services may provide a set fee for towing the user vehicle from its current location to the specified location, which may then be communicated to the user via the app, a voice call, or otherwise. The user may then select via the user interface a tow service to order the tow truck (e.g., via a text communication provided by the user or the system or via a voice communication initiated by activating a call control). The listed tow services may be dynamically selected by the remote system based at least in part on one or more of the following: the location of the service or the services' tow trucks relative to the user's current location or home location (accessed from the user's account information), selected repair service location, ratings provided by other users, ratings/feedback provided by a state agency, ratings/feedback provided by an independent rating agency, which service has retained advertising rights for the user's current location and/or home location, and/or other criteria.

A repair/mechanics services control may be provided to enable the user to obtain body/mechanical repair service information and/or initiate communication with a body/mechanical repair service provider. For example, activation of the a body repair/mechanics services control may cause a user interface to be provided for display including a listing of body repair/mechanics services (provided by the remote system) within a predetermined or user specified distance from the user's current location, optionally their rates (which may be entered by the system operator), and optionally ratings (e.g., performance ratings provided by the system operator, overall satisfaction ratings, timeliness ratings, cost ratings, quality of repair ratings, etc.) provided by previous users. The user may then select via the user interface a repair service, and optionally the service selection is communicated to the selected repair service (e.g., via the system). The listed repair/mechanics services may be dynamically selected based at least in part on the location of the services relative to the user's current location and/or home location (accessed from the user's account information), ratings provided by other users, ratings/feedback provided by a state agency, ratings/feedback provided by an independent rating agency, which service has retained advertising rights for the user's current location and/or home location, and/or other criteria.

Optionally, if the system determines it cannot automatically identify a referral meeting corresponding referral criteria for a given service in response to a user request, the system may automatically transmit a notification to the user and/or a human operator. If there are no service options (e.g., no transportation service, tow service, repair service, no attorney that meet corresponding criteria), the system may automatically transmit a message to be presented via the user interface, stating that a representative associated with the system will contact (e.g., by voice call or text) the user to coordinate the service. The human operator may manually attempt to identify a service provider and contact the manually identified service provider to order service for the user.

A notification control is provided via which the user can enter contact information (e.g., a phone number, an SMS address, an email address, etc.) for one or more persons/entities (e.g., family, friends, employer, etc.) who are to be automatically notified by the system in the event the user reports an accident via the system, or optionally, when the user reports an accident, the list of previously contact is presented to the user and the user can select one or more contacts to whom a communication is to be provided. Optionally, after the user initially enters contact information for a given person, a notification is sent to the person, using an item of communication information entered by the user (e.g., an email or SMS address), asking the person to agree to accept accident notifications by activating a control (e.g., a link in the request or by sending an acceptance message) and/or ask the person to download and install the app on their device(s) and to cross-refer to the user. Optionally, if the person declines to accept accident notifications, the user may be so informed, and accident notifications will not be provided to that person. Optionally, the system will automatically send a second item of communication (e.g., a follow-up request) asking the person to agree to accept accident notifications if the person does not respond to the first item of communication. Optionally instead, a contact is not provided an opt-out option. The user may also remove a person from the notification contact list and/or edit a given entries' contact information via a corresponding user interface. The foregoing functionality is described in greater detail with respect to FIGS. 8A-8AC.

An accident report service control is provided via which the user can indicate the type of accident (e.g., vehicle/traffic; personal (e.g., resulting from unsafe conditions in a retail establishment, an apartment building, etc.); workplace, etc.) and provide a report verification. Activation of the accident report service control may cause example the user interface illustrated in FIG. 3I to be presented. In the example user interface illustrated in FIG. 3I, controls are provided to report different types of accidents. For example, the user interface may include controls to report a car accident, report a workplace accident, and report a personal accident. In addition, a control may be provided via which the user can access reports on accidents reported by the user. Controls may optionally be provided via which the user can access photograph controls and flashlight controls, such as those discussed elsewhere herein. Depending on the control activated, the app (or the system) selects a corresponding sequence of user interfaces to be presented to the user.

For example, if the user activates a car accident control, the example user interfaces illustrated in FIGS. 4A-K may be presented. If the user activates a workplace accident or injury control, the example user interfaces illustrated in FIGS. 5A-5F may be presented. For example, if the user activates a personal accident control, the example user interfaces illustrated in FIGS. 6A-6B may be presented. Some or all of the information collected via the various user interfaces may be transmitted and reported directly or indirectly to an attorney (e.g., via an attorney accessible administrative portal presented on an attorney terminal and controlled by the system operator which provides associated data to the attorney) selected by the user via a user interface described elsewhere herein (optionally in substantially real time after the user enters the information and selects the attorney).

Figure 7A:
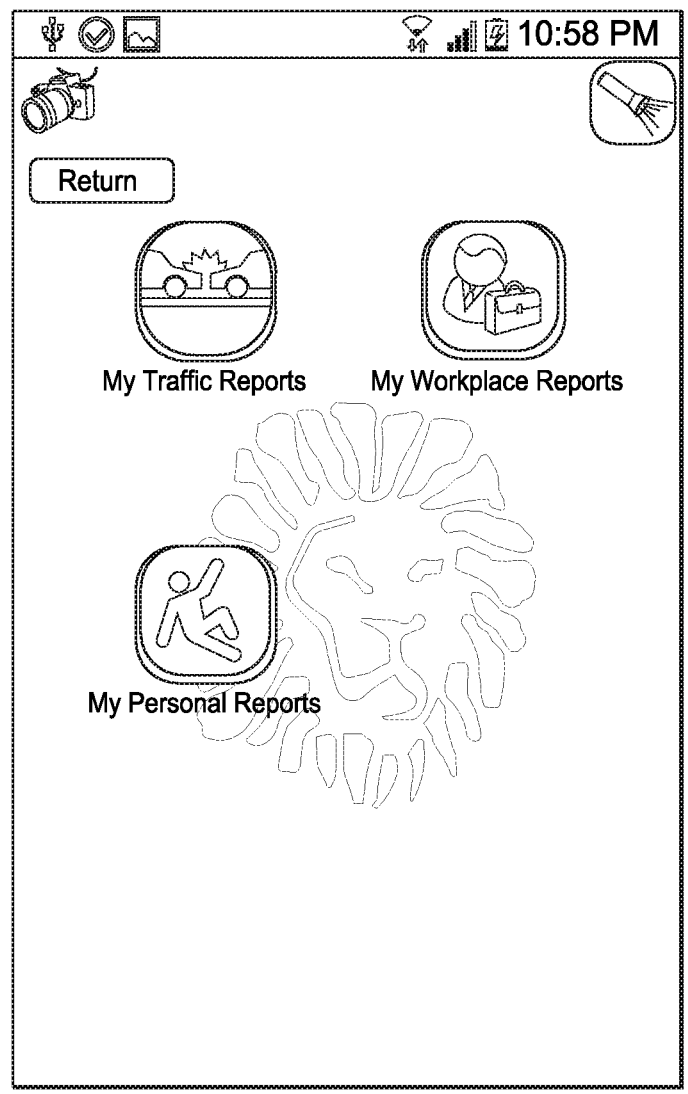
FIGS. 7A-7C illustrate example user interfaces.
Figure 7B:
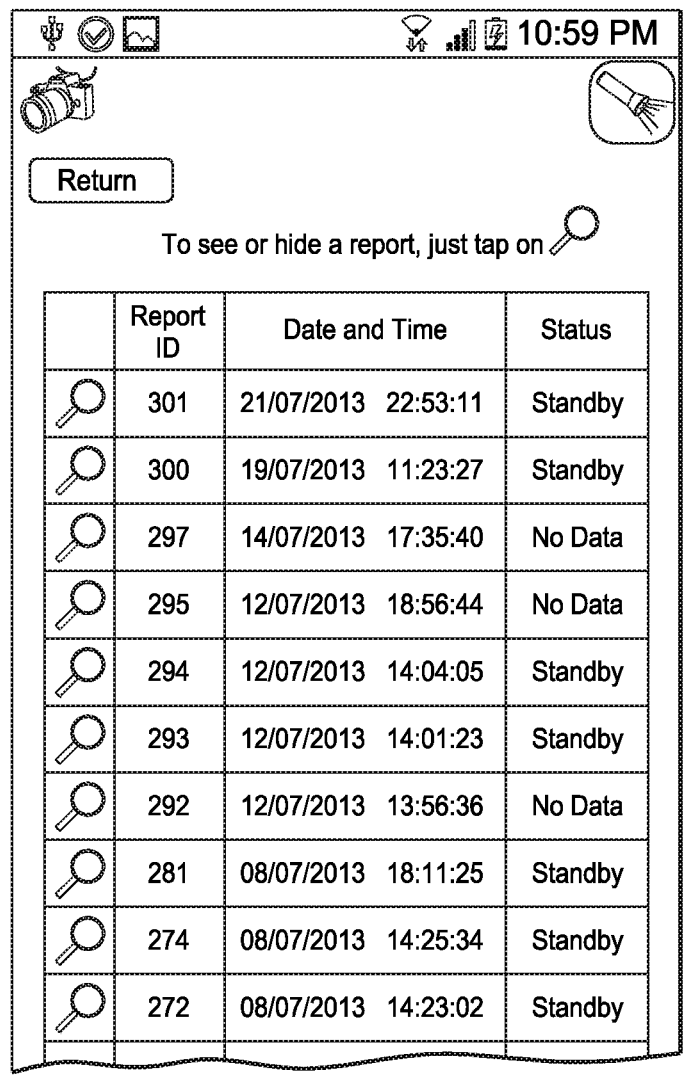
Figure 7C:
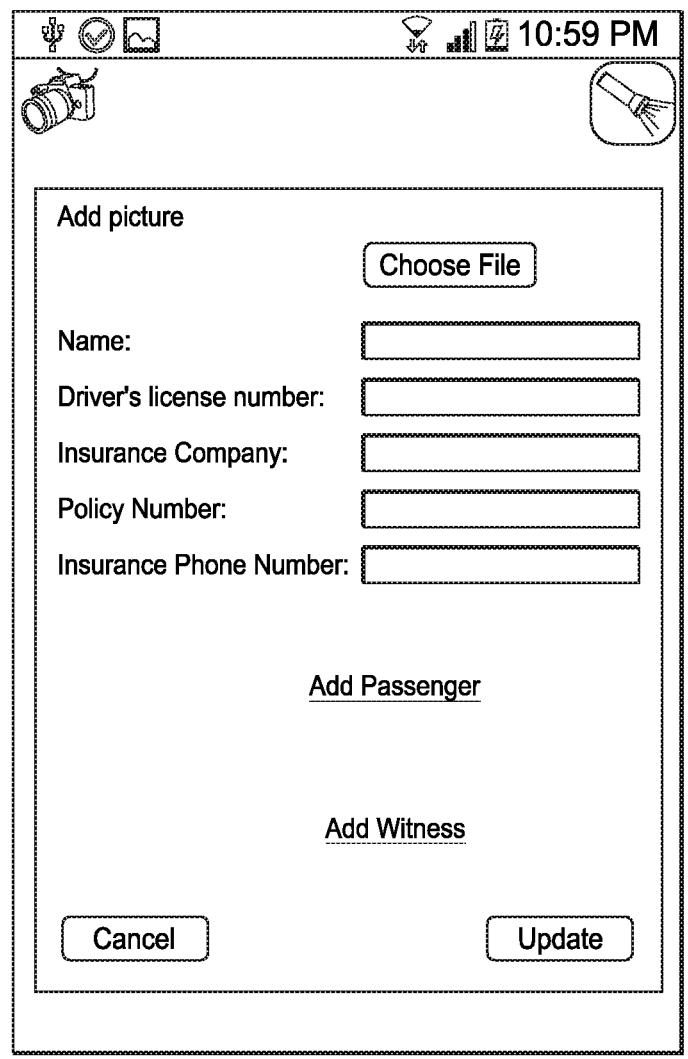

If the user activates a report control, the user interface illustrated in FIGS. 7A-7C will be presented to the user terminal.

Figure 4A:
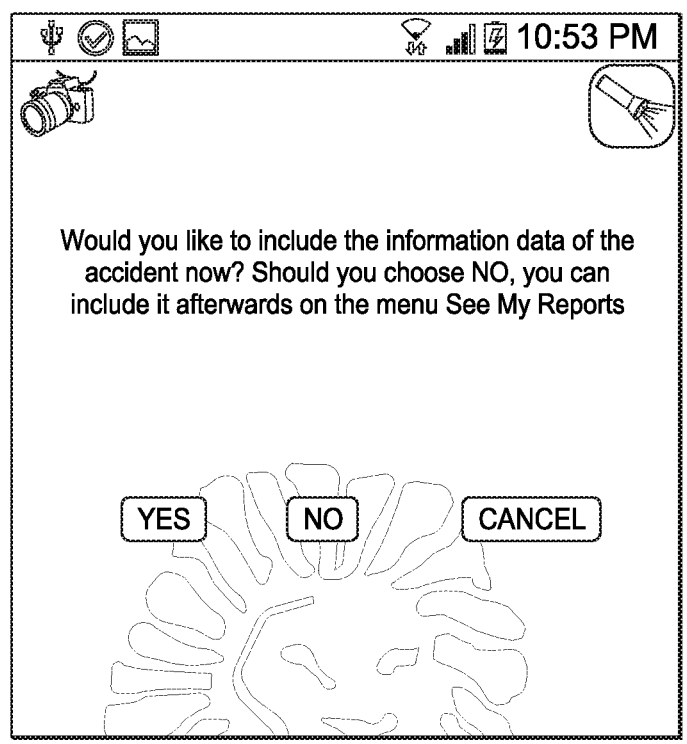
FIGS. 4A-4K illustrate example user interfaces.
Figure 4B:
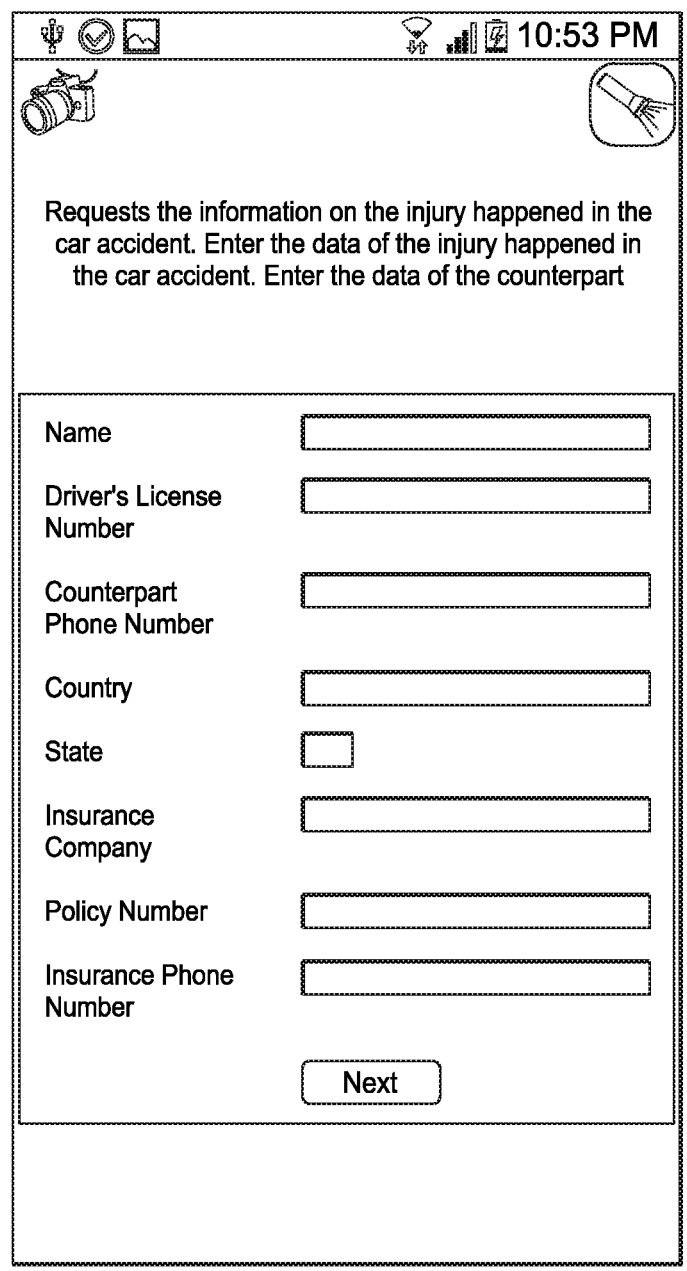
Figure 4C:
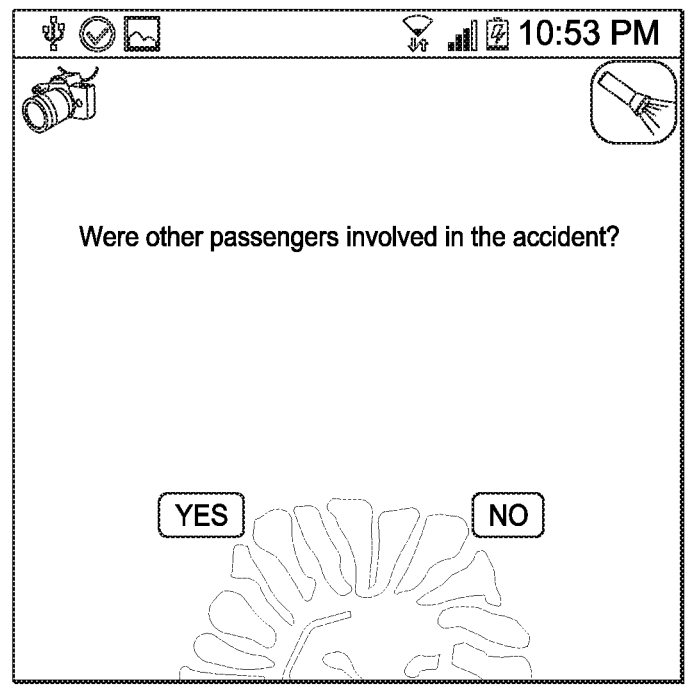
Figure 4D:
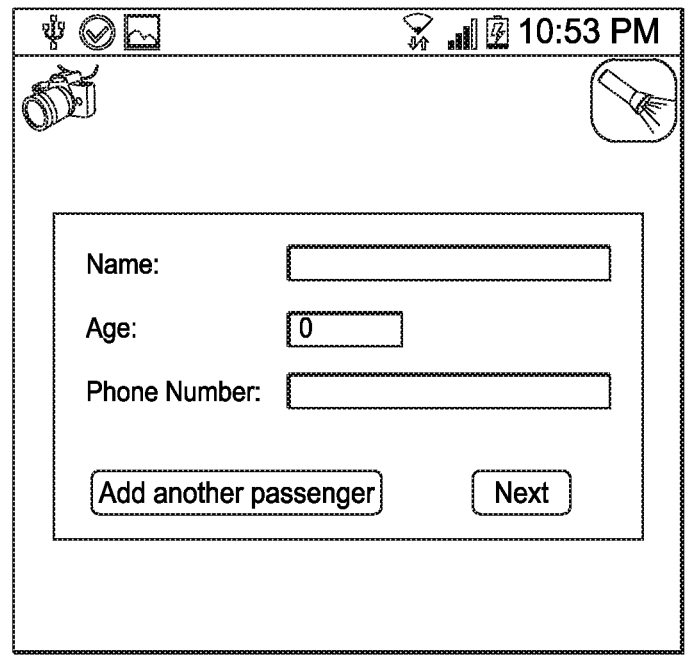

The car accident user interfaces (which may be used to report car, truck, bus, motorcycle, or other vehicular accidents) will now be discussed with reference to FIGS. 4A-K. The example user interface illustrated in FIG. 4A asks the user to indicate (e.g., by activating a corresponding user control) whether the user wants to: provide a complete report regarding the car accident via the app; have the system or an agent associated with the system contact the user (e.g., via a voice call) to collect the and enter the report information; or cancel the report altogether. If the user activates a control indicating that the user wants to provide the accident report via the app, the example user interface illustrated in FIG. 4B may be presented. Referring to FIG. 4B, fields are provided via which the user can enter information regarding the other party involved in the car accident. For examples, fields may be provided configured to receive some or all of the following information of the other party: name, driver's license number, phone number, country, state (or address information), insurance company, insurance policy number, insurance company phone number, vehicle license plate number, vehicle make, vehicle model, whether the other party was injured, and/or other information. Once the user activates an enter control, the user interface illustrated in FIG. 4C may be presented.

The example user interface illustrated in 4C prompts the user to indicate if there were any passengers (non-drivers) in the vehicle(s) involved in the accident, and if so to enter the number of passengers. If the user indicated that there were passengers, the example user interface illustrated in FIG. 4D may be presented, prompting the user to enter passenger information for each passenger, such as name, age, contact information (e.g., some or more of the following: phone number, email address, physical address, etc.). Optionally, the app may repeatedly (for as many times as the number of witnesses indicated by the user) display the user interface illustrated in FIG. 4D and receive the corresponding passenger data. Optionally, fields may be provided enabling the user to indicate if any of the passengers were injured or claimed they were injured. The user may also be prompted to indicate if any pedestrians were injured in the accident, and if so, may be prompted to provide information regarding the injured pedestrians (e.g., name, contact information, type of injury, etc.)

Figure 4E:
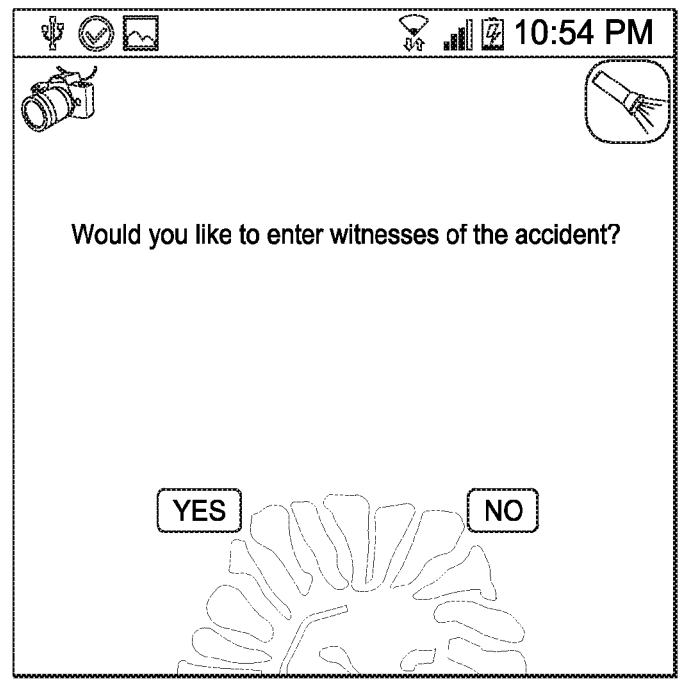
Figure 4F:
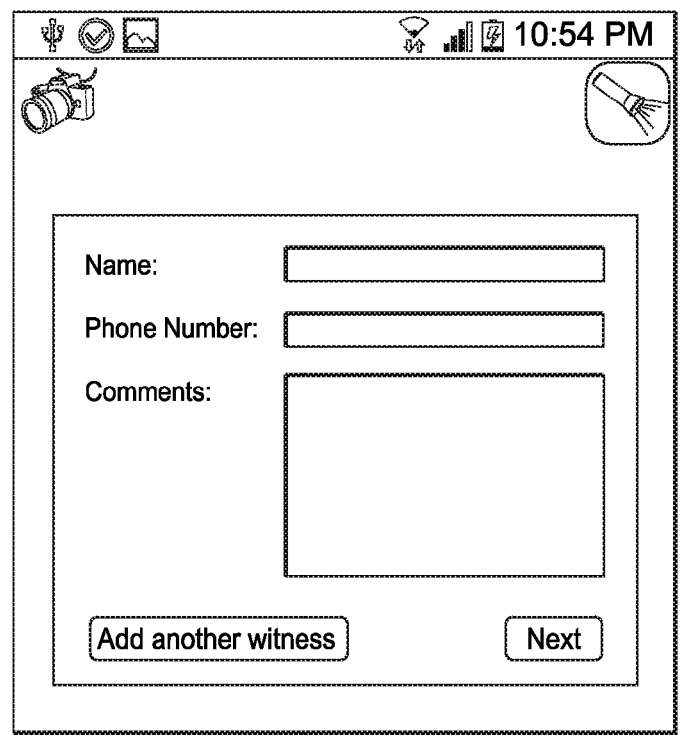

Optionally, the user may be prompted, via the example user interface illustrated in FIG. 4E, to indicate whether there are witnesses to the accident, and if so, fields are provided via the example user interface illustrated in FIG. 4F, via which the user can enter witness information via respective fields, such as some or all of the following: name, age, contact information (e.g., phone number, email address, etc.). The user may be prompted to indicate whether there are additional witnesses, and if so, additional fields are provided via which the user can enter information for additional witnesses.

Figure 4G:
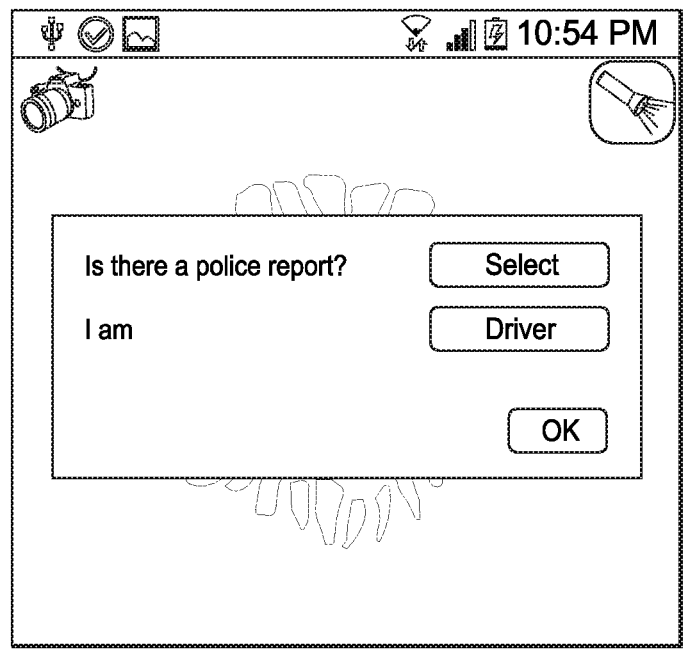
Figure 4H:
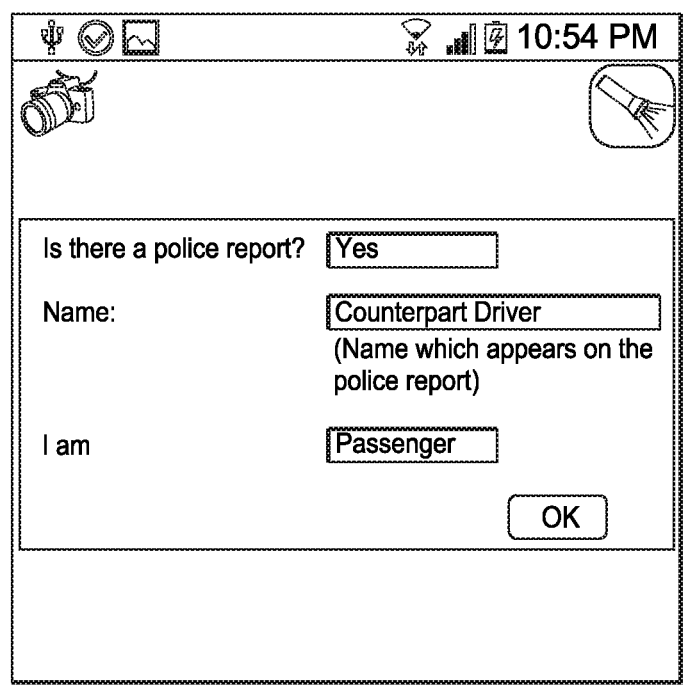
Figure 4I:
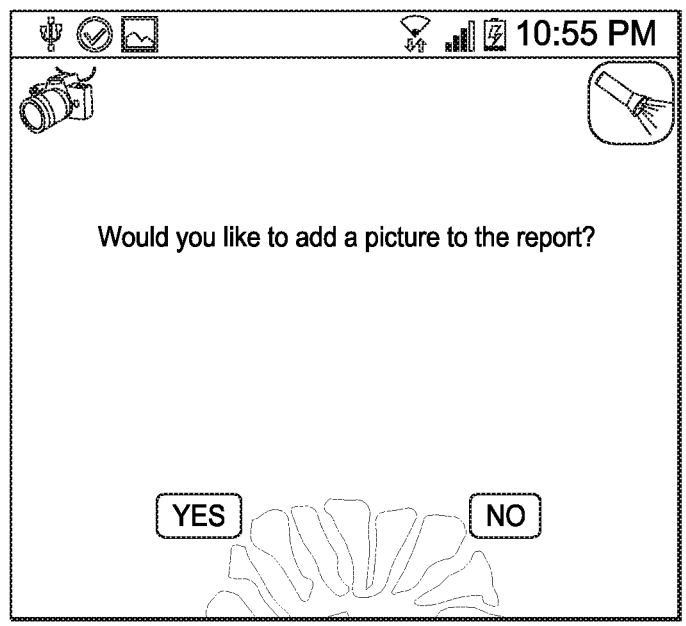
Figure 4J:
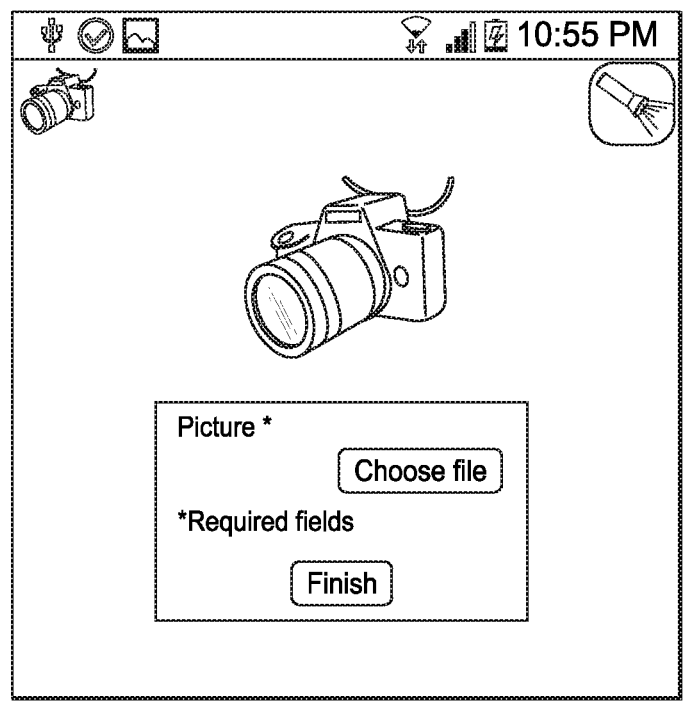
Figure 4K:
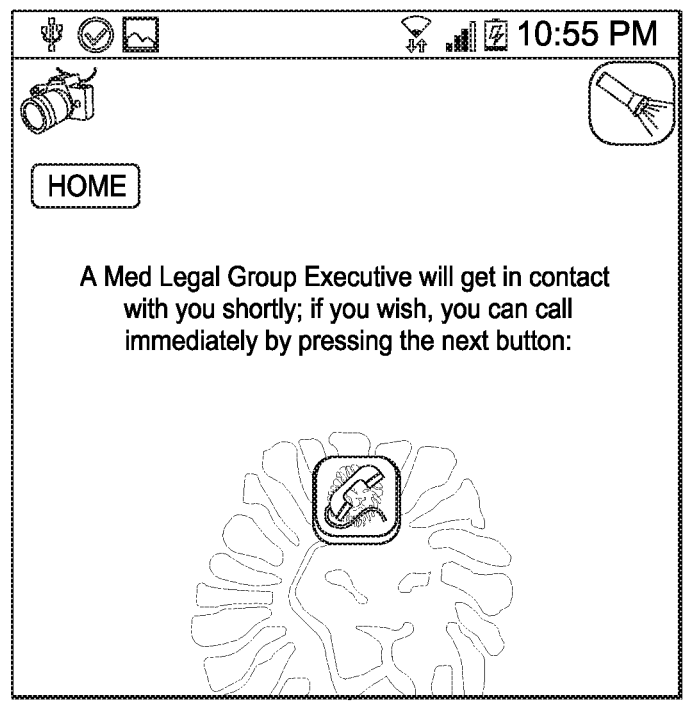

The example user interface illustrated in FIG. 4G prompts the user to indicate whether there is a police report for the accident and prompts the user to indicate whether the user is a driver or a passenger. In the example user interface illustrated in FIG. 4H, the user has indicated that a police report has been made, has indicated that the driver of the other vehicle is the first listed driver on the police report. The example user interface illustrated in FIG. 4I asks the user if the user wants to enter a photograph and/or video related to the accident (e.g., a photograph of the accident, and interview with a witness, etc.). The user can respond yes or no. If the user indicates that a photograph and/or video are to be taken, the example user interface illustrated in FIG. 4J may be presented. The user may optionally take a photograph and/or a video, or select a previously captured photograph or video. The user may then indicate that the photograph/video is to be included in the report. The example user interface illustrated in FIG. 4K may then be presented. A car map or template (e.g., showing an outline of one or more of: the left side of a vehicle, the right side of the vehicle, the front of the vehicle, the rear of the vehicle, the top of the vehicle, the bottom of the vehicle), may be provided via which the user can mark (e.g., by touching the damaged areas, using "Xs", colors, or otherwise) portions of the car to indicate the areas in which the vehicle is damaged. The user information may be transmitted to the remote system. The user may also be prompted to indicate whether the user suffered an injury in the accident, and if so, the type of injury (e.g., the body parts injured). The example user interface informs the user that the user will be contacted by the remote system or an associated agent. A control is provided via which the user can initiate a call to the remote system or an associated agent.

Some or all user inputs provided via the user interfaces described herein may optionally be transmitted to the remote system, which may record some or all of the user inputs in an account record associated with the user.

Figure 5A:
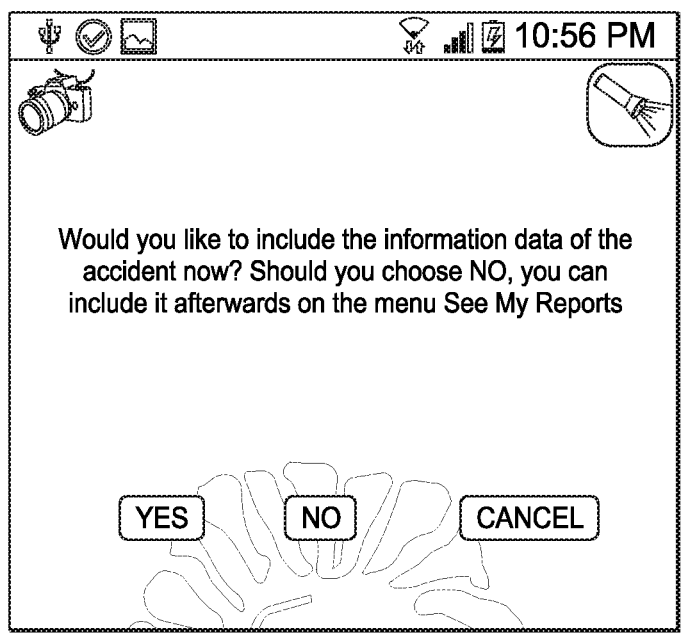
FIGS. 5A-5F illustrate example user interfaces.
Figure 5B:
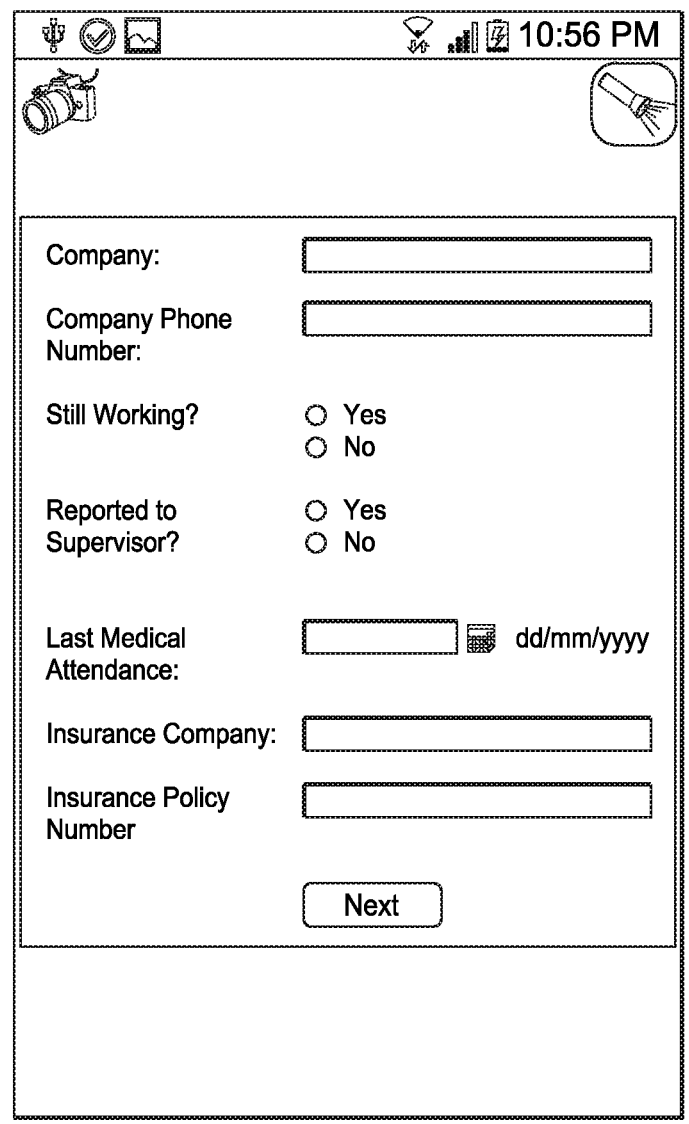
Figure 5C:
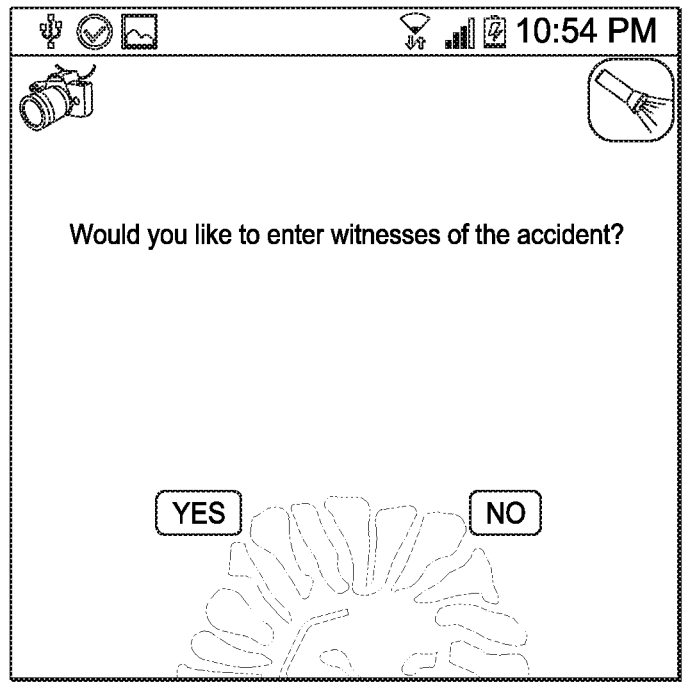

An example workplace accident report flow will now be described with reference to FIGS. 5A-5F. The example user interface illustrated in FIG. 5A asks the user to indicate (e.g., by activating a corresponding user control) whether the user wants to: provide a complete report regarding the workplace accident or injury via the app; have the system or an agent associated with the system contact the user (e.g., via a voice call) to collect the and enter the report information; or cancel the report altogether. If the user activates a control indicating that the user wants to provide the workplace accident/injury report via the app, the example user interface illustrated in FIG. 5B may be presented. Referring to FIG. 5B, fields are provided via which the user can enter information regarding the user's employer corresponding to the workplace where the accident occurred and other related information. For examples, fields may be provided configured to receive some or all of the following information: the employer's name, the employer's phone number, an indication as to whether the user is still working or not, and indication as to whether or not the user reported the accident to the user's supervisor, the date of the user's last medical appointment, the employer's and/or the user's insurance company name, the insurance company phone number, the insurance policy number, information regarding the user's injury (e.g., what part of the user was injured, how incapacitated the user is, etc.), etc. Once the user has indicated that the user has completed entering the information, the example user interface illustrated in FIG. 5C may be presented. The user is asked via the user interface whether there are any witnesses to the accident. If the user answers yes (e.g., by activating a "yes" control), the user interface illustrated in FIG. 5D may be presented. If the user answer's no, the witness related user interface may automatically be inhibited from being presented (skipped over) by the application.

Figure 5D:
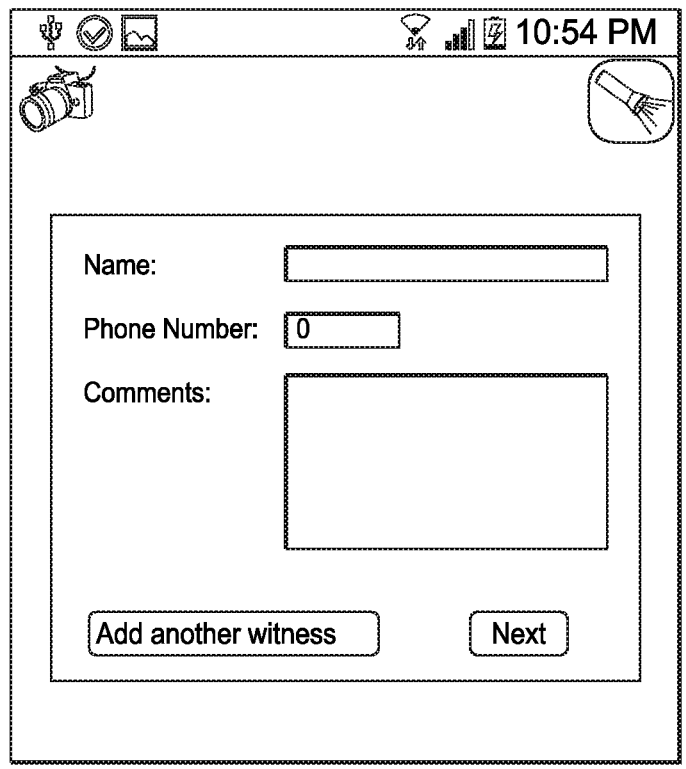
Figure 5E:
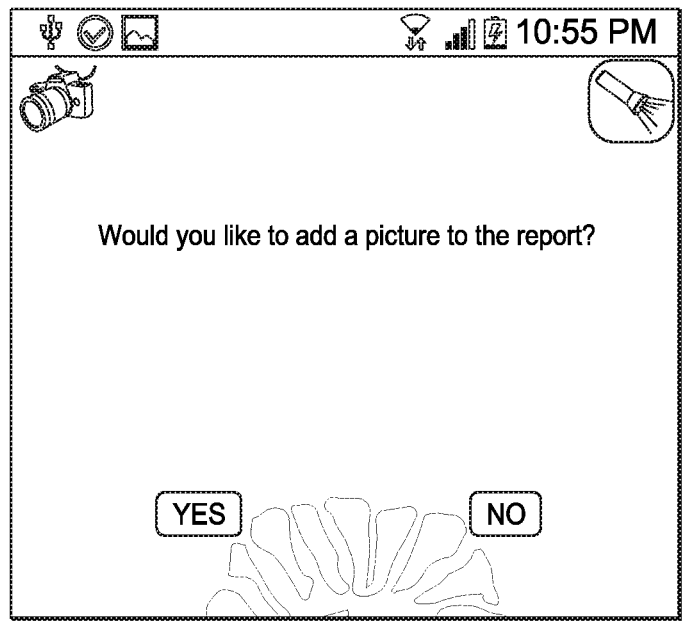
Figure 5F:
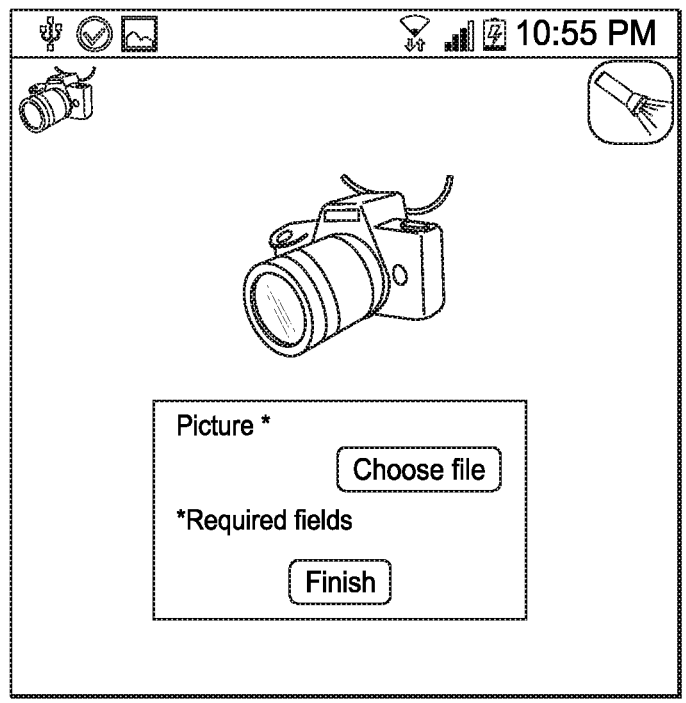

Referring to FIG. 5D, the example witness user interface may include fields for some or all of the following: name, phone number, email address, physical address, comments, etc. The user may request that the user interface be repeatedly provided for display to collect similar information regarding additional witnesses. The example user interface illustrated in FIG. 5E asks the user if the user wants to enter a photograph and/or video related to the accident (e.g., a photograph of the accident, and interview with a witness, etc.). The user can respond yes or no. If the user indicates that a photograph and/or video are to be taken, the example user interface illustrated in FIG. 5F may be presented. The user may take a photograph or video, or select a previously captured photograph or video. The user may then indicate that the photograph/video is to be included in the report. An example user interface may inform the user that the user will be contacted by the remote system or an associated agent. A control is optionally provided via which the user can initiate a call to the remote system or an associated agent.

Figure 6A:
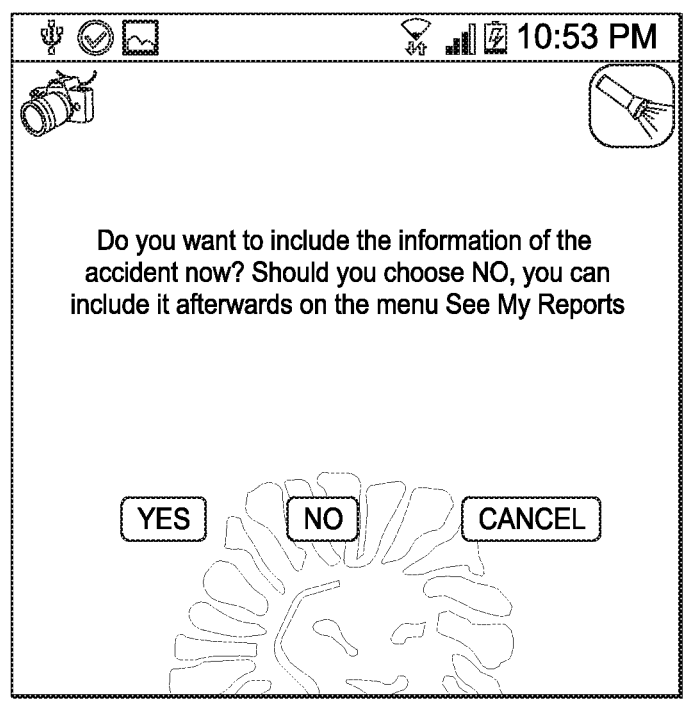

An example personnel injury accident report flow will now be described with reference to FIGS. 6A-6B. The example user interface illustrated in FIG. 6A asks the user to indicate (e.g., by activating a corresponding user control) whether the user wants to: provide a complete report regarding the personal injury accident via the app; have the system or an agent associated with the system contact the user (e.g., via a voice call) to collect the and enter the report information; or cancel the report altogether. If the user activates a control indicating that the user wants to provide the personal injury accident report via the app, the example user interface illustrated in FIG. 6B may be presented.

Referring to FIG. 6B, fields are provided via which the user can enter information regarding the location (e.g., retail establishment, apartment building, office building, etc.) where the accident occurred and other related information. For examples, fields may be provided configured to receive some or all of the following information: a location identifier (e.g., store name), the phone number, report number (if the user submitted a report to the location), an identification as to who the report was made to (e.g., name of an individual or department), phone number where the report was taken, the location insurance company, the insurance policy number, and indication as to whether an ambulance was used to take the user to a hospital, etc. A user interface may be provided asking the user whether there are any witnesses to the accident. If the user answers yes (e.g., by activating a "yes" control), a witness user interface may be provided including fields for some or all of the following: name, phone number, email address, physical address, comments, etc. The user may request that the user interface be repeatedly provided for display to collect similar information regarding additional witnesses. An example user interface may be provided which asks the user if the user wants to enter a photograph and/or video related to the accident (e.g., a photograph of the accident, and interview with a witness, etc.). The user can respond yes or no. If the user indicates that a photograph and/or video are to be taken, a user interface may be provided enabling the user to take a photograph or video, or select a previously captured photograph or video. The user may then indicate that the photograph/video is to be included in the report. An example user interface may inform the user that the user will be contacted by the remote system or an associated agent. A control is optionally provided via which the user can initiate a call to the remote system or an associated agent.

FIGS. 7A-7C will now be described with respect to providing access to reports, enabling a user to edit reports, providing lists of reports previously submitted by the user, and providing report status. Referring to FIG. 7A, the example user interface includes report access controls for the user's traffic accidents, the user's workplace accidents, and the user's personal accidents. The user may select one of the controls, and a corresponding list of reports submitted by the user may be presented, such as in the example user interface illustrated in FIG. 7B. The report list may include a report number, a remote date/time, and a status (e.g., whether the remote system has received the report, processed the report, acted on the report, etc.). If the app detects that the user clicked on a given listed report, the app may present the report, including the information previously submitted by the user, to the user. The user may then edit information in a given selected report, and save the changes (e.g., FIG. 7C).

Figure 8A:
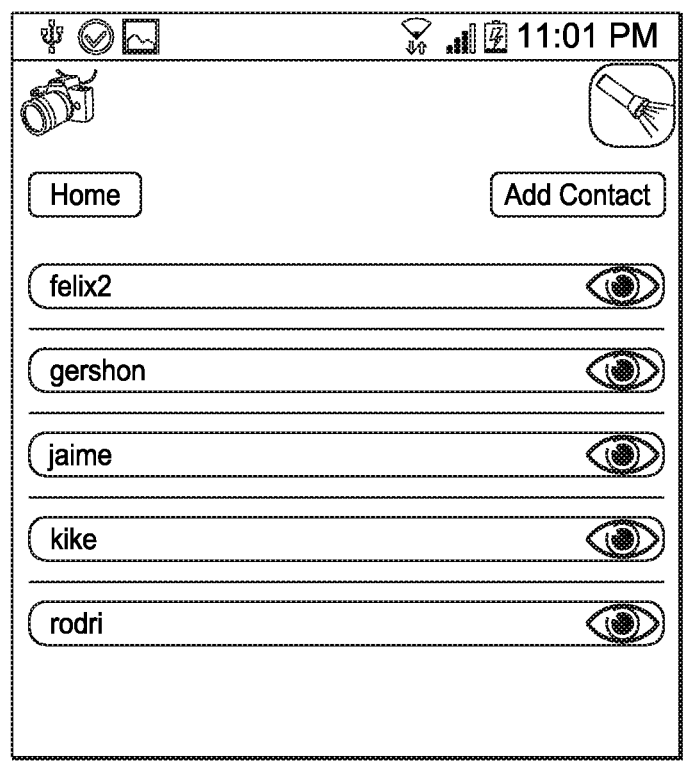
FIGS. 8A-8C illustrate example user interfaces.
Figure 8B:
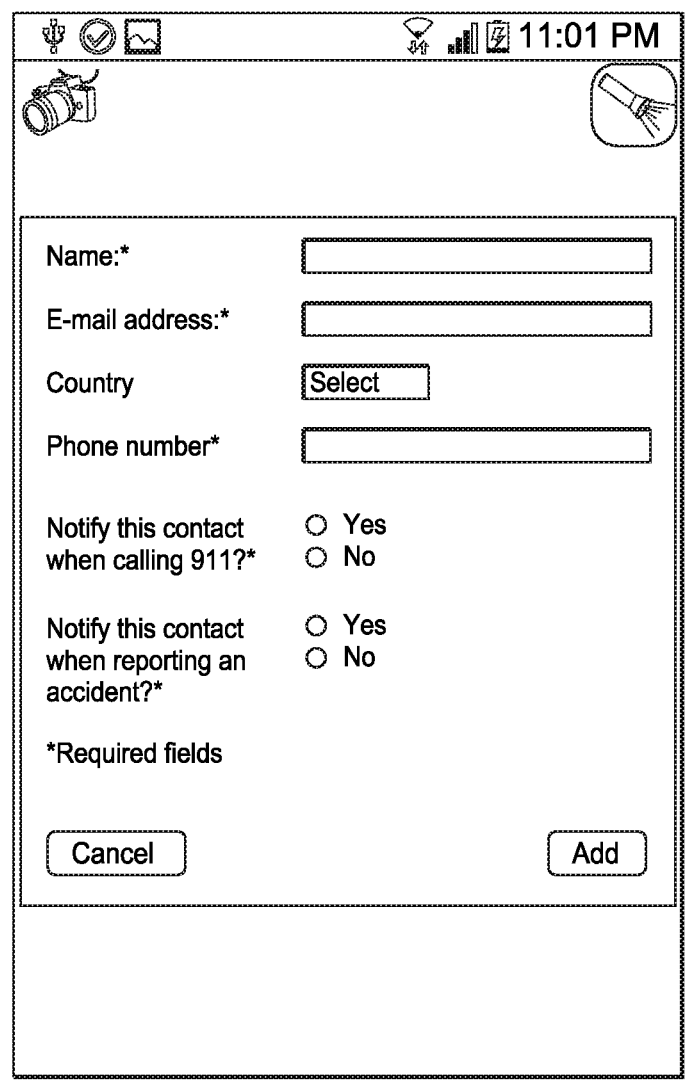
Figure 8C:
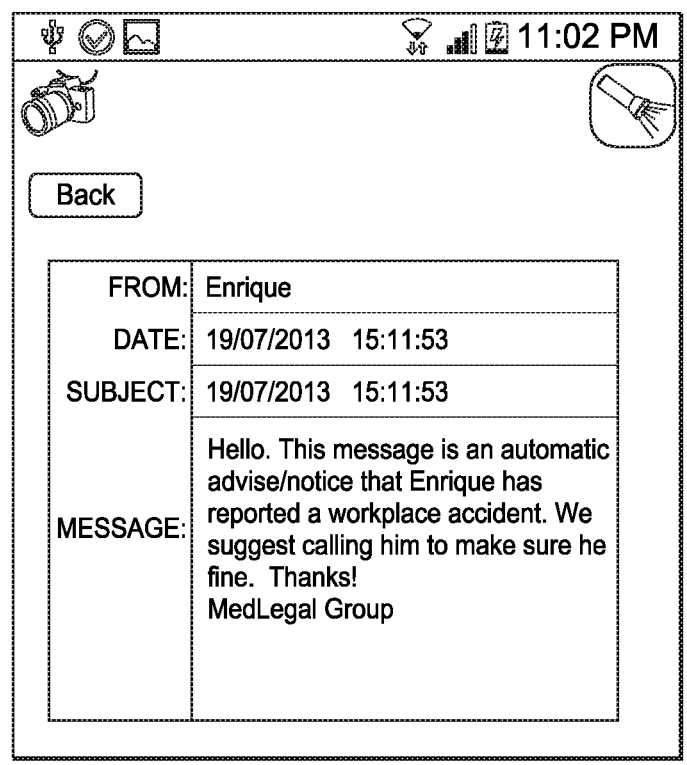

FIGS. 8A-C illustrate example user interfaces for indicating who notifications (e.g., text, email, and/or voice notification) should be sent to in the event an accident is reported and for providing user registration information. Fields are provided to enter/view the contact names. If the user activates an add contract control, the example contact entry user interface may be presented. Fields are provided via which the user may enter some or all of the following: the contact name, email address, country, phone number, mobile phone number/SMS address, an indication as to whether the contact should be automatically notified if the app/system detects that the user has initiated a call to an emergency phone number (e.g., a 911 number), an indication as to whether the contact should be automatically notified if the app/system detects that the user has reported an accident.

FIG. 8B illustrates an example message the user may enter to provide as a text notification in the event an accident report is initiated or submitted, or if the user initiates an emergency call.

FIG. 8C illustrates an example notification that may be transmitted to an emergency contact previously specified by the user in the event an accident occurs. The emergency contacts may have been manually entered by the user, selected by the user from a user contact data store, or accessed from a user's social networking or microblog page/account (e.g., after having the social networking or microblog systems obtain authorization from the user to share such contact information). The message may be transmitted as an SMS message, an MMS message, an email, and/or may be presented via an application installed on a device (e.g., a mobile communication device) of the contact. The system may customize or select the notification based at least in part on a determination as to what type of accident was reported (e.g., vehicular accident, personal accident, workplace accident), so that the message text reflects the accident type. The notification may include the user name as the sender, the user name in the subject line, the date and time of the notification (and/or the date and time the accident was reported), and the message text indicating the type of accident that occurred and suggesting that the message recipient contact the user.

FIG. 9 illustrates an example user profile user interface, which a user may complete as part of a registration process and update as needed or desired. Fields may be provide to receive some or all of the following: the user's name, phone number, email address, driver's license number, insured vehicle model, make, year, license plate number VIN, the vehicle insurance company name and phone number, the user's medical insurance company name and phone number, the medical insurance policy number, etc.

Some or all of the data and requests collected from (and about) users and/or service providers (e.g., transportation services providers, tow service providers, mechanics, lawyers, etc.) may be collected by the remote system (e.g., via a phone app) and provided for display to an administrator. Optionally, the administrator may elect the time period for which the data is to be displayed (e.g., service requests or accident reports received on the current day, the current week, the current month, or without time restrictions). Examples of such user interfaces will now be described.

Figure 10A:
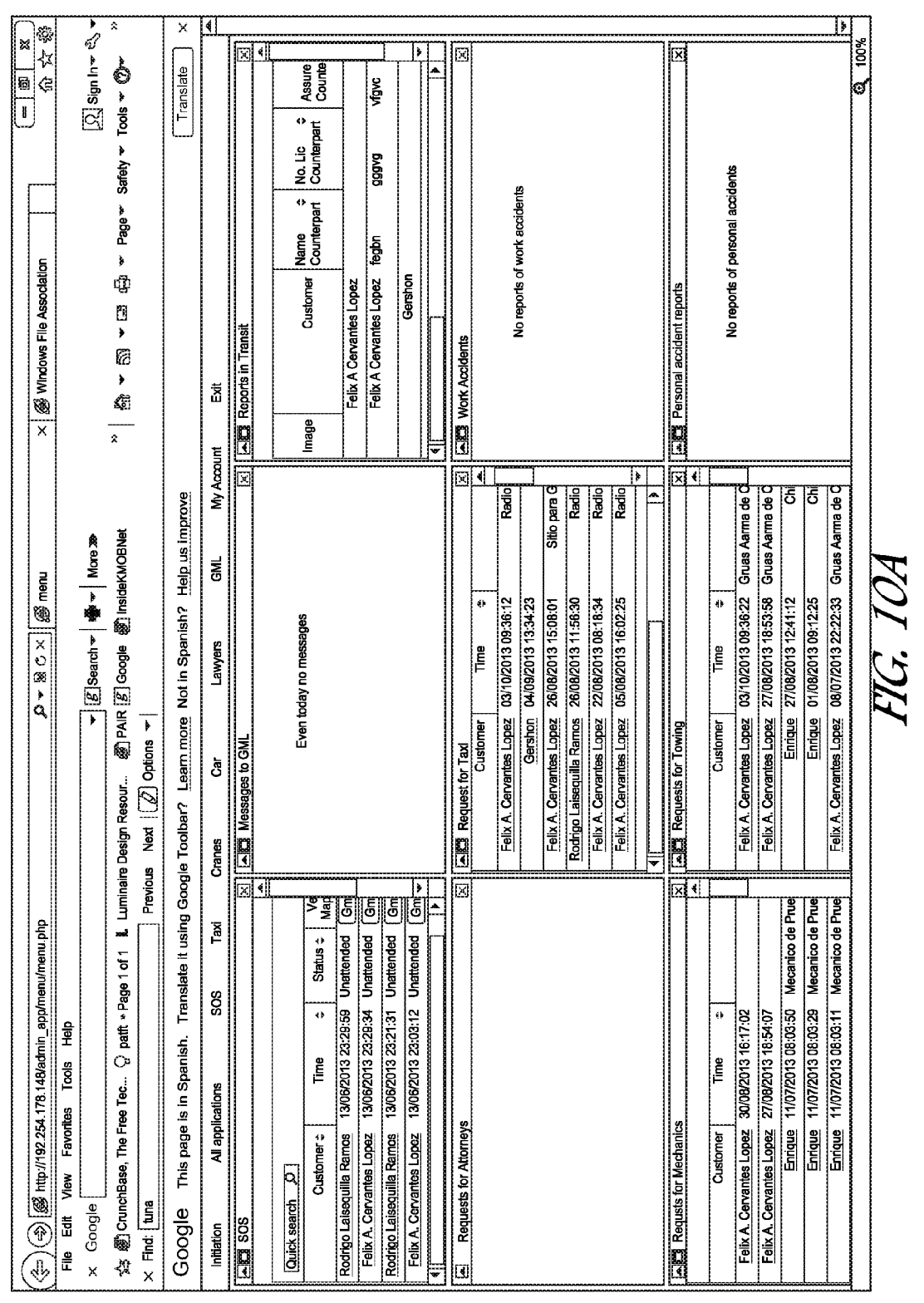

FIG. 10A illustrates an example administrative home page generated by the system and providing respective listings in sub-windows for emergency calls (SOS), requests for lawyers, requests for mechanics, messages for the system operator, requests for taxis, requests for tow services, reports of vehicular accidents, reports of work accidents, and reports of personal accidents. Optionally, the user can select one of the sub-windows to expand the selected sub-window and to view additional data (examples of which are described below). Optionally, the user can also select a given report via a menu.

Figure 10B:
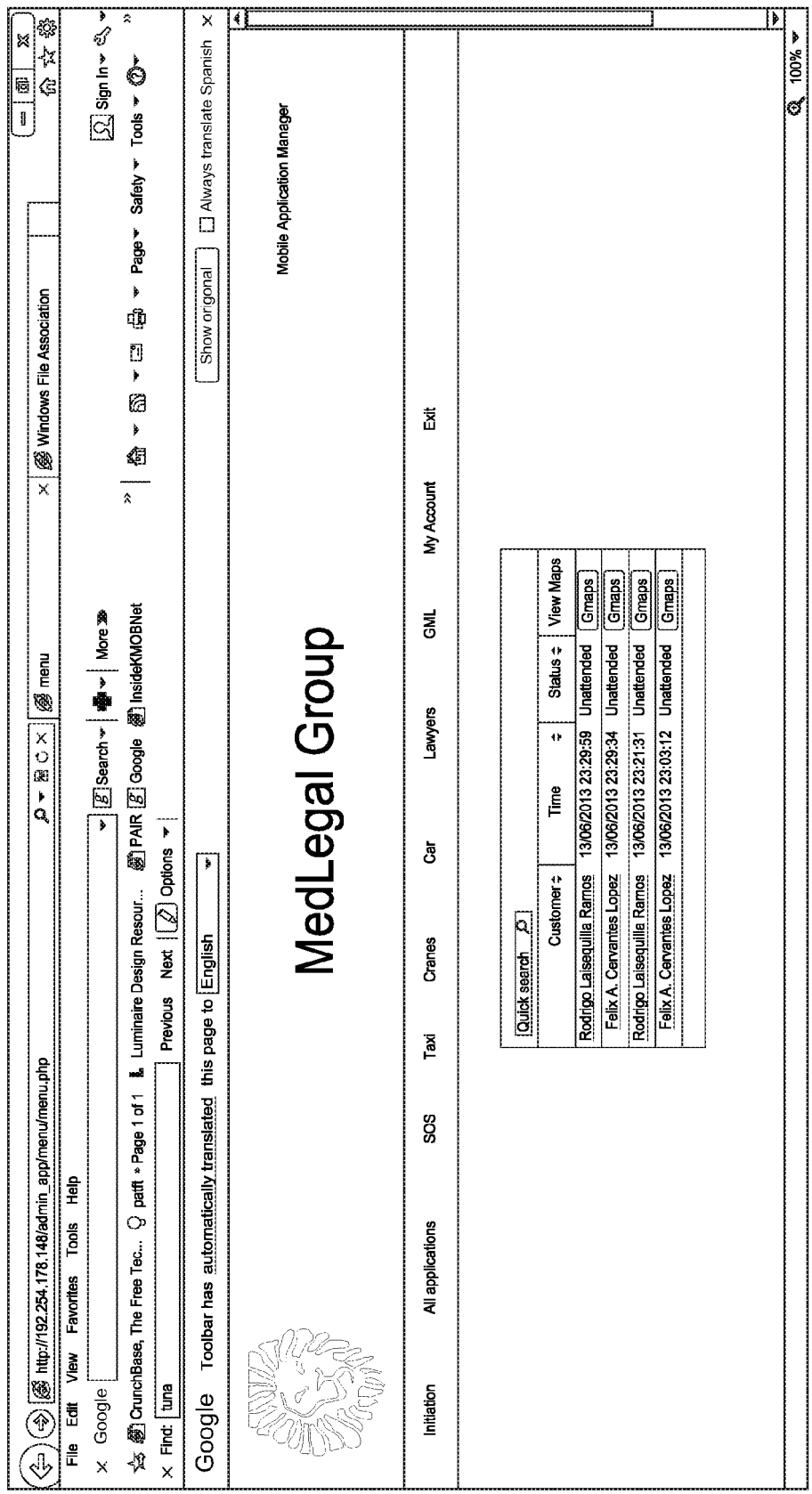

FIG. 10B illustrates an example user interface displaying records of emergency calls placed by users. In this example, the records are for emergency calls that occurred on the current day, although the system or user may specify other time frames, as similarly discussed above. In this example, the emergency call record listing includes the name of the user, the date/time of the emergency call, the status of the call (e.g., not yet serviced, serviced, etc.), and a link to a map showing the user's current location (e.g., based on location information received from the user's mobile device, such as GPS, cell tower, Wi-Fi location information, an address entered by the user textually, a location entered by the user via a map (e.g., where the user touches a location on an electronic map corresponding to the accident location, and an indicator (e.g., a pin icon) is displayed by the app at the location touched by the user, and where the user may use a finger gesture to expand and/or move/change the area displayed on the map))).

Figure 10C:
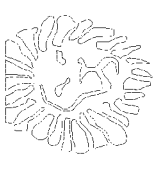

FIG. 10C illustrates an example user interface displaying records of transportation (e.g., taxi) service providers. In this example, a given record listing may include the name of the transportation service provider, the associated email address, a control to change the account password (optionally only certain authorized administrators may have access to changing the password), address, telephone number, country, postal code, latitude, longitude, radius from the transportation service provider location that the transportation service provider services (e.g., transportation service provider provides transportation services within a 5 mile radius of the transportation service provider's location), promptness rating, cost rating, state, status (e.g., active, inactive), and a link to review past requests for transportation services and/or to submit a new request for transportation services.

Figure 10D:
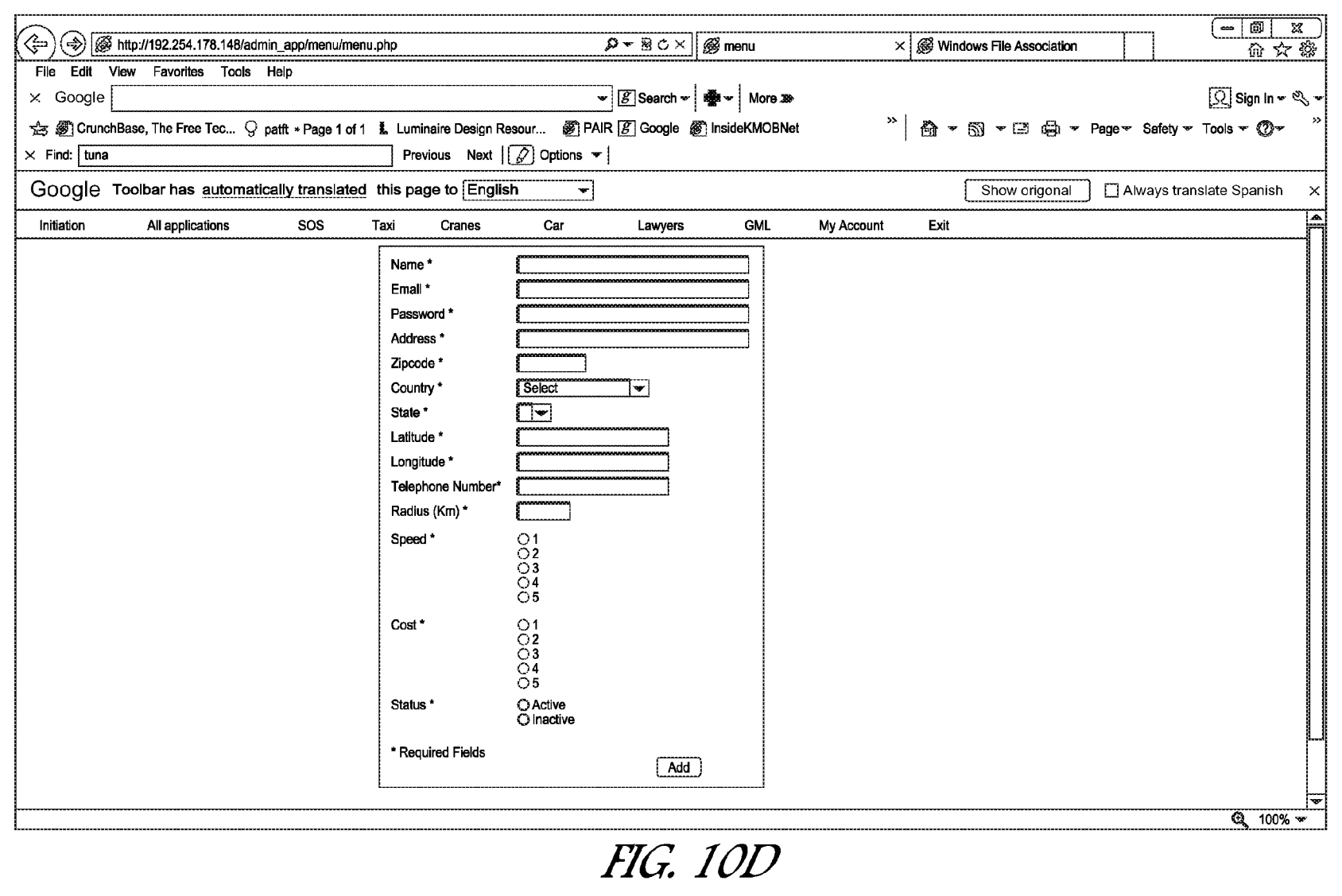

FIG. 10D illustrates an example transportation service registration user interface, including fields configured to receive some or all of the following information from the service provider: name, email, password, address, postal code, country, state, latitude, longitude, telephone number, radius served, a promptness/speed indication, a cost indication/rating (e.g., on a scale of 1-5 or other scale), and a status indication (e.g., active, inactive).

Figure 10E:
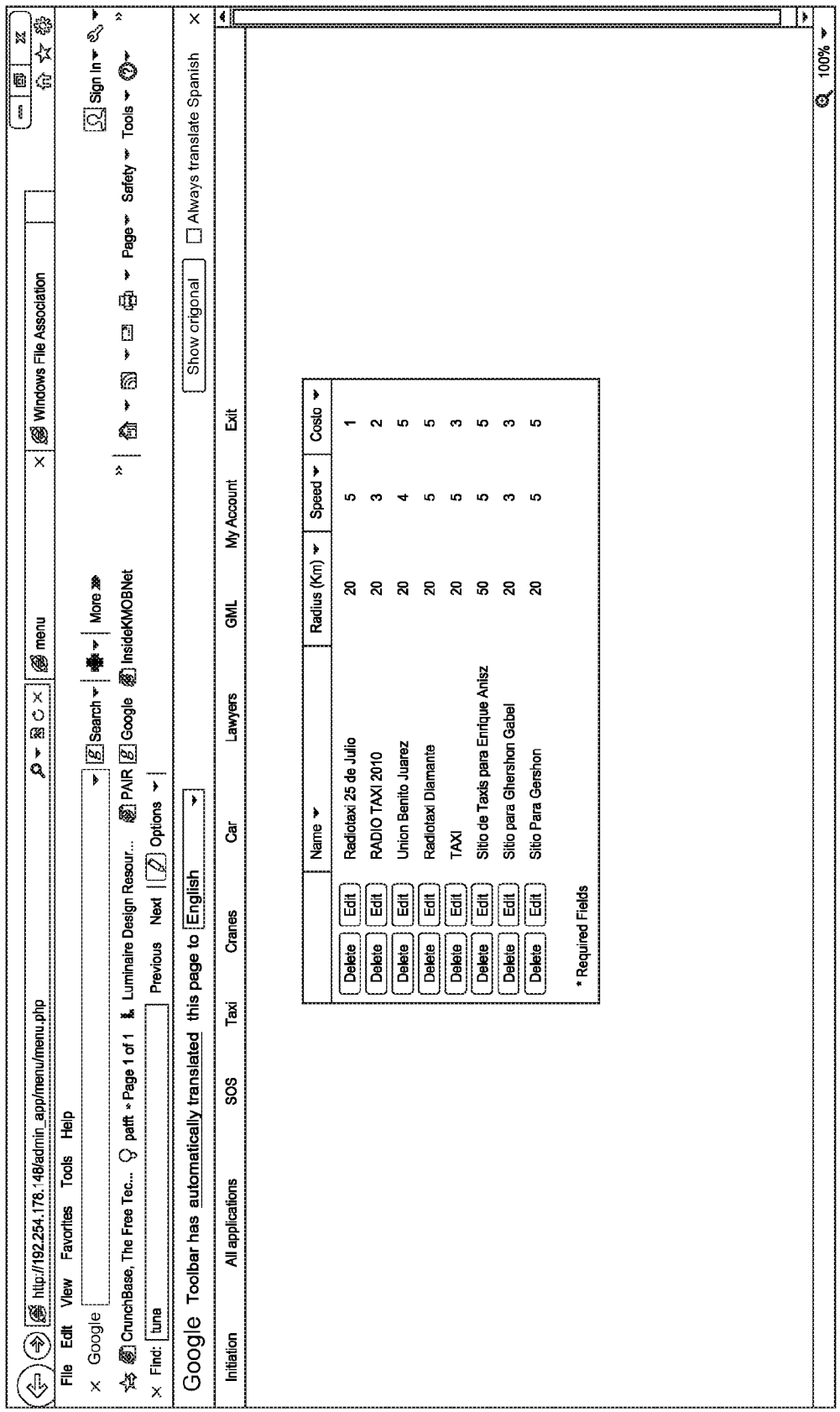

FIG. 10E illustrates an example transportation service summary user interface that presents summary information on transportation service providers, including name, radius served, speed, and cost information. In addition, for going data may be edited or deleted by a user.

Figure 10F:
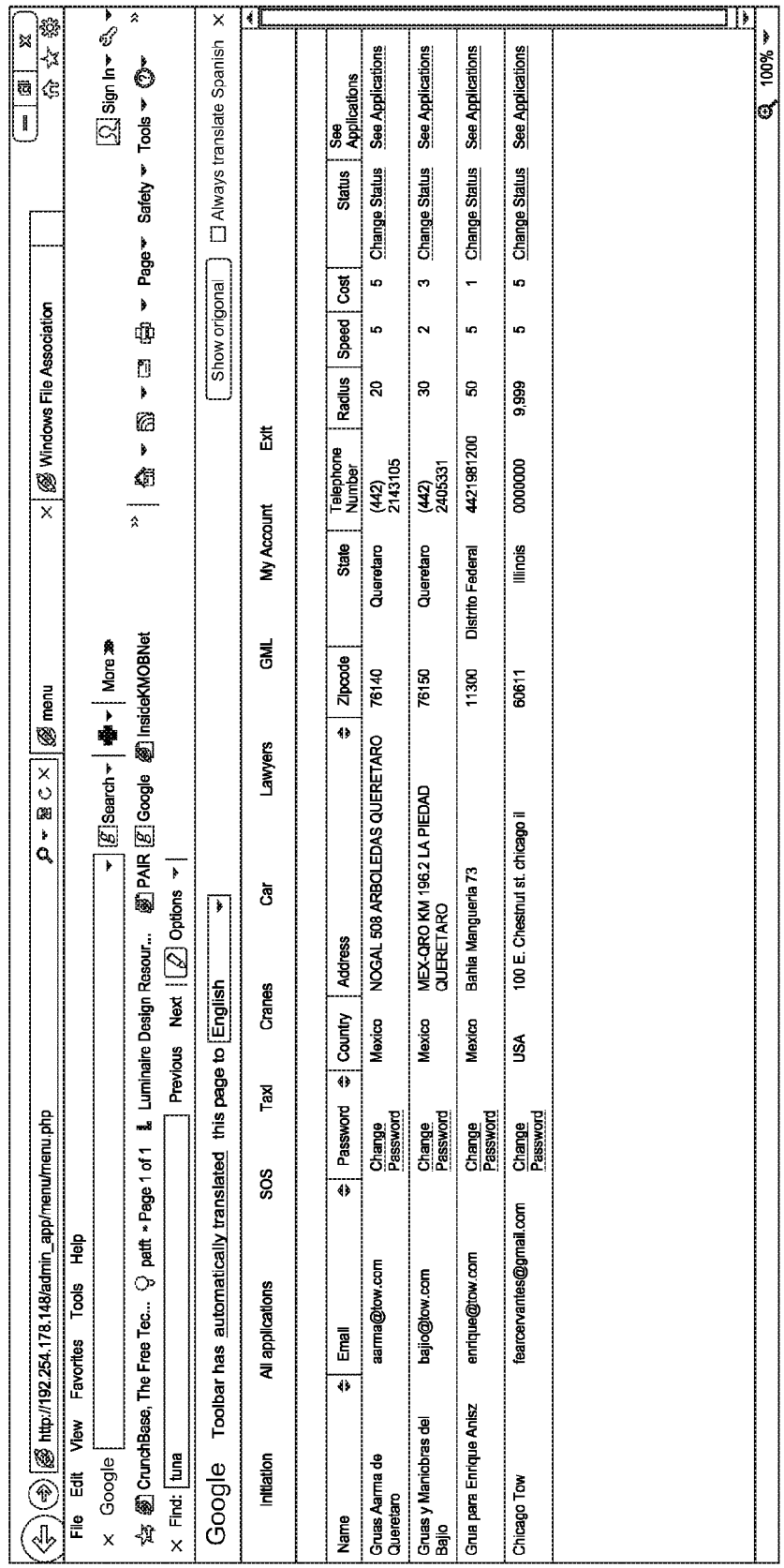

FIG. 10F illustrates an example user interface displaying records of towing service providers. In this example, a given record listing may include the name of the towing service provider, the associated email address, a control to change the account password (optionally only certain authorized administrators may have access to changing the password), physical address (and optionally latitude, longitude information), telephone number, country, postal code, service radius, promptness rating, cost rating, state (where located), a status field via which status may be assigned and/or reported (e.g., active, inactive), and a link to review past requests for towing services and/or to submit a new request for towing services. A towing service registration user interface may be provided to receive service provider information, optionally with the same or similar fields as described above with respect to the example transportation service registration user interface. A towing service provider summary user interface presents summary information such as name, radius served, speed, and cost information may be provided, as similarly discussed above with respect to the transportation service summary user interface.

Figure 10G:
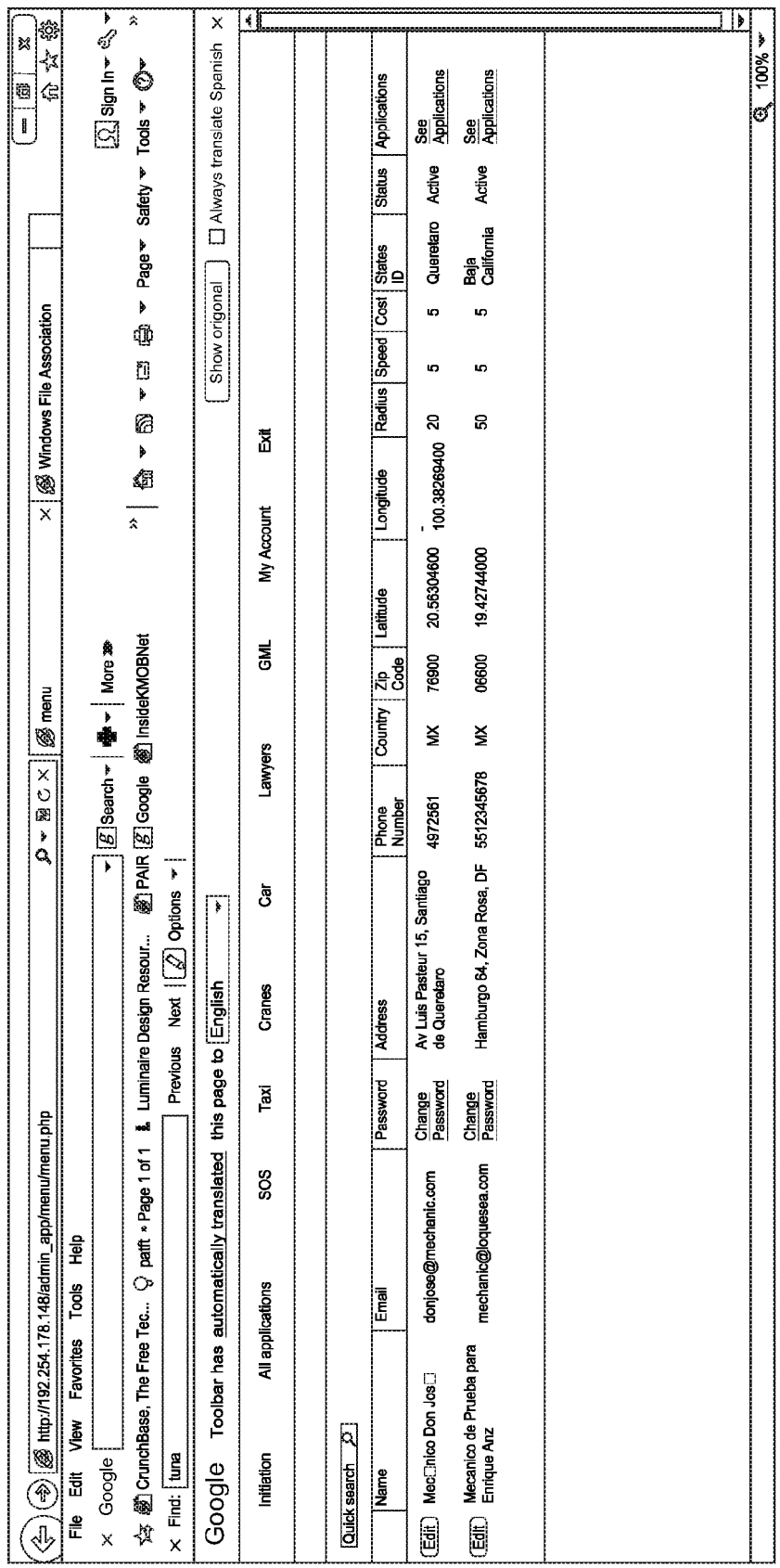

FIG. 10G illustrates an example user interface displaying records of mechanics/body shop service providers. In this example, a given record listing may include the name of the mechanics/body shop, the associated email address, a control to change the account password (optionally only certain authorized administrators may have access to changing the password), address (and optionally latitude, longitude information), telephone number, country, postal code, service radius, promptness rating, cost rating, state, status (e.g., active, inactive), and a link to review past requests for mechanics/body shop services and/or to submit a new request for mechanics/body shop services. A mechanics registration user interface may be provided, optionally with the same or similar fields as described above with respect to the example transportation service registration user interface. A mechanics/body shop service provider summary user interface presenting summary information such as name, radius served, speed, and cost information may be provided, as similarly discussed above with respect to the transportation service summary user interface.

Figure 10H:
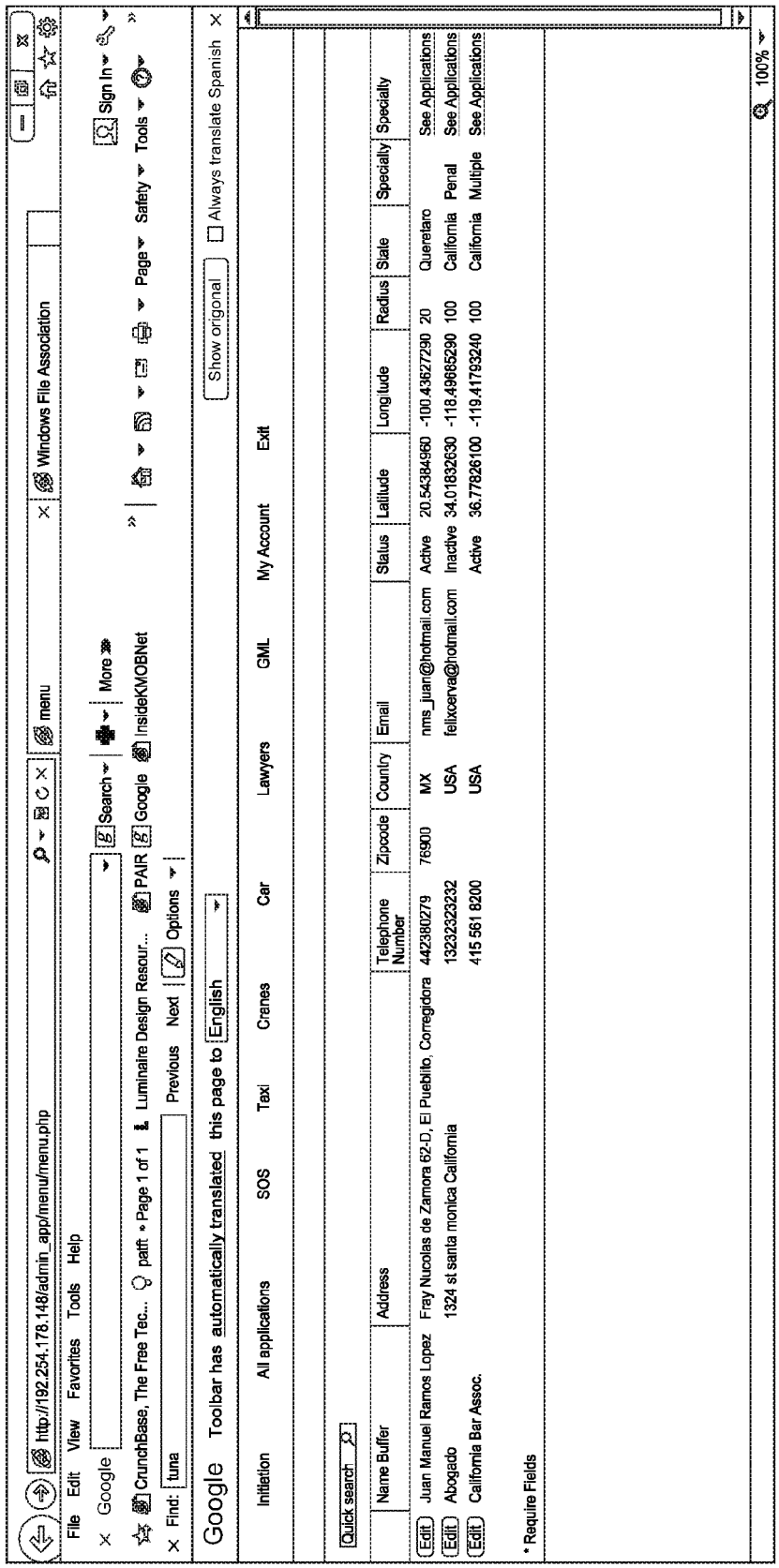

FIG. 10H illustrates an example user interface displaying records of legal service providers (e.g., lawyers). In this example, a given record listing may include the name of the legal service provider, the associated email address, a control to change the account password (optionally only certain authorized administrators may have access to changing the password), physical address, telephone number, country, postal code, latitude, longitude, service radius, promptness rating, cost rating, state, status (e.g., active, inactive), legal specialty (e.g., workman's compensation, vehicular accidents, personal accidents, etc.), and a link to review past requests for legal services and/or to submit a new request for legal services. A legal service provider registration user interface may be provided, optionally with the same or similar fields as described above with respect to the example transportation service registration user interface, as well as a legal specialty field. A legal service provider summary user interface presents summary information such as name, radius served, speed, and cost information may be provided, as similarly discussed above with respect to the transportation service summary user interface.

Figure 10I:

FIG. 10I illustrates an example user interface providing a log of communications between users and the system operator. A given log entry may include the name of the user, matter/subject information, the message (or a portion thereof), and a timestamp (data/time). Clicking on a given log entry will display the complete message text.

Figure 10J:
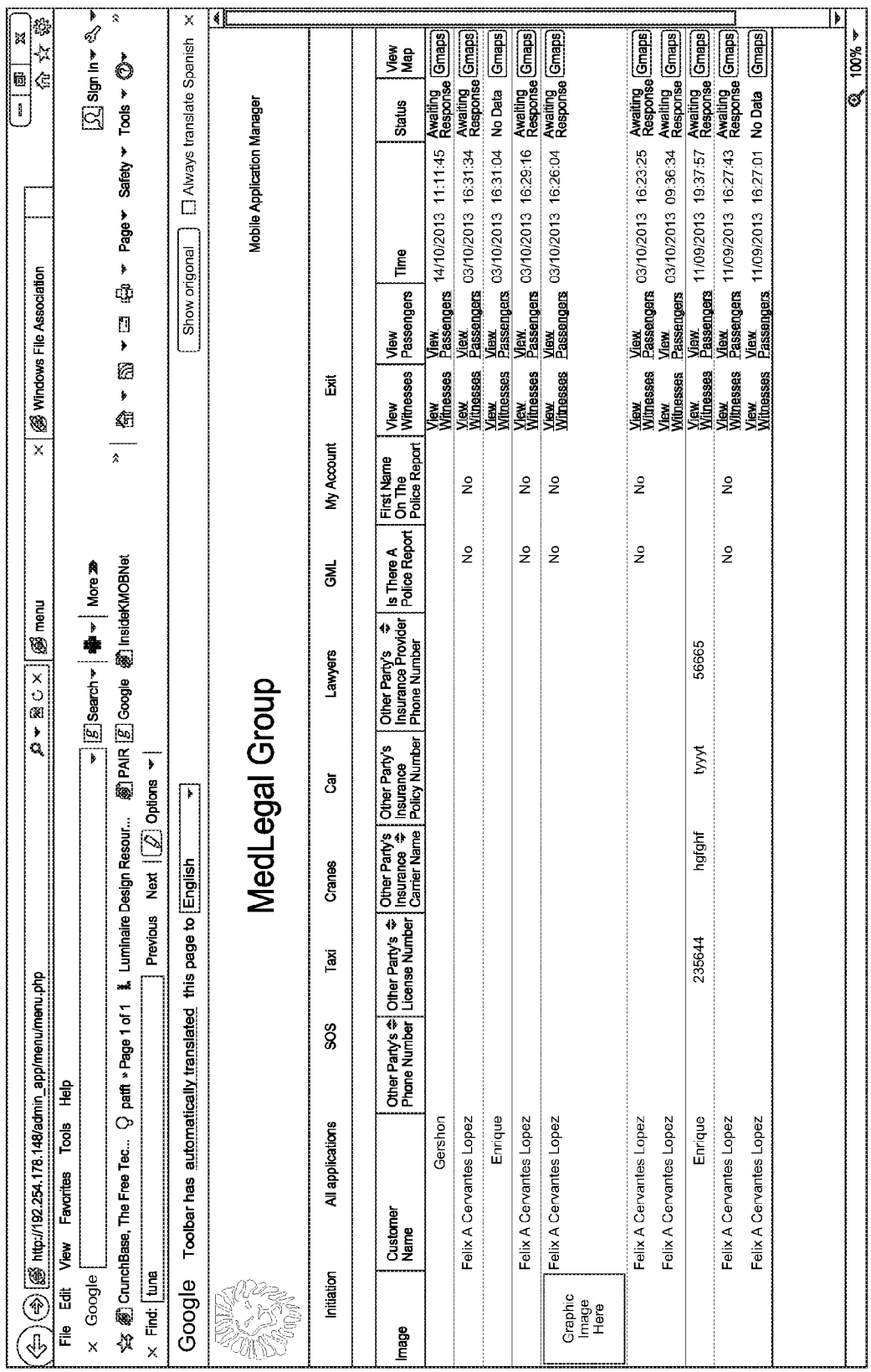

FIG. 10J illustrates an example user interface providing a listing of traffic accident reports of users. In this example, a given listing may include details regarding the other party involved in the traffic accident, such as the party's name, phone number, driver's license number, insurance carrier name, insurance policy number, the insurance provider phone number, as well as an indication as to whether a police report was made regarding the accident, the first name on the police report (if any), an indication as to whether there are witnesses to the accident, a timestamp as to when the report was made, status (e.g., waiting for reply, received reply, etc.), a link to a map indicating where the accident occurred and/or the current location of the user, and one or more accident-related photos uploaded by the user.

Figure 10K:
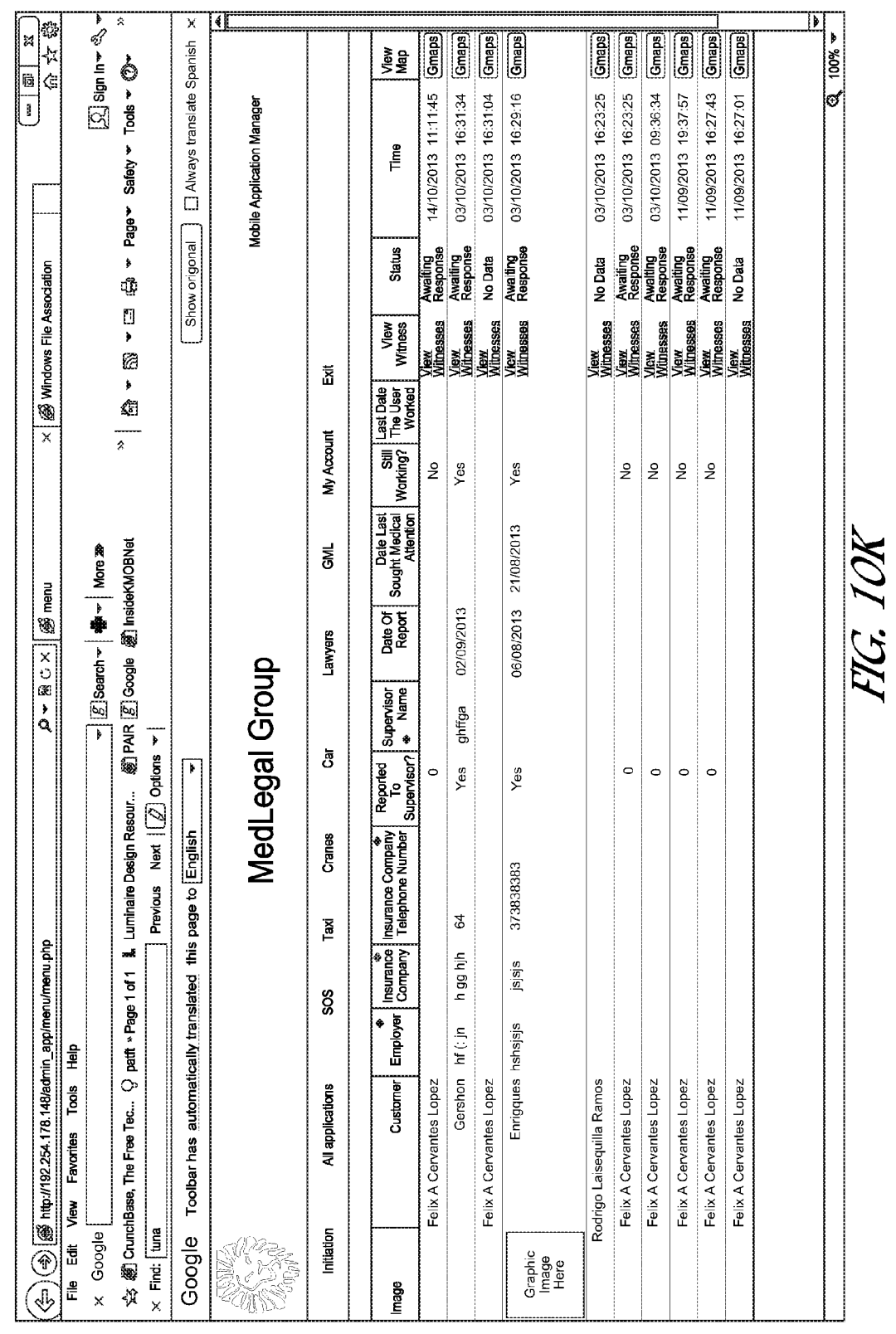

FIG. 10K illustrates an example user interface providing a listing of user workplace accident reports. In this example, a given listing may include a photograph, the user name, employer name, employer insurance company name, telephone number of insurance company, an indication as to whether the user reported the workplace accident or accident to a supervisor, supervisor name, date the accident was reported to the supervisor/employer, the date the user last sought medical attention, an indication as to whether the user is still working, last date the user worked, an indication as to whether there are witnesses to the accident or injury (and optionally a link to contact information for the witnesses), a timestamp as to when the report was made, status (e.g., waiting for reply, received reply, etc.), and a link to a map indicating where the accident or injury occurred and/or the current location of the user.

FIG. 10L illustrates an example user interface providing a listing of personal accident reports. In this example, a given listing may include the user name, the location of the accident, an accident report number (e.g., for a report submitted to the proprietor of the location of the accident), insurance company name, insurance policy number, telephone number of insurance company, an indication as to whether there are witnesses to the accident (and optionally a link to contact information for the witnesses), a timestamp as to when the report was made, status (e.g., waiting for reply, received reply, etc.), and a link to a map indicating where the accident occurred and/or the current location of the user.

FIGS. 14A-14F illustrate additional example administrative user interfaces. The system may generate various administrative user interfaces for different event type reports (e.g., automobile accidents, personal injury accidents, workplace accidents, immigration incidents, and the like). FIG. 14A illustrates an example user interface listing automobile accident reports (e.g., received via instantiations of the app on user devices). The system may generate and assign a report/event identifier number ("Id"), may indicate that the accident just happened (e.g., within the last 5 minutes, 10 minutes, 15 minutes, 30 minutes, or 60 minutes) or that the report was just received (via the "Just Now" column), whether the report is complete or incomplete, the name of the user, the report (e.g., a link to the report, examples of which are described elsewhere herein), and when the report was created. At least partly in response to receiving an indication that the accident just happened, an outbound communication (e.g., a phone call, a text message, a message transmitted for presentation via the app on the user device, etc.) may be directed to the user that made the report (e.g., asking if the user is safe, needs assistance, wants emergency personnel sent to the incident scene, etc.). FIG. 14B illustrates an example user interface listing personal injury accident reports (e.g., received via instantiations of the app on user devices). The system may generate and assign a report/event identifier number ("Id"), may indicate which ones where just received (via the "Just Now" column), whether the report is complete, the name of the user, the report, and when the report was created. FIG. 14C illustrates an example user interface listing workplace injury accident reports (e.g., received via instantiations of the app on user devices). The system may generate and assign a report/event identifier number ("Id"), may indicate which ones where just received (via the "Just Now" column), whether the report is complete, the name of the user, the report, and when the report was created.

FIG. 14D illustrates an example user interface listing beacon event reports. The user interface lists alerts received from user devices, such as for immigration related events (e.g., arrests or detainment), for vehicular accidents, for personal injury accidents, for workplace-related accidents, etc. The system may generate and assign a report/event identifier number ("Id"), may indicate which reports/events are active, the beacon type (e.g., immigration apprehension, driving under the influence arrest, vehicular accident, personal injury accidents, workplace-related accident, etc.), the name of the user, the report (or a link to the report), and when the report was created.

The batch reports for the foregoing may also be generated, where the batch reports may include the same, similar, or different information than discussed above with respect to FIGS. 14A-14D. FIG. 14E illustrates a report including information obtained during a user registration process. The registration information for a given user may include information manually entered by the user, "scanned" using a user device camera from a document (e.g., a driver's license, other state identification card, other ID, etc.) as similarly disclosed elsewhere herein, and/or populated using information provided by an app store from which the app was downloaded. The report may include an ID, user email, user first name, user last name, user phone number, user date of birth, and account type (e.g., invitee, limited, preferred, etc.). FIG. 14F illustrates an example report on administrators that includes an ID, administrator email address, current sign in date and time, the number of sign-ins, and the creation date and time.

Figure 11A:
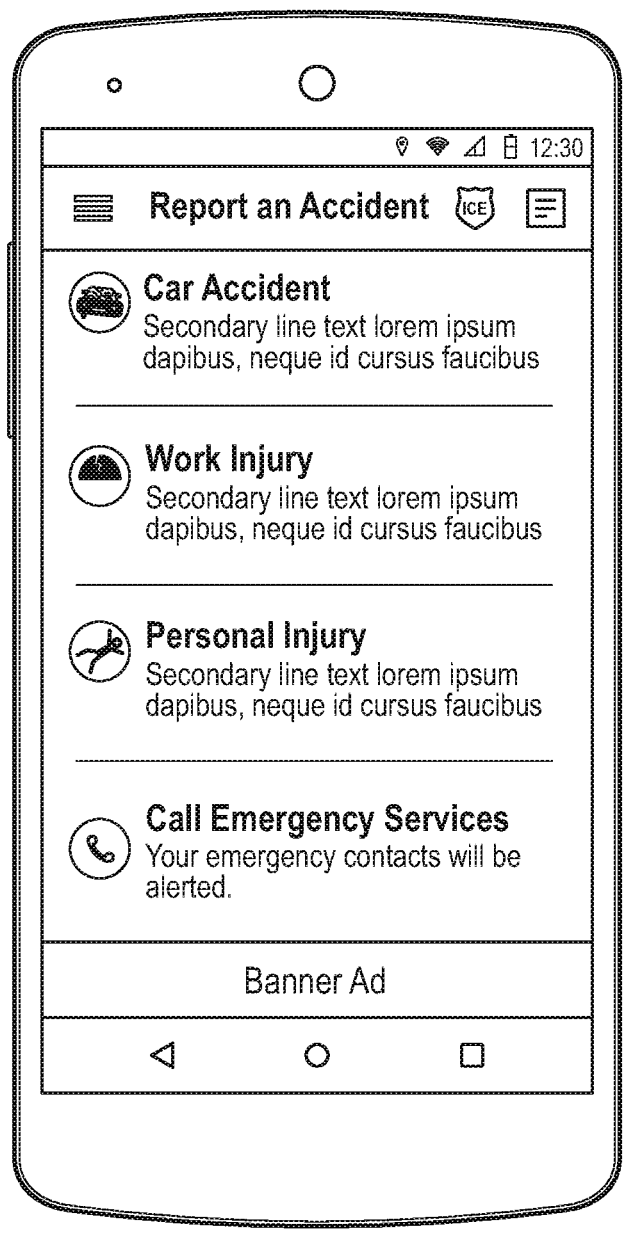
FIGS. 11A-W illustrate additional example user interfaces.
Figure 11B:
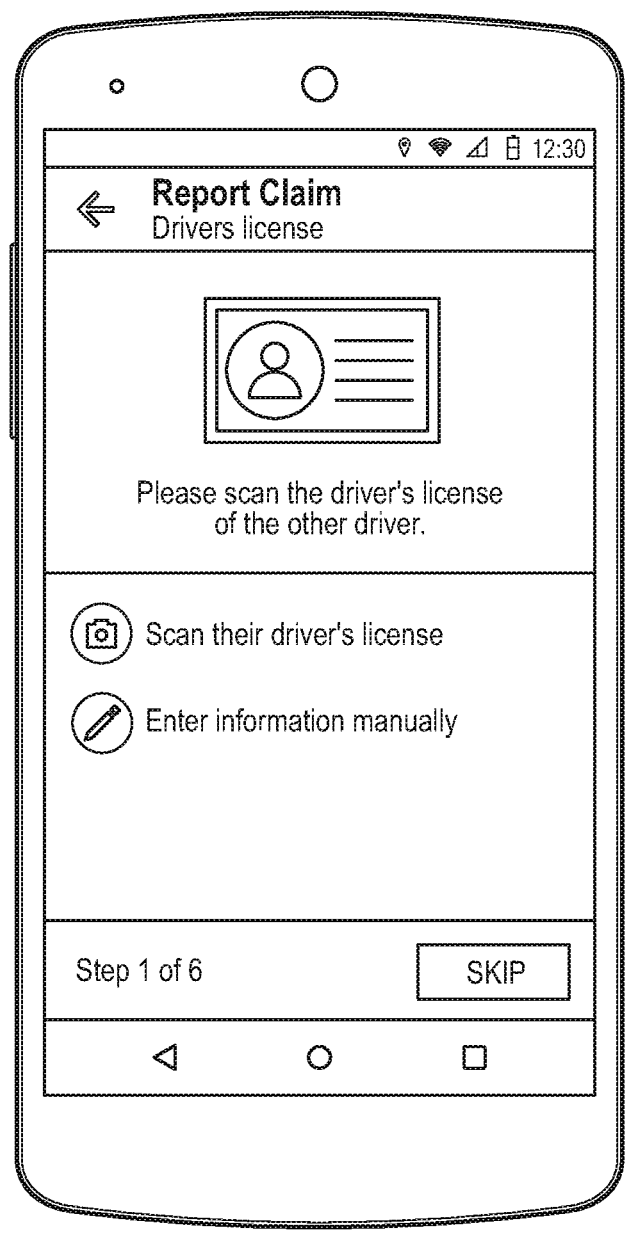
Figure 11C:
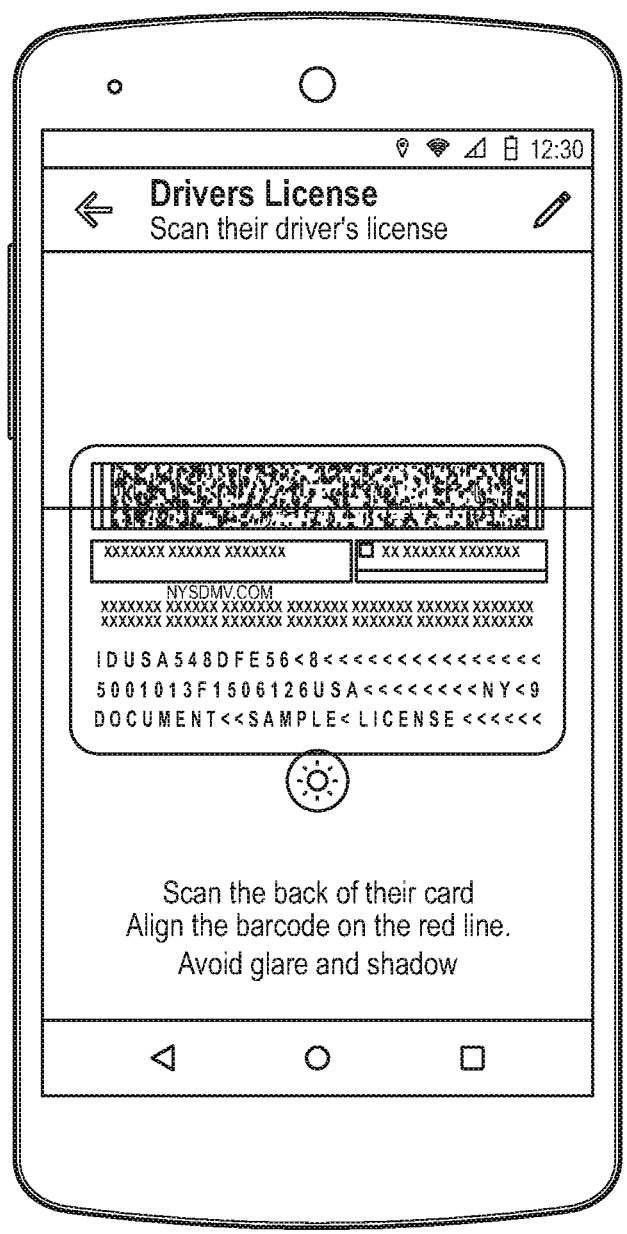
Figure 11D:
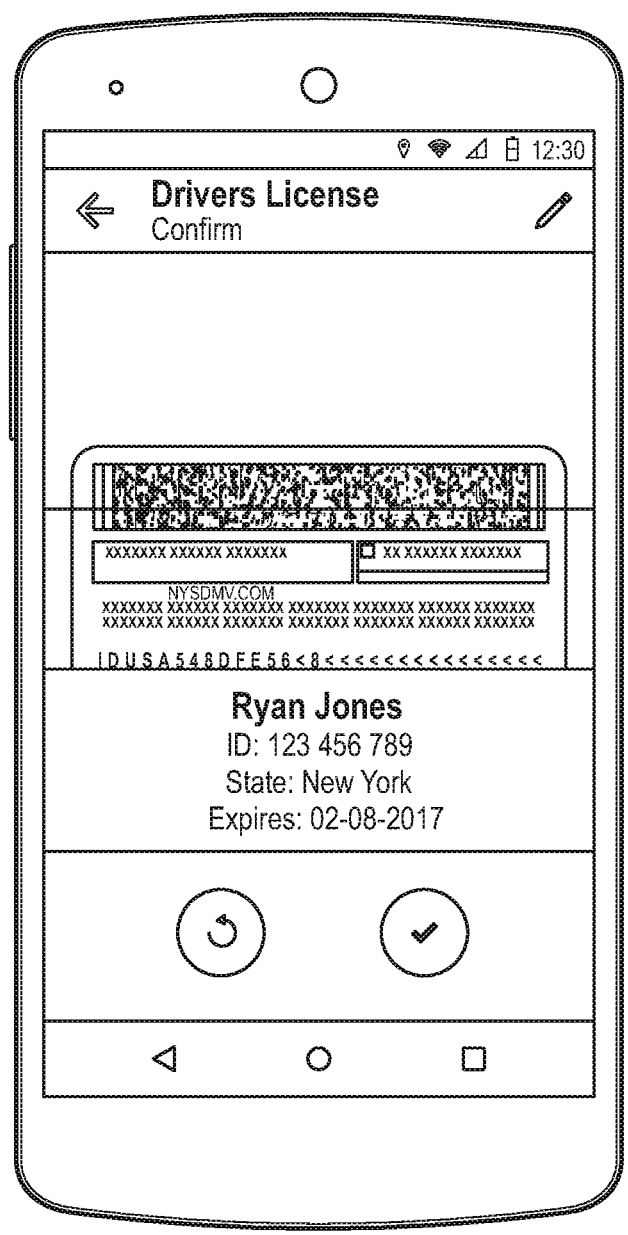
Figure 11E:
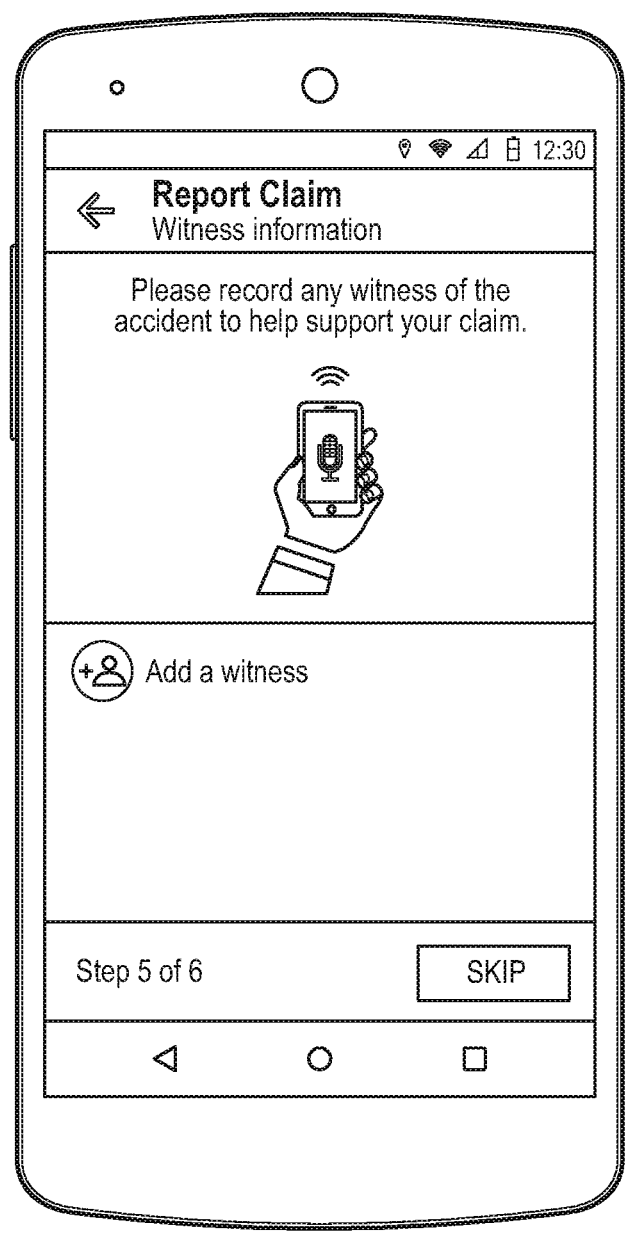
Figure 11F:
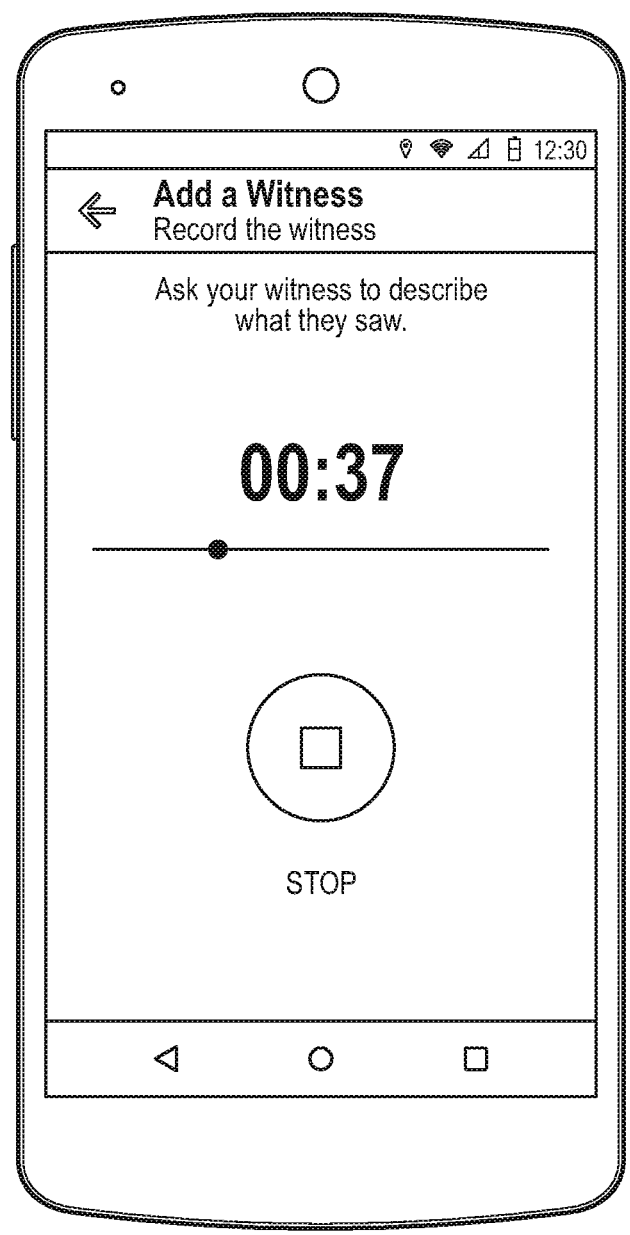
Figure 11G:
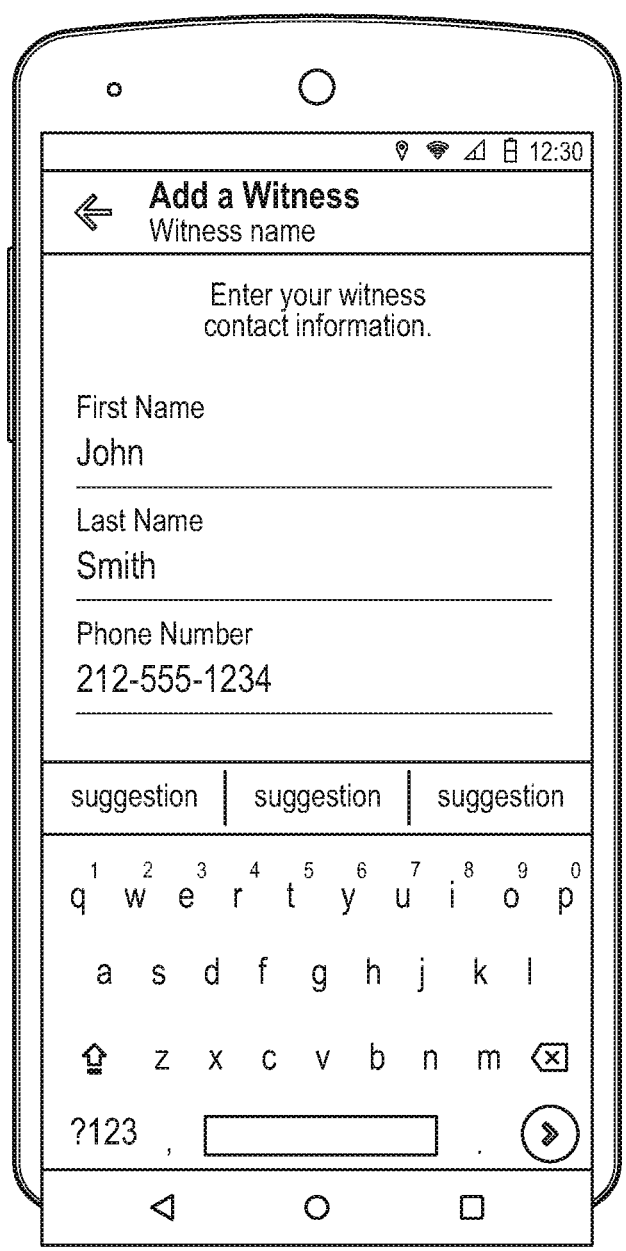
Figure 11H:
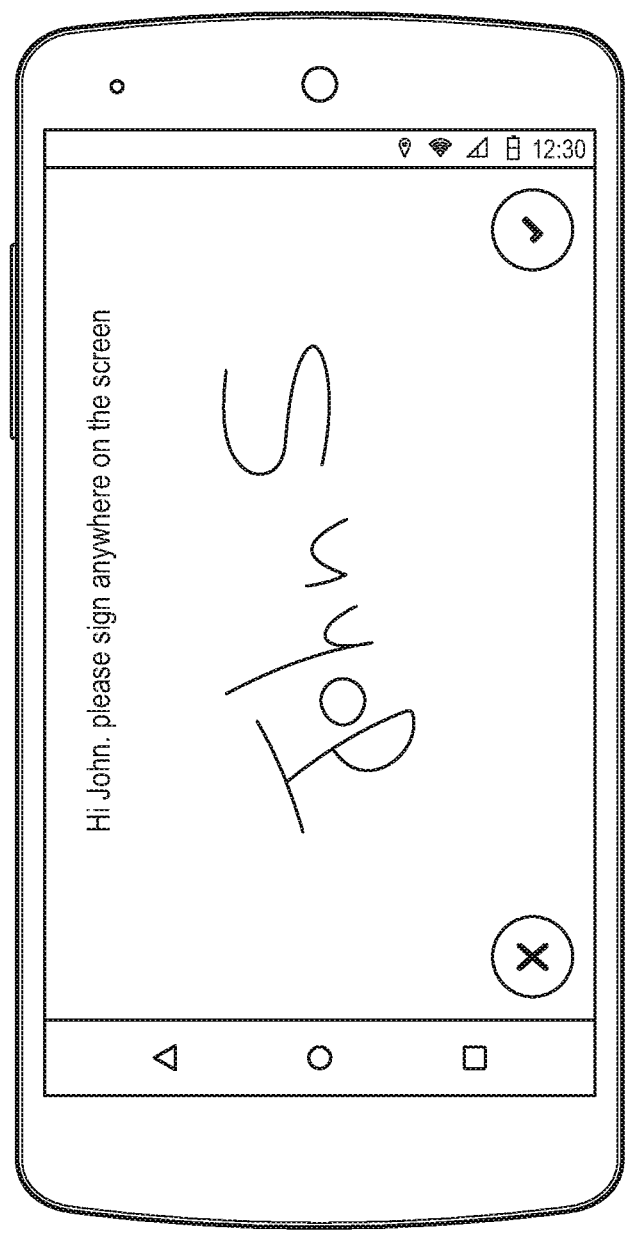
Figure 11I:
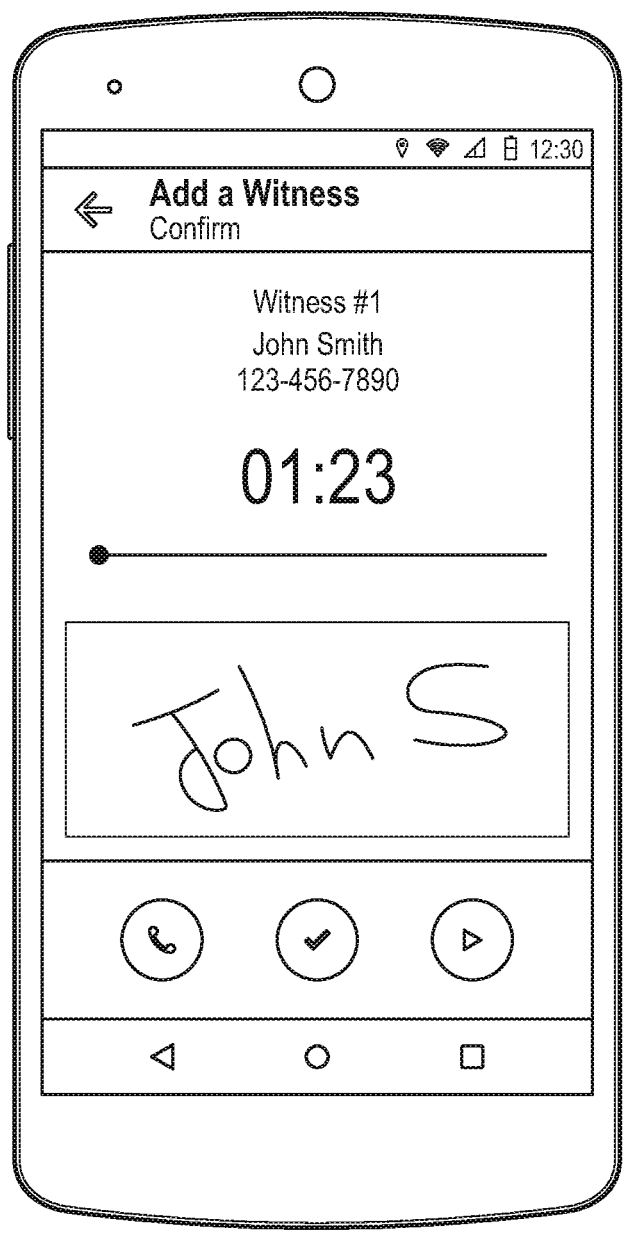
Figure 11J:
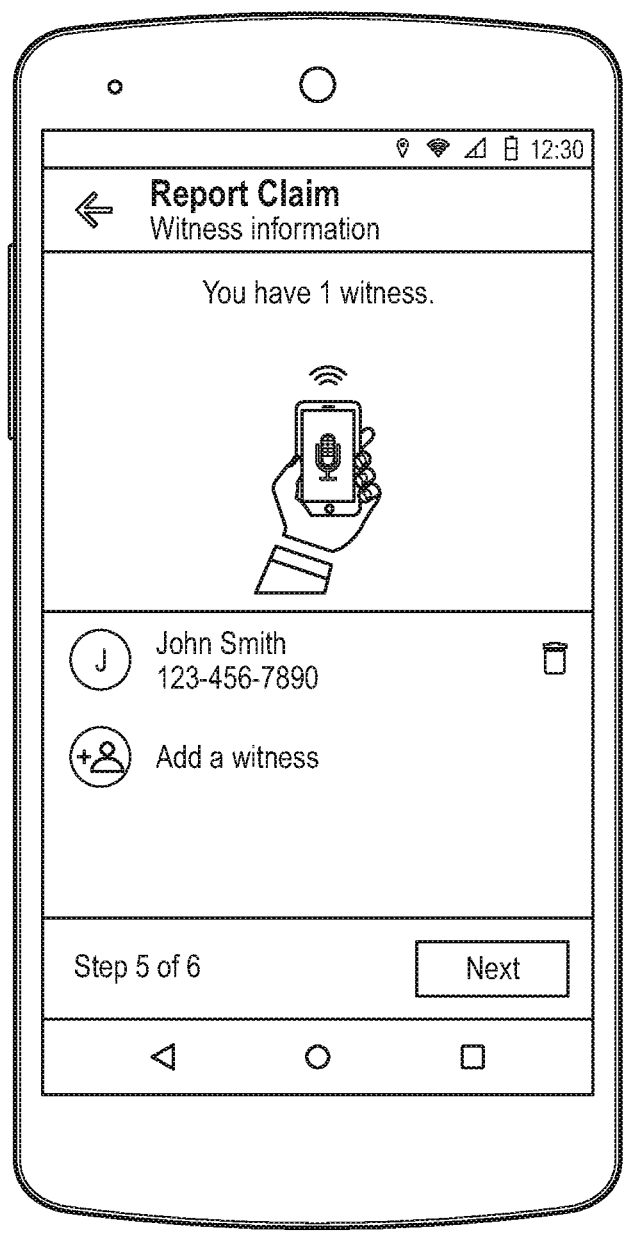
Figure 11K:
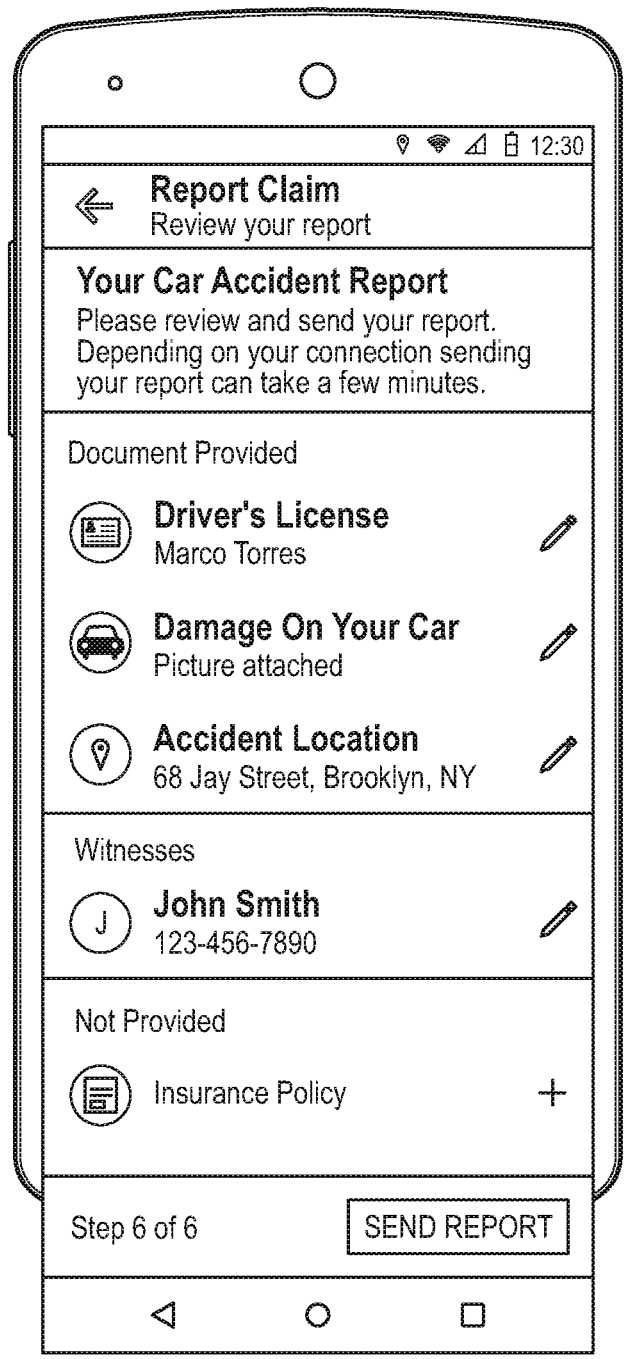
Figure 11L:
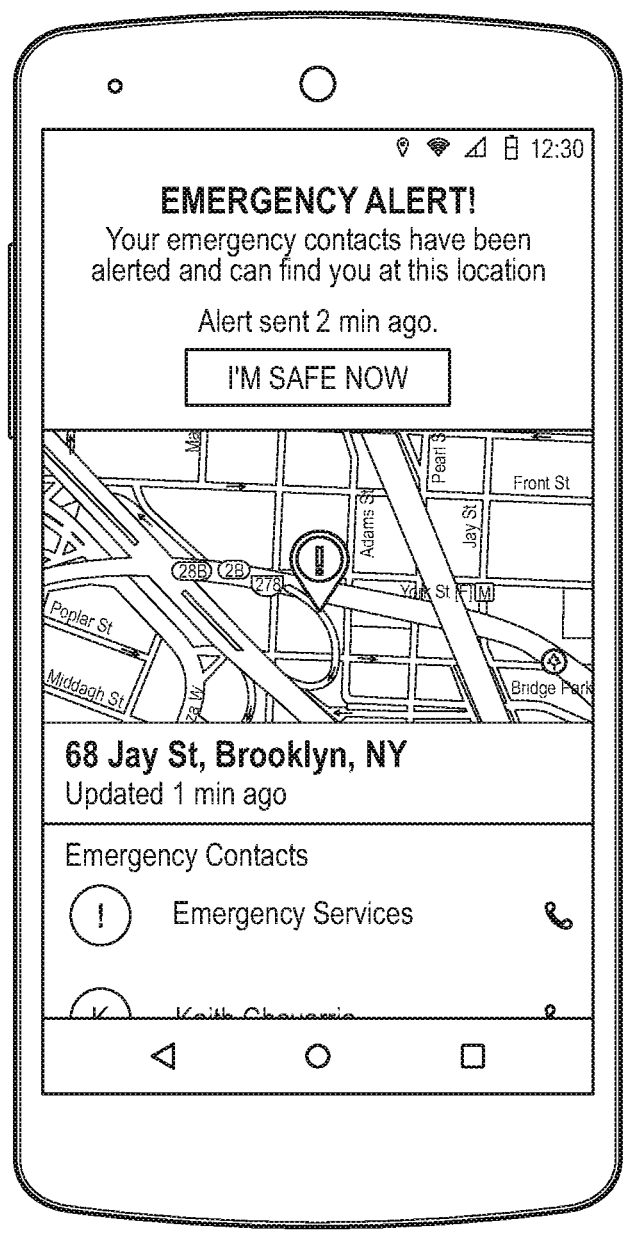
Figure 11M:
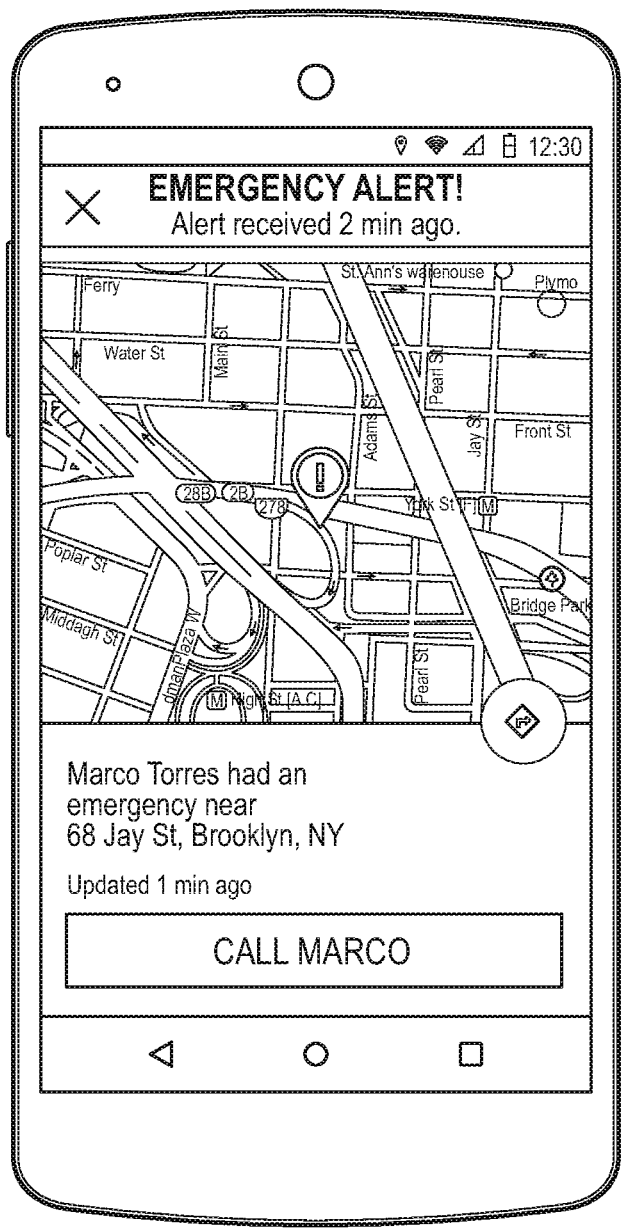
Figure 11N:
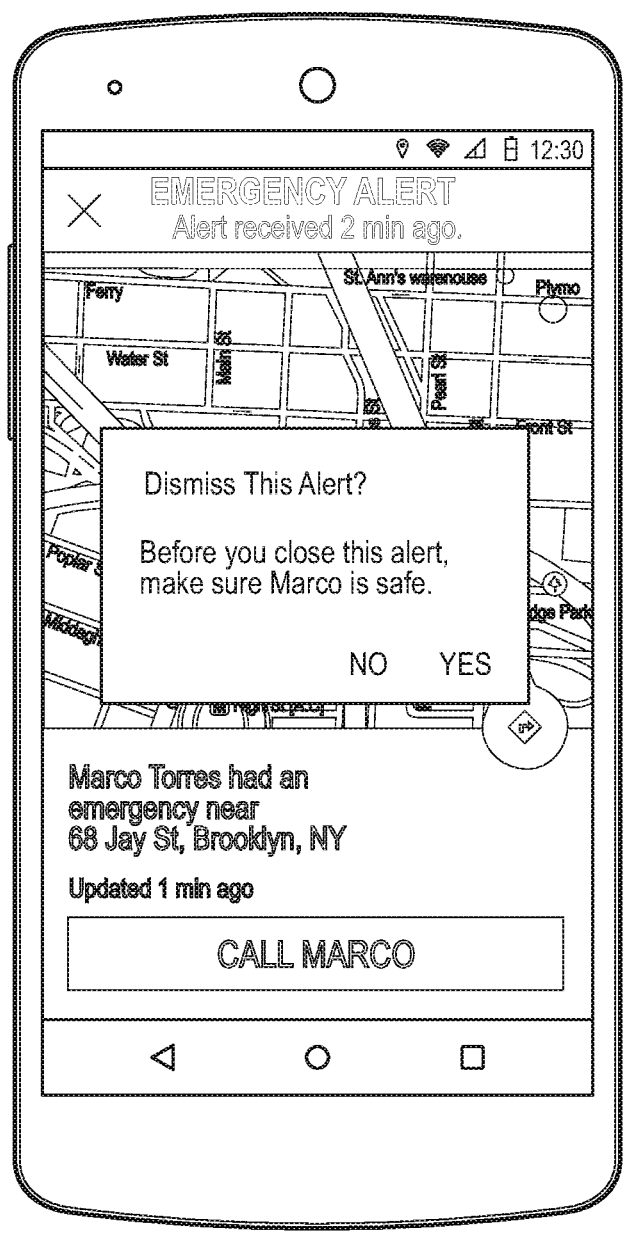
Figure 110:
Figure 11P:
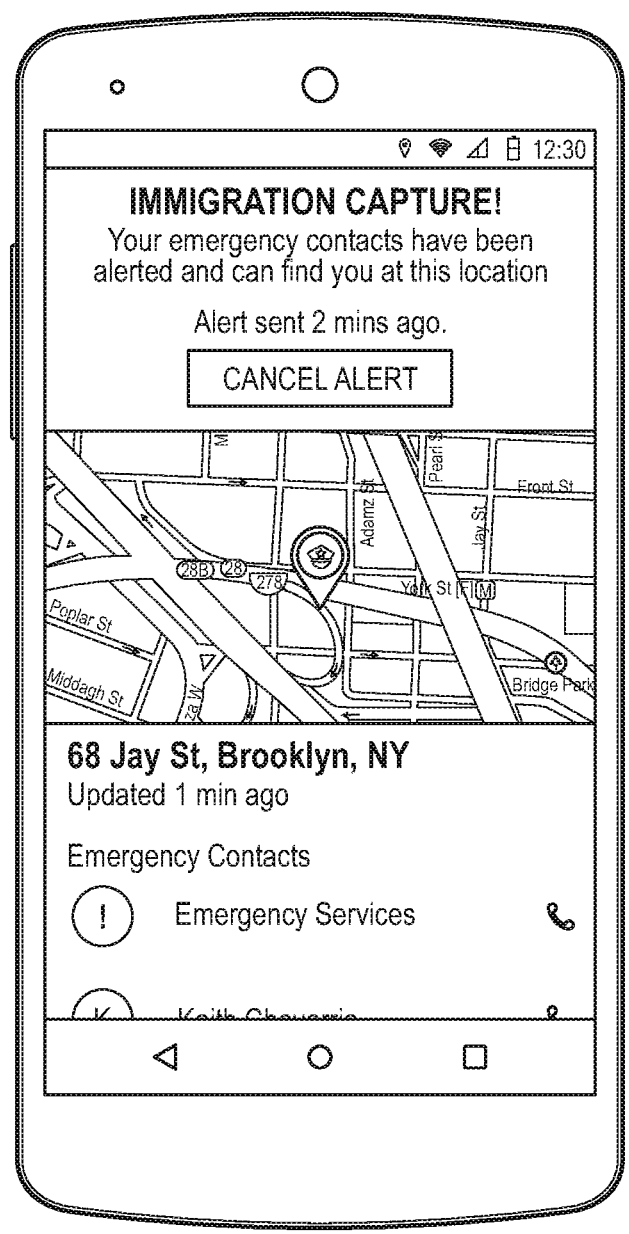
Figure 11Q:
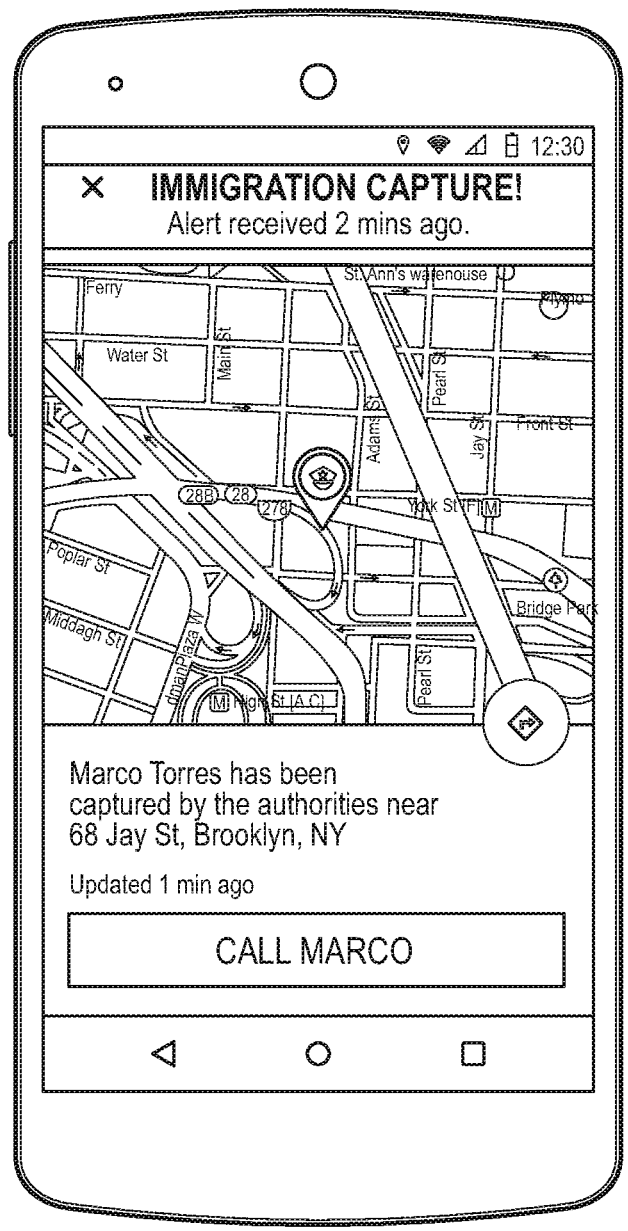
Figure 11R:
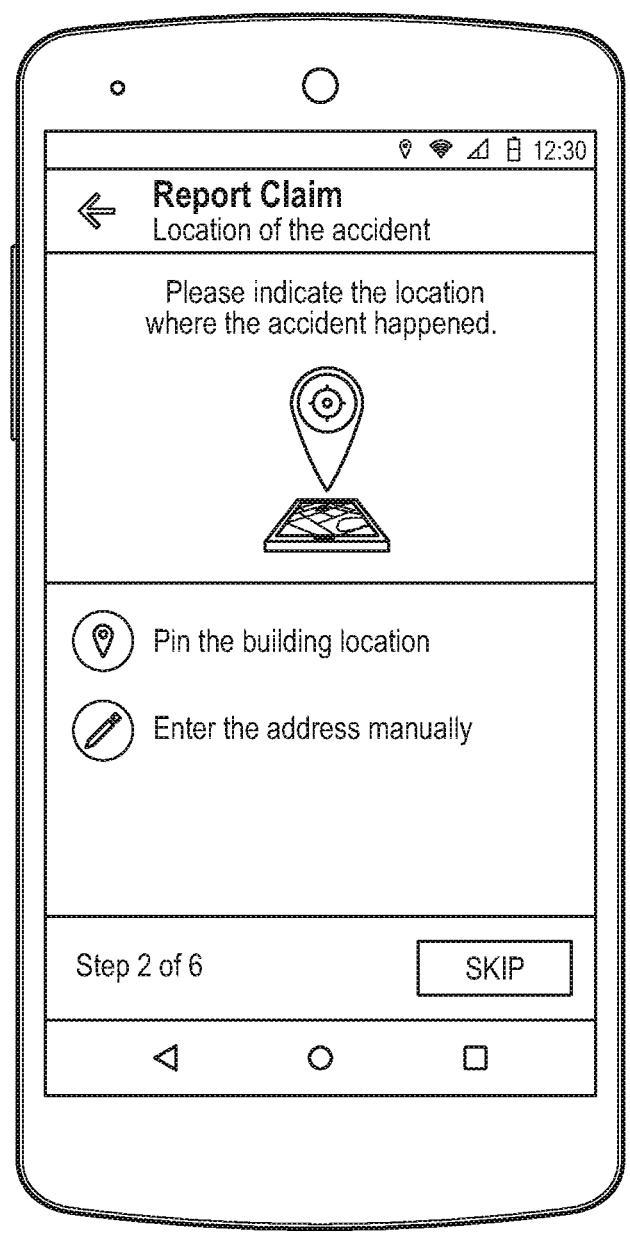
Figure 11S:
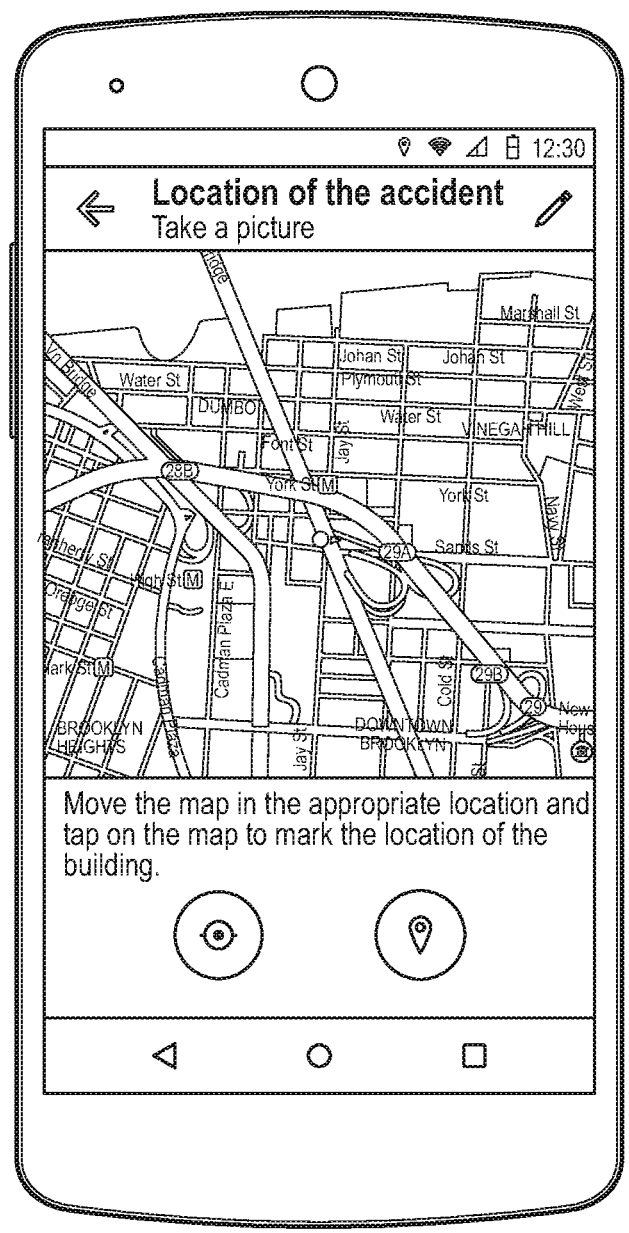
Figure 11T:
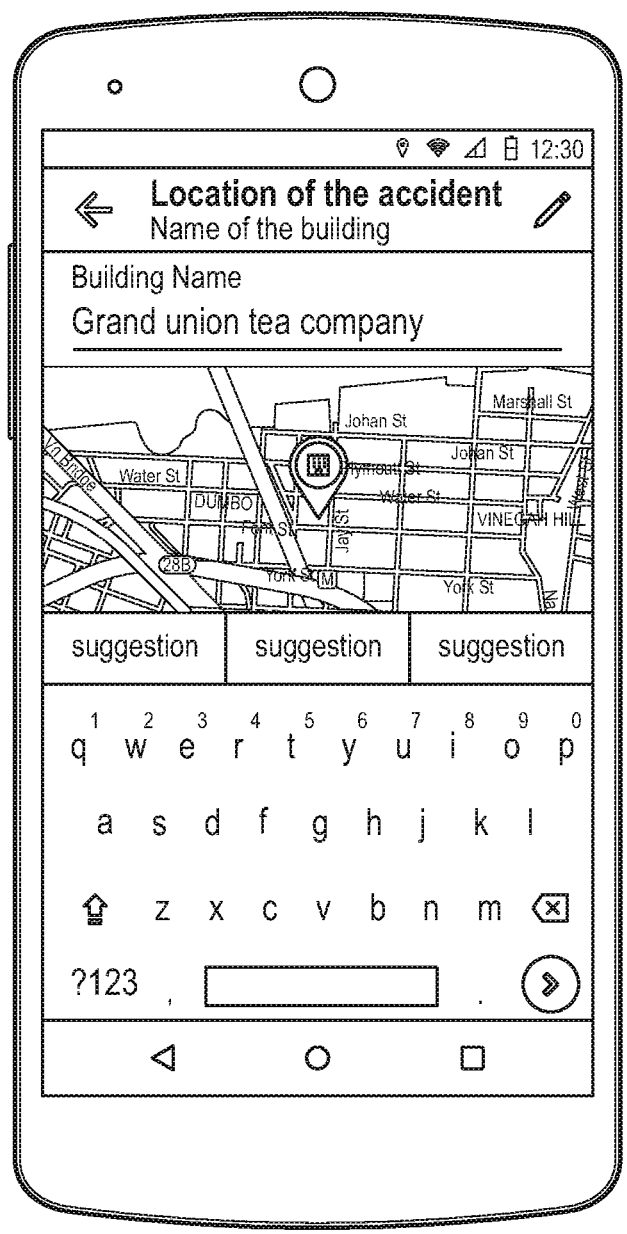
Figure 11U:
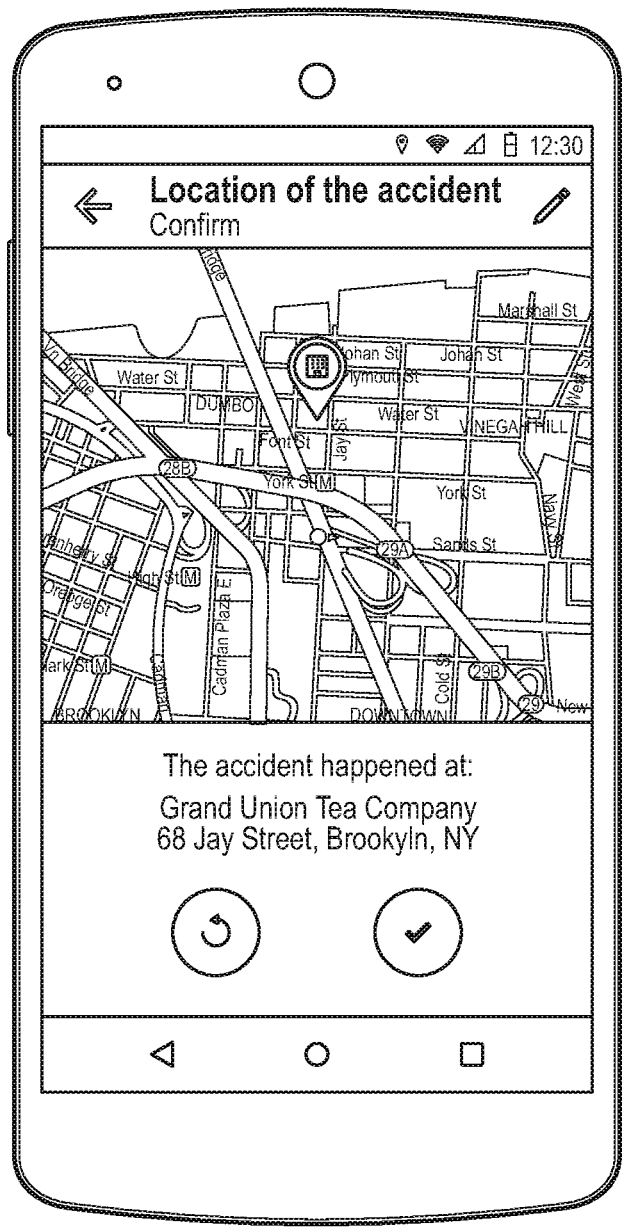
Figure 11V:
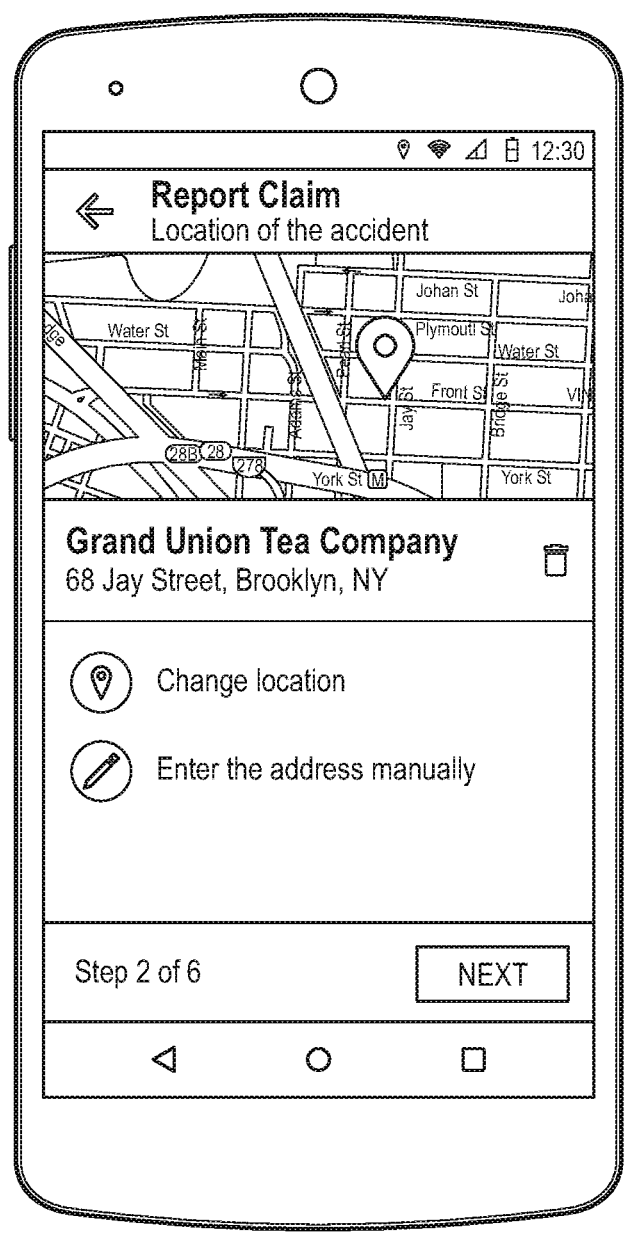
Figure 11W:
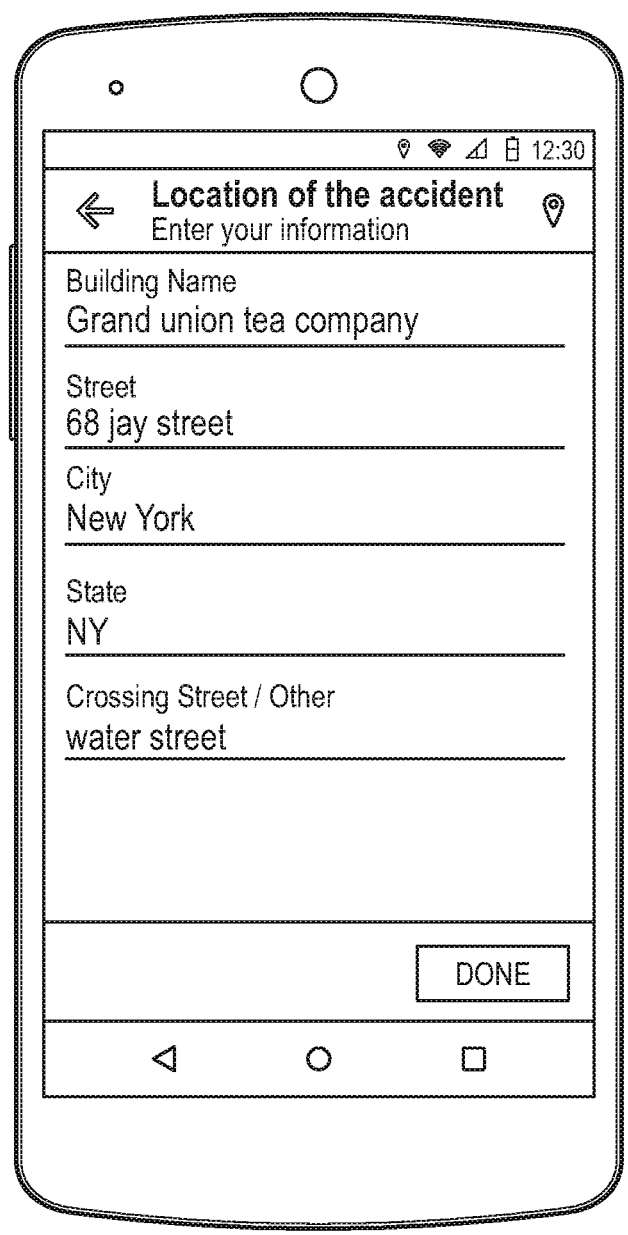

FIGS. 11A-W illustrate additional example user interfaces, one or more of which may be used with one or more processes described herein. The user interfaces may enable the user's mobile device app to access data from a remote system (e.g., system 104), present the data to the user, receive user inputs, and provide user inputs to a remote system. Data may be compressed prior to transmission by the user device or the remote system to reduce network bandwidth and memory usage. For example, images may be compressed using JPEG compression, GIF compression, PNG compression, wavelets, etc. Optionally, the system/app may dynamically select a compression technique (e.g., lossy or lossless) for a given image based on the image type detected. For example, if it is determined (e.g., based on associate metadata that indicates how the image was captured, such as via a camera or touch screen) that the image is a photograph (e.g., of an accident), the system/app may select a lossy JPEG format compression. By way of further example, if the image is an image of a signature, the system/app may select GIF or PNG format compression or a lossless compression. Optionally, a signature may be compressed by recording the text as a as a sequence of strokes. The strokes may be defined as a sequence of x(t) and y(t) coordinates, beginning with a detection of a finger or stylus making contact with a touch screen and ending with a detection of the removal of the finger or stylus from the touch screen. The user touch device may sample the x(t) and y(t) coordinates periodically (e.g., every 50 Hz, 100 Hz, 200 Hz) and the app may access such coordinates. Optionally only a portion of the samples are stored to reduce memory and bandwidth usage. Text may be compressed using lossless compression.

FIG. 11A illustrates a user interface that lists accident types or other events for which a user can submit a report. For example, the accident types may include car, work injury, and personal injury, and the other events may include an immigration arrest, a driving under the influence arrest, other arrest, etc. One or more emergency/distress alert control may be provided, which when activated by the user will cause alerts to be automatically transmitted to one or more contacts previously identified by the user notifying the contacts of the event (e.g., accident or arrest), the event location, and/or the event type. Optionally, there may be different alert controls for different types of events, and each alert control may optionally be associated with its own set of contacts that the user previously identified for the corresponding alert control type. For example, there may be an alert control intended for use by a user's babysitter (e.g., a child distress alert control), where the user can provide the babysitter with a device with the app installed (e.g., the user's device), and the babysitter can activate that alert in the event that one of the children is in distress (e.g., sick, injured, missing, etc.). In response to the babysitter activating the alert control, notifications will be transmitted to the previously identified contacts (e.g., the parents', grandparents, and/or neighbors mobile devices). By way of further example, there may be an alert control intended for use by an elderly person's caretaker (e.g., an elder distress alert control), where the user can provide the caretaker with a device with the app installed (e.g., the user's device), and the caretaker can activate that alert in the event that the elderly person is in distress (e.g., sick, injured, missing, etc.). In response to the caretaker activating the alert control, notifications will be transmitted to the previously identified contacts (e.g., the elderly person's children's', doctor's, and/or neighbors' mobile devices). There may also be different alert controls for vehicular accidents, personal injury accidents, arrests, apprehensions (e.g., immigration arrest or apprehension, etc.). Optionally, a given alert control may be used for one or multiple event-types (emergency/distress events). The alert controls may be provided on one or more of the user interfaces described herein and/or on other user interfaces.

The notification may be provided via an instantiations of the app on the emergency contacts' devises (e.g., on their mobile phones) and may include a map of the event location, an address of the event location, and the name of the user. The notification may be placed via a phone call and may be in the form of a voice notification that includes a static portion prerecorded by the user or may be a default recording, and/or a dynamic portion generated by a voice synthesis engine included in the app or the remote system or dynamically selected from pre-recorded voice segments. For example, the dynamic portion of the message may include the accident location and/or the accident type. Optionally, the notification may be provided via a text message. The text message may include static and/or dynamic portions as similarly discussed above with respect to a voice notification.

FIG. 11B illustrates a user interface enabling the user to scan a document, such as a driver's license, when making report or to manually enter information from the document manually. FIG. 11C illustrates a user interface presented when the user activates the scan control. The user device camera may be activated, and the app may display a camera viewfinder may display the scene viewed by the camera (e.g., the back of the driver's license). The app may include positioning graphical aids (e.g., a redline across the viewfinder). The user interface may provide the user with scan instructions, including instructions on the placement of the driver's license with respect to the positioning graphical aids (e.g., "Scan the back of their card. Align the barcode on the red line. Avoid glare and shadow"). The app may also display a capture control.

In response to the user activating the scan control, the user interface of FIG. 11D may be presented. The app or remote server may identify a position of the 2D barcode in the image using a finder pattern in the barcode. The code may then be extracted and decoded using a decoding algorithm corresponding to the protocol used to encode the data included in the 2D barcode. The user interface may display some or all of the data extracted from barcode, such as the name on the driver's license, the driver's license ID, the state of issuance, and/or the expiration date. A redo control may be provided that enables the user to rescan the driver's license (e.g., in the event that the image was too blurred for the barcode to be decoded). An approve control may be provided to approve the displayed data (e.g., to confirm that the displayed text corresponds to the text on the driver's license).

FIG. 11E illustrates a witness statement user interface. If the user selects an "add witness" control, the example user interface in FIG. 11F is illustrated. The user interface illustrated in FIG. 11F enables the user to record a voice statement from a user (although optionally a video statement, including audio may be captured). The user interface may display instructions (e.g., "Ask your witness to describe what they saw"), a record control (start/stop recording), a playback control, and a record time elapsed scrubber bar and record time. A redo control may be provided that enables the user to re-record the witness statement. An approve control may be provided to approve the recording of the witness statement.

When the user activates the approve control for the witness statement, the example user interface illustrate in FIG. 11G may be illustrated. The user interface illustrated in FIG. 11G may include fields to receive witness contact information (e.g., first name, last name, phone number, physical address and/or email address) entered via a displayed touch keyboard or via voice. The keyboard may provide word suggestions based on one more of characters entered by the user in a field, and optionally based on the field type (e.g., field of type: first name, last name, phone number, physical address, or email address). An approve control may be provided to approve the witness contact information.

When the user activates the approve control for the witness contact information, the example user interface illustrate in FIG. 11H may be illustrated. The user interface illustrated in FIG. 11H may include field configured to receive a witness signature via the user device touch screen. For example, the witness may enter the signature using a finger or stylus. The witness signature may be digitized and stored in memory with an association with the recorded witness statement. An approve control may be provided to enable the user to approve the witness signature and a redo control may be provided to enable the user to redo the capture of the witness signature.

When the user activates the approve control for the witness signature, the example user interface illustrate in FIG. 11I may be illustrated. The user interface illustrated in FIG. 11I may display witness information (e.g., a witness number, a witness name, witness contact information). The user interface may also display a playback user interface, a play control, and a scrubber bar, that enables the user to playback the recorded witness statement (e.g., via an audio and/or video playback application) or a selected portion thereof. The user interface may also display the user signature. A call control may be provided enabling the user to place a call to the witness using the phone number included in the witness contact information. An approve control may be provided to enable the user to approve the witness statement and related witness information, and a redo control may be provided to enable the user to redo the witness statement and/or related witness information.

When the user activates the approve control, the user interface illustrate in FIG. 11J may be illustrated. The example user interface illustrated in FIG. 11J may display a listing of witness statements captured for a given accident report, optionally including a witness name and/or contact information. A delete control (e.g., a trash icon) may be provided enabling the user to delete a witness record. An "add witness" control may be provided enabling the user to add additional witness statements and related information.

FIG. 11K provides a summary listing of a given accident report (e.g., a car accident report). The user interface lists the documents captured for the report. For example, the listed documents may include a driver license (and the name of the drive license holder), documents related to damage suffered (e.g., a photograph of damage to the car), and accident location information (e.g., an address and/or map). The user interface may also list witness statements captured (e.g., including the name and/or contact information of the witness) and whether insurance policy information is captured. The app may also analyze the information collected by the app for an accident report, and determine if there is any accident information not collected (e.g., driver's license, accident photographs, accident location, witness statements, and/or insurance information). The app may identify such not collected information via the user interface. A "send report" control may be provided which when activated by the user causes the app to transmit the report and collected information, recorded documents, and recorded witness statements to a remote system (e.g., system 104). This optional process avoids the use of network bandwidth for an accident report that may need to be edited or cancelled, and avoids the utilization of memory storage on the remote system for an accident report that may need to be edited or cancelled.

FIG. 11L illustrates an example user interface that may be presented in response to the user activating the emergency call control. The user interface may indicate that emergency notifications have been provided to the user's emergency contacts, and when the emergency notifications have been provided (e.g., a specific time, or a time elapsed since the notifications have been provided). The user interface may include the event location, including an address and/or a map of the location (with an indicator of the precise event location on the map). A "safe alert" control may be provided which when activated by the user will cause the app and/or remote system to transmit a safe notification to those contacts to whom an emergency notification was provided to. Optionally, a list of emergency services may be provided in association with a call control, wherein activation of the call control will place a call to the emergency service.

FIG. 11M illustrates an example user interface that may be presented via an instantiation of the app on devices of recipients of emergency notifications issued in response to the user activating the emergency notification control. The user interface may a map of the event location (with a flag indicating the precise location of the event), an address of the event location, and the name of the user. The user interface may indicate an elapsed time since the emergency notification was received and elapsed time since the notification was updated. A call control is provided which when activated will cause a call to be placed to the user.

FIG. 11N illustrates the example emergency notification user interface with a notification dismissal control enabling the recipient of emergency notification to dismiss the notification (e.g., after ensuring the user is safe).

FIG. 11O illustrates an immigration alert user interface. The immigration alert user interface includes a control that when activated by the user causes immigration emergency notifications to be transmitted to the user in the event that the user was apprehended or arrested from an immigration-related matter.

FIG. 11P illustrates an example user interface that may be presented in response to the user activating the immigration emergency call control. The user interface may indicate that immigration emergency notifications have been provided to the user's emergency contacts, and when the emergency notifications have been provided (e.g., a specific time, or a time elapsed since the notifications have been provided). The user interface may include the event location, including an address and/or a map of the location (with an indicator of the precise event location on the map). A "cancel alert" control may be provided which when activated by the user will cause the app and/or remote system to transmit a safe notification to those contacts to whom an emergency notification was provided to. Optionally, a list of emergency services may be provided in association with a call control, wherein activation of the call control will place a call to the emergency service.

FIG. 11Q illustrates an example user interface that may be presented via an instantiation of the app on devices of recipients of immigration emergency notifications issued in response to the user activating the immigration emergency notification control. The user interface may a map of the immigration event location (with a flag indicating the precise location of the event), an address of the immigration event location, and the name of the user. The user interface may indicate an elapsed time since the immigration emergency notification was received and elapsed time since the immigration emergency notification was updated. A call control is provided which when activated will cause a call to be placed to the user.

FIG. 11R illustrates a user interface that enables the user to provide event (e.g., accident) location information. The user interface includes a control via which the user can provide location information via pinning a location on an electronic map, and a control via which the user may manually enter an event address (e.g., using a keyboard).

If the user selects the control for providing location information via pinning a location on an electronic map, the example user interface illustrated in FIG. 11S may be presented. The app utilizes location information accessed from the user device (e.g., GPS, WiFi, cell tower location information) to determine the user's approximate location (e.g., in latitude and longitude) and provides a map of the determined user's approximate location include a surround area (e.g., an area within a predetermined radius of the user's approximate location, such as 0.5 miles, 1 mile, 2 mile or 3 mile radius). The map may be a street map or an overhead photographic image of the location and surrounding area (e.g., from a plane or satellite) or an overhead graphic of the location and surrounding area (e.g., where the graphic may illustrates the outlines of buildings) overlaid by a street map. The street map may include street names of some or all of the illustrated streets. The user may touch the map (via the user device touch screen) and drag the map so that a different portion of the map is displayed and/or so that the map center is dragged so that a different portion of the map is at the center of the displayed map area. Optionally, the user interface may response to two-finger gestures (e.g., pinch and/or zoom gestures) to reduce the map scale and to thereby increase the mapped physical area displayed, or to zoom into a portion of the map to thereby decrease the mapped physical area displayed. The user interface may be configured to respond to a user finger (or stylus) tap on the displayed map by placing a visible marker (e.g., a flag) on the tapped location. For example, the user may tap a building or intersection to indicate the location of where an accident or other event being reported occurred.

If the user selects the control for manually providing location information, the example user interface illustrated in FIG. 11T may be presented. The user interface illustrated in FIG. 11T may include fields to a name of a building where the accident occurred (or immediately proximate to where the accident occurred) and/or a physical address entered via a displayed touch keyboard. The keyboard may provide word suggestions based on one more of characters entered by the user in a field, and optionally based on the field type (e.g., field of type: building name, physical address, etc.). An approve control may be provided to approve the location entry.

Referring to the example user interface illustrated in FIG. 11U, if the user selected a location by marking the map, the application or a remote system may use the mark (e.g., the horizontal X and vertical Y position of the marker in the displayed map) to look up a corresponding address in a local or remote geolocation database. Similarly, if the user entered a building name, the name may be used as a search parameter to find an address from a data store that maps building names to addresses. The user interface may display the map of the accident location and surrounding area, a zoomed image or graphic of the building at its location in the map, and may provide the building name and/or address. An approve control may be provided to approve the location information, and a redo control may be provided enabling the user to reenter the location information.

If the user selects the location information redo control, the example user interface illustrated in FIG. 11V may be presented. The user interface displays the current location information (e.g., in the form of a map, building name, and/or address) and may include a change location control and an enter address manually control.

If the user selects the enter address manually control, the example user interface illustrated in FIG. 11W may be presented. The illustrated example user interface enables the user to edit the building name, street, city, state, crossing street, and/or other information (e.g., using a touch keyboard displayed by the app on the touch screen). A "done" control is provided, which when activated, causes the entered location data to be stored.

Figure 12A:
FIGS. 12A-C illustrate additional example user interfaces.

FIG. 12A illustrates an example user interface view which the device app may access a report from a remote system (e.g., the system 104) and present the report to the user. The user interface may include an icon illustrating the subject matter of the report (e.g., a damaged car for a car accident), a date the accident occurred and/or a date the accident was reported, and an identifier (e.g., a unique report number and/or an insurance claim identifier). In addition, an interface is optionally provided via which the user can access status information on a given claim. Optionally, edit controls are provided (e.g., a pencil icon) via which the user can add to, delete, and/or modify data in the reports. An add report control is optionally provided (e.g., a "+" icon) which when activated presents a user interface enabling the user to submit an additional accident report. Optionally, the user interface may include an advertisement received from an ad server. The advertisement may optionally be targeted based at least in part on the user's location, type of accident(s) reported, and/or dates of reported accidents.

Figure 12B:
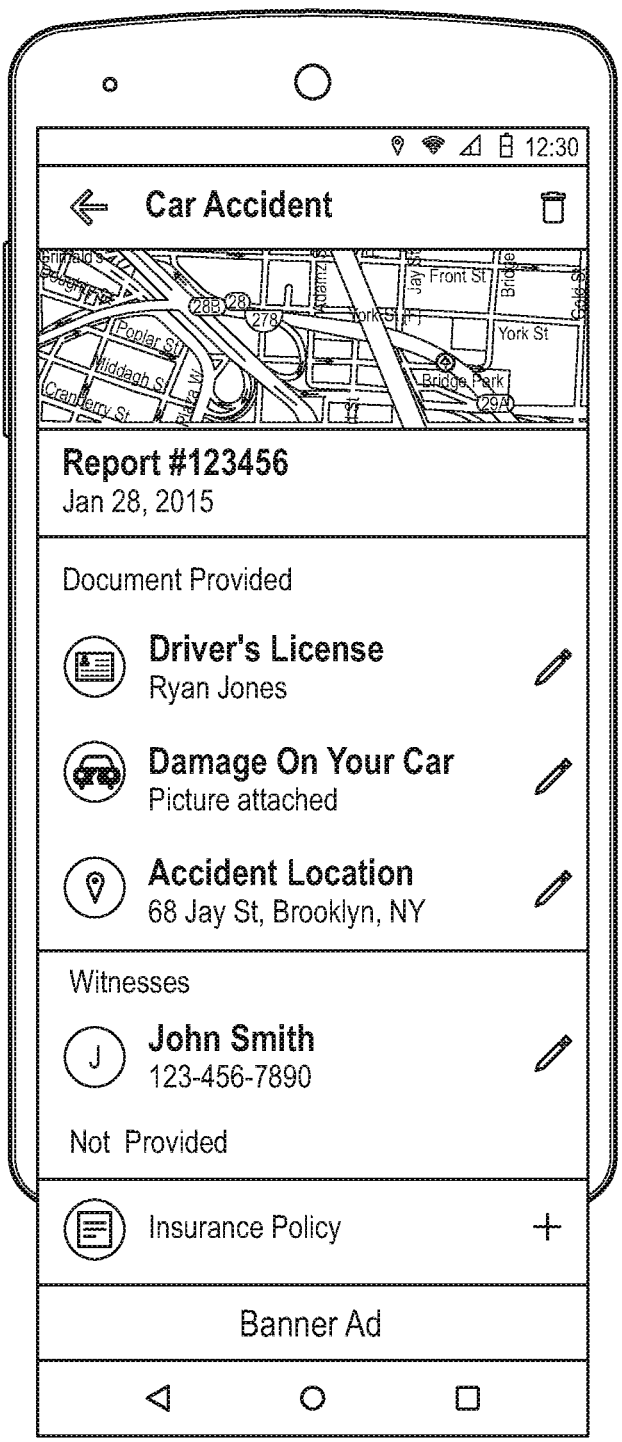

In response to the user selecting a report via the user interface illustrated in FIG. 12A (e.g., by detecting the user touching a report entry or associated edit control), the example user interface illustrated in FIG. 12B may be presented. The user interface may indicate the types of documents included in the report, the accident location (e.g., and address and/or map of the accident location and an area within a predetermined radius around the accident location), witness information, and/or insurance information. For example, the user interface may indicate whether an image and/or scan of a driver's license is included in the report, and a name of the associated driver. By way of further example, the user interface may indicate whether an image of the damage (e.g., a picture of a damaged car of the user or other damaged property) is included in the report, and may include a description of the image (e.g., "damage on your car"). By way of still further example, the user interface may indicate whether written recording, a video/audio recording, and/or an audio recording of a witness statement is included in the report, along with the name of the witness, and contact information for the witness. Optionally, the user interface may indicate whether insurance policy information has been included in the report and/or whether an image of an insurance card has been included in the report. Optionally, the user interface will display a given document in response to a user touch selection of the document entry or in response to activating an edit control.

Figure 12C:
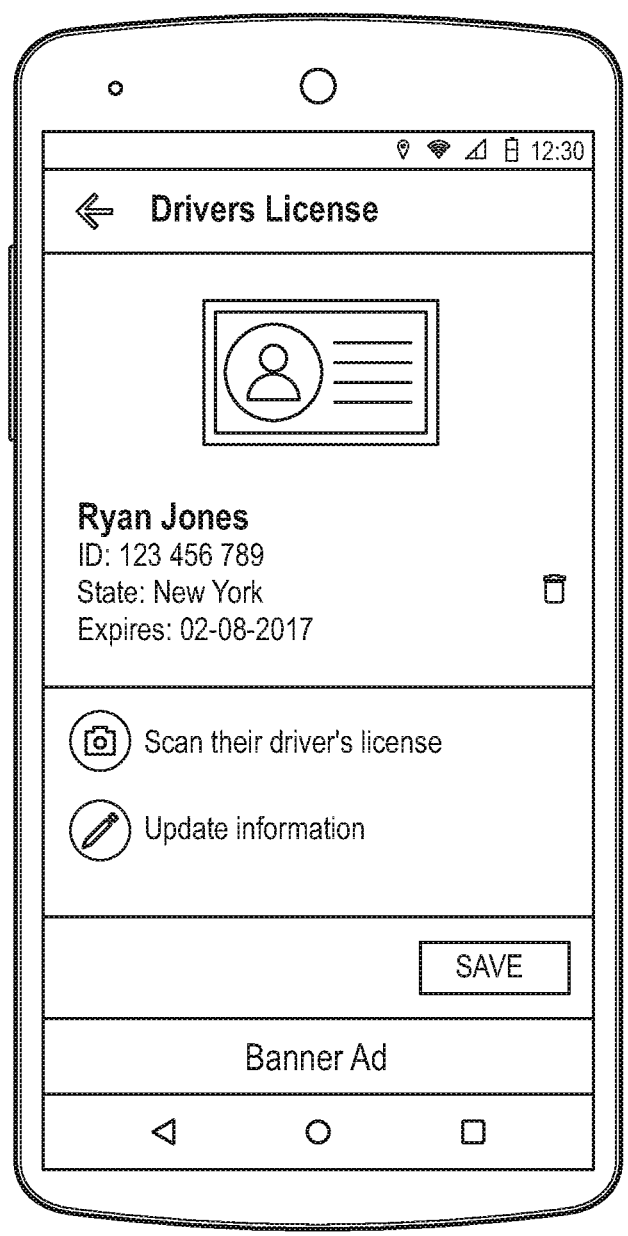

For example, if the user has selected the "Ryan Jones" Driver's License entry, the example user interface illustrated in FIG. 12C may be presented. The user interface may include an image of the driver's license, data scanned (e.g., photographed) from the driver's license (e.g., from an optical code (e.g., a 1D or 2D barcode or other optical code that may encode some or all of the textual information printed on the license (e.g., name, address, height, weight, birth date, license number and/or signature) and/or other information), magnetic or RF code), and or data hand-entered (e.g., via a keyboard entry, voice entry, or handwriting entry). For example, the driver's license data may include the name of the license holder, a license identifier (ID) code, a state of issuance, and/or a license expiration date. A trash control may be provided via the user interface which when touched by the user, may cause the app to delete the driver's license data. An edit control may be provided which when activated causes the app to present an edit user interface to enable the user to edit the driver's license data. A scan control may be provided, which when touched by the user may cause the app to scan the driver's license and import the driver's license data. A save control may be provided which when activated causes the app to save the entered, edited and/or scanned data (e.g., by storing the data locally on the user mobile device and/or by transmitting the data to the remote system 104 for storage to reduce memory storage utilized on the user mobile device).

For example, activation of the scan control (and optionally one or more subsequent controls) may activate the user's mobile device camera, present a viewfinder preview image of the driver's license and cause an image capture control to be presented. Once the user activates the image capture control, the image of the optical code may be captured by the camera, and the app may analyze the optical code, decode the optical code to convert some or all of the optical code into text, and populate one or more fields with the corresponding text.

Figure 13:
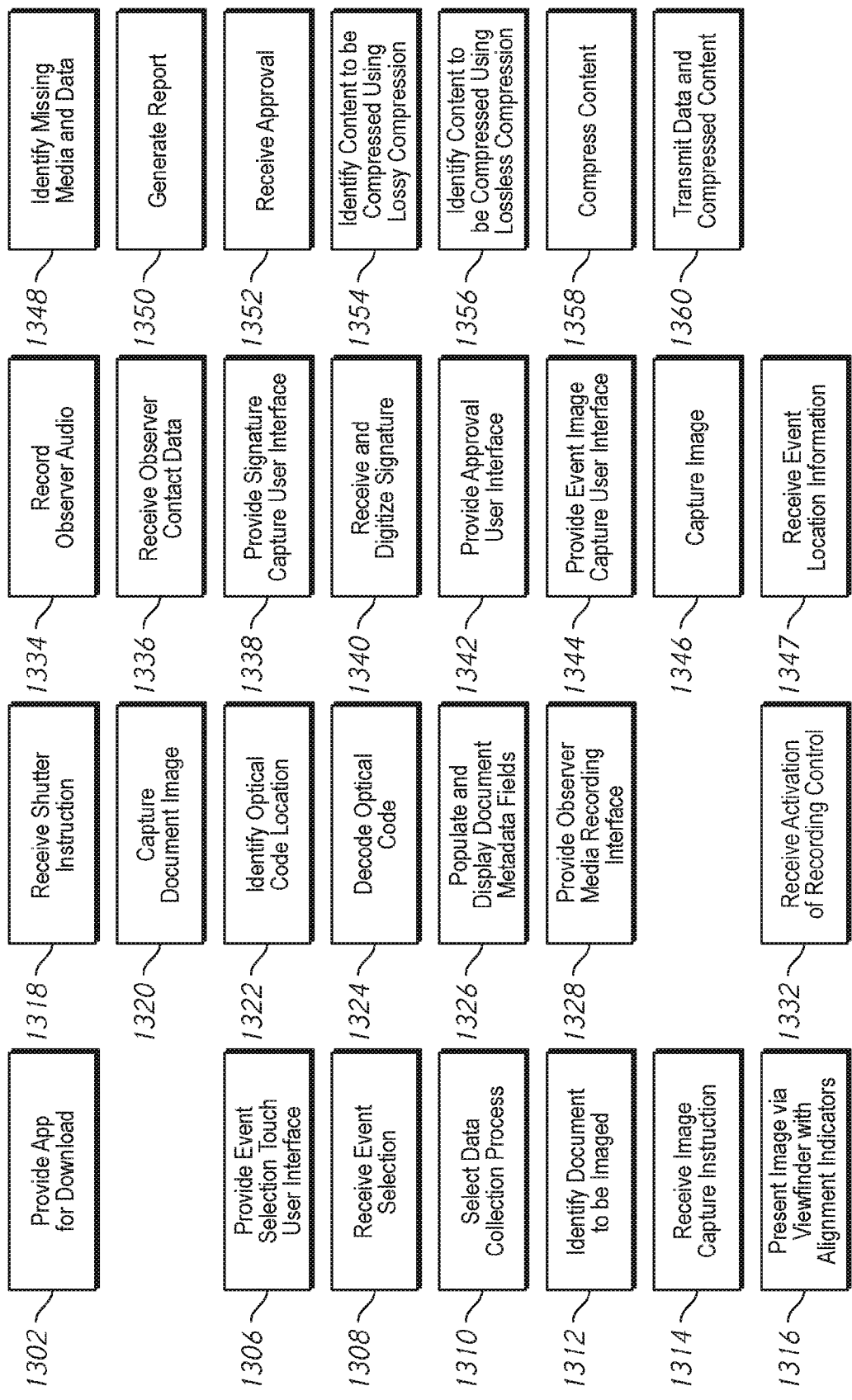
FIG. 13 illustrates an example process.

FIG. 13 illustrates an example process that optionally uses one or more of the user interfaces described herein. At block 1302, an application ("app"), such as that described herein, may optionally be provided for download to a user device, such as a mobile phone. The user device may include a touch screen configured to display user interfaces and data and configured to receive touch inputs via a finger, stylus, or other input device. The app may perform some or all of the functionality described herein.

At block 1306, the app provides a user interface for display that enables the user to select (e.g., by touching a control on the user device touch screen) an event-type to report. For example, the event types may include an automobile accident, a workplace accident, a personal injury incident, an arrest or detention (e.g., related to immigration issues, driving under the influence, etc.), and/or other event types.

At block 1306, a user event-type selection is received. At block 1308, a data collection process is automatically selected, where the data collection process may correspond to the received user event-type selection. For example, different types of data and documents may be collected for different types of events. By way of illustration, if the user is reporting an automobile accident, the data collection process may request a copy of the driver's license of the other driver(s) involved in the accident. However, if the user is reporting an immigration arrest or a workplace accident, the data collection process will not request a copy of other drivers' licenses. By way of further example, if the user is reporting a workplace accident, the data collection process may request an employer name, employer contact information, an indication as to whether the user is currently working for the employer, an indication as to whether the user reported the workplace accident or injury to the employer, an indication as to when the user last obtained medical services, and workplace-related insurance information, while such information may not be relevant to or requested for an immigration incident report. The following example assumes that the user is reporting an automobile accident, although several of the blocks may also be applicable to other events described herein.

At block 1312, a user interface may be presented on the user device, requesting that a document be imaged. For example, the user interface may request that a driver's license and/or insurance card be imaged. At block 1314, an instruction is received from the user (e.g., by an activation of a touch control) indicating that the user wants to proceed with capturing an image of the corresponding document. At block 1316, the user device camera viewfinder is displayed that shows what is in the camera's field of view. One or more alignment indicators (e.g., a rectangular shape corresponding to a driver's license shape, a line, four corners indicating where the corners of the document are to line up, etc.) may be provided for display in the viewfinder to aid the user in properly positioning the document to be imaged. At block 1318, a user shutter (capture image) instruction is received (e.g., via the touch screen or a physical control). At block 1320, in response to the shutter (capture image) instruction, the image of the document is captured by the user device camera.

If the document being imaged has or is expected to have an optical code, then at block 1322 the location of the optical code (e.g., a 1 dimensional or 2 dimension barcode) is identified. For example, the optical code location may identified by analyzing the image and identifying one or more finder patterns (e.g., one or more boxes or circles at the center or one or more corners of a 2D barcode, bars at either end of the barcode, a bullseye image, etc.) in the optical code. The type of code imaged may also be determined by analyzing start and stop characters within the optical code, and comparing the start and stop characters with those of known optical code standards (e.g., barcode standards) to identify a match. At block 1324 the barcode is decoded (e.g., by converting the code to alphanumeric text via a symbol table or otherwise). At block 1324, some or all of the alphanumeric text and/or image data extracted from the optical code is used to populate corresponding fields in a user interface presented by the user device. For example, the barcode may include driver name, driver's license identifier, and expiration date, and the foregoing may be inserted into corresponding fields in the user interface.

At block 1328, an observer media recording user interface may be displayed via the user device. For example, the observer media recording user interface may be used to record a video (including audio) or just an audio statement by a witness to the event (e.g., a witness to the accident). At block 1332, user activation of a record control is received (e.g., via a displayed touch control or via a physical control). At block 1334, a statement by the observer is recorded (e.g., a video recording or just an audio recording). At block 1336, contact data for the observer is received (e.g., name, physical address, email address, phone number and/or other contact information). The contact data may be received via a manual entry (e.g., via a keyboard) and/or the contact data may be received in an automated fashion (e.g., by scanning a business card or driver's license of the observer, or from an electronic contact record transmitted by an observer electronic device to the user electronic device). At block 1338, a signature capture user interface may be provided for display to the touch screen, enabling the observer to sign the statement using a finger or stylus. At block 1340, the signature is received and is translated to a digital representation. At block 1342, a user interface may be provided enabling the user to approve the observer statement and/or signature. If the user rejects the statement and/or signature, the process may return back to block 1328, 1332, or 1338.

At block 1344, an event capture user interface may be provided for display. The event capture user interface may prompt the user to capture an event-related image, such as a photographic or video of a damaged automobile (for an automobile accident report), of an injured body part, or of a wet floor (e.g., if the user is reporting a slip and fall personal injury accident). At block 1346, the image is captured (e.g., in response to the user activating a shutter (capture image) control).

At block 1347, event location is received via a user interface presented via the touch screen. For example, a map of the user's current location may be automatically selected and presented (e.g., based on location information from a GPS receiver, WiFi receiver, etc.). The user may then enter the precise location of the event by touching the corresponding location on the map (which will then display an icon or other indicator at that location) and/or by manually entering a location/building name and/or address using a keyboard.

At block 1348, the process examines the data and/or documents received for the report, and identifies documents and/or data that was requested or is desired, but was not received. At block 1350, the process generates a report that indicates the data and/or documents that have been received, and the data and/or documents that have not been received. At block 1352, an approval control is provided via which the user can approve the report for transmission to a remote system. An edit control may also be provided via which the user can indicate that the user wants to edit one or more items in the report. In this example, at block 1352 approval is received.

At blocks 1352 and 1354, the process identifies what type of compression is to be used for particular content (e.g., images and/or data). For example, certain images may be identified as photographs, and the process may select a lossy compression (e.g., JPEG). Certain images may be identified as images of signatures and a lossless compression may be used. At block 1356, the content is compressed in accordance with the compression determinations. At block 1358, the report is transmitted to a remote system (e.g., system 104), including the compressed and non-compressed content.

While certain embodiments have been described as being configured to process and manage accident reports and accident related services, such embodiments may also be configured to process and manage other types of information and services. For example, certain embodiments may be configured to assist users with respect to legal documents and government correspondence (e.g., a letter, correspondence in the form of an email or PDF document, etc.). By way of illustration, a user may receive a government letter or other correspondence regarding the user's immigration status. The letter may be in English, while the user may not understand English and so may need assistance in translating and responding to the letter. Certain embodiments enable the user to upload a photograph or PDF of the correspondence or otherwise forward the correspondence to the system via a phone app, email, or other messaging service.

For example, the user may be provided with a document upload control via the phone app which the user can activate to initiate the process of photographing a hardcopy letter and uploading the photograph of the hardcopy letter to the remote system (e.g., the system illustrated in FIG. 1). The system may then instruct the user (e.g., via the phone app, an SMS message or otherwise) to call a phone number, such as a toll free number provided by the system orally or via a text message, and request a password/code for accessing/receiving an attorney referral. The user may then call the phone number, which may be answered, such as by an interactive voice response (IVR) system (e.g., hosted by the system). The IVR system provides the user with a password/code and prompts the user to enter the password via the app in order to receive a referral (e.g., to an attorney). It is understood that the password/code may be requested and received via other techniques, such as via the phone app, an email, an SMS message or otherwise. The user may then enter the password/code into a corresponding field presented by the app.

If the correct password is received from the user (e.g., via the app), the system accesses a database of attorney records and attorney referral criteria. For example, the attorney referral criteria may include some or all of the following: practice specialty, location relative to a user's current location and/or home location (e.g., accessed from the user's account information), performance ratings provided by the system operator, performance ratings provided by other users, ratings/feedback provided by a state bar, ratings/feedback provided by an independent rating agency, whether the attorney has retained advertising rights for the user's current location and/or home location, an indication as to the type of correspondence the user is reporting (e.g., an immigration letter), other information provided by the user, and/or other criteria. The system may use the information from the attorney records, optionally from the user device (e.g., location information), and optionally from the user's profile information, to select one or more attorneys to refer the user to. Information (e.g., contact information, rating information, and/or other information accessed from the database) regarding one or more of the selected attorneys may be transmitted to the user for presentation by the app on the user's device. Optionally, the user may select a given listed attorney, and the system may facilitate communication between the user and the attorney. For example, the system may transmit some or all of the information provided by the user (e.g., the correspondence) to the selected attorney, and may provide the user's contact information (e.g., mobile device phone number) so that the attorney can contact the user. Optionally, the system may also enable the user to call the selected attorney by activating a call link presented by the app in conjunction with the attorney referral. Optionally, the system will use a translation application to translate the correspondence into the user's native/spoken language (e.g., as indicated by the user's profile or otherwise indicated by the user) and provide a copy of the translated correspondence to the user and/or the attorney.

Certain embodiments discussed above receive photographs (e.g., accident photographs), captured using a mobile device camera of a user and transmitted to a remote system, such as the system discussed with respect to FIG. 1. In addition or instead, the system may access and receive such photographs from other sources.

For example, upon determining that a user has been involved in an accident (e.g., based on a user report submitted via the user's mobile device (using the application discussed above) and/or upon detecting the user has placed an emergency phone call), the system may dispatch an image capturing device to the location of the user (e.g., as determined via GPS, cell tower, and/or Wi-Fi location information from the user mobile device, via location information manually submitted by the user as a textual address or via an electronic map, or otherwise). Upon reaching the accident location, the image capturing device may then capture images (still images and/or videos) of the accident scene (automatically upon detecting the accident scene or in response to a user instruction or prompt). The images may then be transmitted to and received by the remote system for handling, as similarly described above with respect to a user-captured photograph/video.

Optionally, the application hosted on the user's mobile device may, in response to a user activation of a beacon control, or in response to a command from the remote system, activate the mobile device's flash or other light emission device in a pattern (e.g., a unique on/off pattern) to thereby act as a beacon, which the image capturing device may detect and use to better identify the location of the accident for navigation and/or image capture purposes.

The image capturing device may be in the form of a camera equipped aerial vehicle (e.g., an unmanned drone, a manned helicopter, etc.), or a camera equipped land vehicle (e.g., an unmanned land vehicle, a manned car or motorcycle, etc.). If the camera equipped vehicle is an unmanned vehicle, the remote system may, directly or via another system, load the accident location information, route information, and other information to the unmanned vehicle, which may use such information to navigate to the accident location. The unmanned vehicle may also be equipped with a GPS-based navigation system. Similar information may be loaded into a navigation system of a manually operated camera equipped vehicle.

Optionally, upon receipt of the accident indication, the system will determine if there are any restrictions (e.g., governmental or safety restrictions) with respect to sending a camera equipped vehicle to the accident location. If the system determines that there are restrictions (e.g., based on a data store of such restrictions tied to geographical locations), the system may elect not to dispatch a prohibited camera equipped vehicle to the accident location. However, if certain types of camera equipped vehicles are permitted and certain camera equipped vehicles are prohibited, the system may optionally dispatch a permitted camera equipped vehicle. For example, if an accident occurred near or in an airport or a defense facility, there may be a prohibition against drones, and the like.

Thus, systems and methods are disclosed for collecting, processing, and distributing information such as accident information.

Certain embodiments may be implemented via hardware, software stored on media, or a combination of hardware and software. For example, certain embodiments may include software/program instructions/modules stored on tangible, non-transitory computer-readable medium (e.g., magnetic memory/discs, optical memory/discs, RAM, ROM, FLASH memory, other semiconductor memory, etc.), accessible by one or more computing devices configured to execute the software (e.g., servers or other computing device including one or more processors and comprising hardware, wired and/or wireless network interfaces (e.g., cellular, Wi-Fi, Bluetooth, T1, DSL, cable, optical, or other interface(s) which may be coupled to the Internet), content databases, customer account databases, etc.). Data stores (e.g., comprising databases) may be used to store some or all of the information discussed herein in memory.

By way of example, a given computing device may optionally include user interface devices, such as some or all of the following: one or more displays, keyboards, touch screens, speakers, microphones, mice, track balls, touch pads, tilt sensors, accelerometers, biometric sensors (e.g., fingerprint or face recognition sensors for authenticating a user) printers, etc. The computing device may optionally include a media read/write device, such as a CD, DVD, Blu-ray, tape, magnetic disc, semiconductor memory, or other optical, magnetic, and/or solid state media device. A computing device, such as a user terminal, may be in the form of a general purpose computer, a personal computer, a laptop, a tablet computer, a mobile or stationary telephone, an interactive television, a set top box coupled to a display, etc. Certain embodiments may be able to conduct hundreds (or more) of transactions and processes described herein within a second.

While certain embodiments may be illustrated or discussed as having certain example components, additional, fewer, or different components may be used. Processes described as being performed by a given system may be performed by a user terminal or other system or systems. Processes described as being performed by a user terminal may be performed by another system. Data described as being accessed from a given source may be stored by and accessed from other sources. Transmissions described herein may be via a wired and/or wireless network or other communications link. Further, with respect to the processes discussed herein, various states may be performed in a different order, not all states are required to be reached, and fewer, additional, or different states may be utilized.

User interfaces described herein are optionally presented (and user instructions may be received) via a user computing device using a browser, other network resource viewer, or otherwise. For example, the user interfaces may be presented (and user optionally instructions received) via an application (sometimes referred to as an "app"), such as a dedicated app configured specifically for accident reporting and/or communications activities, installed on the user's mobile phone, laptop, pad, desktop, television, set top box, phone, or other terminal. For example, an app may be downloaded to a user mobile device, such as a smart phone. Various features described or illustrated as being present in different embodiments or user interfaces may be combined into the same embodiment or user interface or separated into additional user interfaces. The example user interfaces illustrated herein need not be used. The user voice communications discussed herein may optionally be processed in whole or in part by a voice recognition system in the content of an interactive voice response system. The user voice communication may optionally be responded to by the interactive voice response system or a human agent.

Various aspects and advantages of the embodiments have been described where appropriate. It is to be understood that not necessarily all such aspects or advantages may be achieved in accordance with any particular embodiment. Thus, for example, it should be recognized that the various embodiments may be carried out in a manner that achieves or optimizes one advantage or group of advantages as taught herein without necessarily achieving other aspects or advantages as may be taught or suggested herein. Further, embodiments may include several novel features, no single one of which is solely responsible for the embodiment's desirable attributes or which is essential to practicing the systems, devices, methods, and techniques described herein. In addition, various features of different embodiments may be combined to form still further embodiments. For example, aspects found in different user interfaces may be combined to form still further user interface.

What is claimed is:

1. A mobile device configured to manage accident-related communications, comprising:
   a wireless interface;
   a processing system;
   a touch screen;
   a camera;
   non-transitory computer readable memory that stores instructions that when executed by the processing system cause the mobile device to:
     provide a first user interface that enables a user to report an event that the user experienced, wherein the first user interface provides a menu of a plurality of different event types comprising at least a vehicular accident event type and an immigration event type, wherein the first user interface enables the user to select an event-type among the plurality of different event types;
     receive via the touch screen an event type selection from the user;
     based at least in part on the received event type selection from the user from the first user interface that provides a menu of a plurality of different event types comprising at least a vehicular accident event type and an immigration event type, select an information capture process among a plurality of information capture process;
     identify an estimated current location of the user based at least in part on WiFi, cell tower, or GPS location information;
     select a map based at least in part on the user's estimated current location;
     present via the touch screen the map of the user's estimated current location;
     enable the user to move, pinch, and zoom the map of the user's estimated current location;
     enable the user to identify, on the map selected based at least in part on the user's estimated current location, a precise event location of the event that the user experienced by touching a location on the map and/or via a touch keyboard entry;
     provide a second user interface requesting an image of a document;
     in response to a user input received via the touch screen, cause a viewfinder corresponding to the mobile device camera to be displayed, wherein the viewfinder displays a live image being viewed by the mobile device camera;
     cause an alignment indicator to be displayed with the viewfinder while the live image is displayed;
     enable the user to capture an image of a document displayed via the viewfinder;
     determine a location of an optical code comprising a barcode on the document;
     cause the barcode to be decoded to obtain at least alphanumeric information, the alphanumeric information comprising:
       a user name on the document, and
       a document identifier;
     populate a name field of a third user interface with the user name decoded from the barcode;
     populate a document identifier field of the third user interface with the document identifier decoded from the barcode;

provide a fourth user interface enabling the user to record content from an event observer by touching a record control presented via the touch screen;
cause event observer content to be recorded in response to the user touching the record control;
provide a user interface configured to receive a signature via the touch screen;
digitize a received signature of the of the event observer;
store the digitized signature of the event observer in association with the content recorded from the event observer;
compress the digitized signature of the event observer using a first type of compression, wherein the first type of compression is a lossless compression;
compress the document image using a second type of compression, wherein the second type of compression is a lossy compression;
transmit the digitized signature, compressed using the first type of compression, and the document image, compressed using the second type of compression, to a remote system;
transmit to the remote system, using the wireless interface, at least the precise location, at least a portion of the alphanumeric information obtained by decoding the barcode, and the recorded observer content;
provide an emergency contact user interface enabling the user to specify one or more contacts from the user's contact data store as an emergency contact;
present on the touch screen an emergency notification control;
detect activation of the emergency notification control; and
at least partly in response to the detection of the activation of the emergency notification control, automatically transmit a notification to one or more contacts previously specified by the user, via the emergency contact user interface that enables the user to specify one or more contacts from the user's contact data store as an emergency contact, the emergency notification comprising:
a map of the precise event location of the event that the user experienced;
a name of the user;
a time indicating when the notification was transmitted and/or a time indicating when the notification was received;
a contact control enabling place a voice call to the user.

2. The mobile device as defined in claim 1, wherein the recorded content comprises at least audio content.

3. The mobile device as defined in claim 1, wherein the optical code comprises a two dimension barcode including a locator symbol, wherein the mobile device is configured to determine the location of the optical code using the locator symbol.

4. The mobile device as defined in claim 1, wherein the plurality of different event types further comprises a workplace injury event type, and a personal injury event type.

5. A method of managing accident-related communications, comprising:
providing an application, comprising software, configured to be downloaded to a mobile device of a user having a touch screen and camera, wherein the application is configured to:
provide a first user interface enabling the user to report an event that the user experienced, wherein the first user interface provides a menu of a plurality of different event types comprising at least a vehicular accident event type and a workplace accident event type, wherein the first user interface enables the user to select an event-type among a plurality of different event types;
receive an event type selection from the user, wherein the event type selection is received via the touch screen;
based at least in part on the received event type selection from the user from the first user interface that provides a menu of a plurality of different event types comprising at least a vehicular accident event type and workplace injury event type, select an information capture process among a plurality of information capture process;
identify an estimated location of the user based at least in part on WiFi, cell tower, or GPS location information;
select a map based at least in part on the user's estimated location;
provide the selected map for display via the user device;
enable the user to move, pinch, and zoom the map of the user's estimated location;
enable the user to identify, on the map selected based at least in part on the user's estimated location, a precise event location of the event that the user experienced by touching a location on the map and/or via a touch keyboard entry;
display an indicator at the map location touched by the user that indicates the precise event location of the event that the user experienced in response to the user identifying the precise event location of the event that the user experienced;
provide a second user interface requesting an image of a document;
in response to a user input, cause a viewfinder corresponding to the mobile device camera to be displayed;
cause an alignment indicator to be displayed with the viewfinder;
enable the user to capture an image of a document displayed via the viewfinder;
determine a location of an optical code comprising a barcode on the document based at least in part on a detection of a finder pattern;
determine a barcode type for the optical code;
decode the optical code to obtain at least alphanumeric information, the alphanumeric information comprising:
a user name on the document, and
a document identifier;
populate a name field of a third user interface with the user name decoded from the barcode;
populate a document identifier field of the third user interface with the document identifier decoded from the barcode;
provide a fourth user interface enabling the user to record content from an event observer;
cause event observer content to be recorded in response to the user activating a record control;
provide a user interface configured to receive a signature via the touch screen;
digitize a received signature of the of the event observer;
store the digitized signature of the event observer in association with the content recorded from the event observer;
compress the digitized signature of the event observer using a first type of compression;
compress the document image using a second type of compression;

transmit the digitized signature, compressed using the first type of compression, and the document image, compressed using the second type of compression, to a remote system;

transmit to the remote system, using a wireless interface, at least the precise location, at least a portion of the alphanumeric information obtained by decoding the barcode, and the recorded observer content;

provide an emergency contact user interface enabling the user to specify one or more contacts from the user's contact data store as an emergency contact;

present on the touch screen an emergency notification control;

detect activation of the emergency notification control; and at least partly in response to the detection of the activation of the emergency notification control, automatically transmit a notification to one or more contacts previously specified by the user, via the emergency contact user interface that enables the user to specify one or more contacts from the user's contact data store as an emergency contact, the emergency notification comprising:
- a map of the precise event location of the event that the user experienced;
- a name of the user;
- a time indicating when the notification was transmitted and/or a time indicating when the notification was received;
- a contact control enabling a contact to place a voice call to the user.

6. The method as defined in claim 5, wherein the recorded content comprises at least audio content.

7. The method as defined in claim 5, wherein the optical code comprises a two dimension barcode including a locator symbol.

8. The method as defined in claim 5, wherein the plurality of different event types further comprises a personal injury event type, and immigration event type.

9. A method of managing accident-related communications, comprising:

providing a first user interface for display on a user device, the user device comprising a touch screen and a camera, the first user interface enabling the user to report an event that the user experienced;

identifying an estimated location of the user based at least in part on WiFi, cell tower, or GPS location information;

enabling a map corresponding to the estimated location to be displayed on the user device;

enabling the user to move, pinch, and zoom the map of the user's estimated location;

enabling the user to identify, on the map corresponding to the user's estimated location, a precise event location of the event that the user experienced by touching a location on the map and/or via a touch keyboard entry;

providing an indicator at the map location touched by the user that indicates the precise event location of the event that the user experienced in response to the user identifying the precise event location of the event that the user experienced;

providing a second user interface requesting an image of a document;

in response to a user input, causing a viewfinder corresponding to the mobile device camera to be displayed;

enabling the user to capture an image of a document displayed via the viewfinder;

determining a location of an optical code comprising a barcode on the document;

decoding the barcode to obtain at least alphanumeric information, the alphanumeric information comprising:
- a user name on the document, and
- a document identifier;

populating a name field of a third user interface with the user name decoded from the barcode;

populating a document identifier field of the third user interface with the document identifier decoded from the barcode;

providing a fourth user interface enabling the user to record content from an event observer that observed the event that the user experienced;

causing event observer content to be recorded in response to the user activating a record control;

providing a user interface configured to receive a signature via the touch screen;

digitizing a received signature of the of the event observer that observed the event that the user experienced; and storing the digitized signature of the event observer that observed the event that the user experienced in association with the content recorded from the event observer;

compressing the digitized signature, of the event observer that observed the event that the user experienced, using a first type of compression;

compressing the document image using a second type of compression;

transmit the digitized signature, compressed using the first type of compression, and the document image, compressed using the second type of compression, to a remote system;

transmitting to the remote system, using a wireless interface, at least the precise location, at least a portion of the alphanumeric information obtained by decoding the barcode, and the recorded observer content;

providing an emergency contact user interface enabling the user to specify one or more contacts from the user's contact data store as an emergency contact;

providing on the touch screen an emergency notification control;

detecting activation of the emergency notification control; and at least partly in response to the detection of the activation of the emergency notification control, transmitting a notification to one or more contacts previously specified by the user, via the emergency contact user interface that enables the user to specify one or more contacts from the user's contact data store as an emergency contact, the emergency notification comprising:
- a map of the precise event location of the event that the user experienced;
- a name of the user;
- a time indicating when the notification was transmitted and/or a time indicating when the notification was received;
- a contact control enabling a contact receiving the notification to contact the user.

10. The method as defined in claim 9, wherein the recorded content comprises at least audio content.

11. The method as defined in claim 9, wherein the optical code comprises a two dimension barcode including a locator symbol, the further comprising determining the location of the optical code using the locator symbol.

* * * * *

UNITED STATES PATENT AND TRADEMARK OFFICE
CERTIFICATE OF CORRECTION

| | | |
|---|---|---|
| PATENT NO. | : 9,866,673 B2 | Page 1 of 1 |
| APPLICATION NO. | : 15/048834 | |
| DATED | : January 9, 2018 | |
| INVENTOR(S) | : Gershon Gabel | |

It is certified that error appears in the above-identified patent and that said Letters Patent is hereby corrected as shown below:

In the Specification

In Column 19 at Line 1, Change "the a" to --the--.

In Column 19 at Line 63, Change "8A-8AC." to --8A-8C.--.

In Column 34 at Line 10, Change "and or" to --and/or--.

In the Claims

In Column 41 at Line 8, In Claim 1, change "of the of the" to --of the--.

In Column 42 at Line 60, In Claim 5, change "of the of the" to --of the--.

In Column 44 at Line 20 (approx.), In Claim 9, change "of the of the" to --of the--.

Signed and Sealed this
Eighth Day of May, 2018

Andrei Iancu
*Director of the United States Patent and Trademark Office*